(12) United States Patent
Li et al.

(10) Patent No.: US 12,445,624 B2
(45) Date of Patent: Oct. 14, 2025

(54) CROSS COMPONENT PREDICTION

(71) Applicant: Alibaba (China) Co., Ltd., Zhejiang (CN)

(72) Inventors: Xinwei Li, Beijing (CN); Jie Chen, Beijing (CN); Yan Ye, San Diego, CA (US); Ru-ling Liao, Sunnyvale, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/750,267

(22) Filed: Jun. 21, 2024

(65) Prior Publication Data
US 2025/0008108 A1    Jan. 2, 2025

Related U.S. Application Data

(60) Provisional application No. 63/511,659, filed on Jul. 2, 2023.

(51) Int. Cl.
*H04N 19/132* (2014.01)
*H04N 19/176* (2014.01)
*H04N 19/186* (2014.01)

(52) U.S. Cl.
CPC ......... *H04N 19/132* (2014.11); *H04N 19/176* (2014.11); *H04N 19/186* (2014.11)

(58) Field of Classification Search
CPC ............... H04N 19/132; H04N 19/176; H04N 19/186; H04N 19/117; H04N 19/593
See application file for complete search history.

(56) References Cited

U.S. PATENT DOCUMENTS

| | | |
|---|---|---|
| 2017/0214921 A1 | 7/2017 | Kubota et al. |
| 2020/0260096 A1 | 8/2020 | Ikai et al. |
| 2021/0289215 A1* | 9/2021 | Helmrich ............ H04N 19/136 |
| 2022/0007011 A1 | 1/2022 | Ma et al. |
| 2022/0239897 A1 | 7/2022 | Deng et al. |
| 2022/0312020 A1 | 9/2022 | Li et al. |
| 2024/0357097 A1* | 10/2024 | Chen .................. H04N 19/176 |
| 2025/0008087 A1* | 1/2025 | Huang ................ H04N 19/176 |
| 2025/0030870 A1* | 1/2025 | Seregin ............... H04N 19/105 |
| 2025/0071305 A1* | 2/2025 | Yang .................... H04N 19/44 |

OTHER PUBLICATIONS

PCT International Search Report and Written Opinion mailed Aug. 27, 2024, issued in corresponding International Application No. PCT/CN2024/102719 (7 pgs.).

(Continued)

*Primary Examiner* — James M Pontius
(74) *Attorney, Agent, or Firm* — Finnegan, Henderson, Farabow, Garrett & Dunner, LLP

(57) ABSTRACT

Methods for encoding a video sequence into a bitstream and decoding a bitstream to output one or more pictures for a video stream. An exemplary method includes: receiving a video sequence; encoding one or more pictures of the video sequence; and generating a bitstream associated with the encoded pictures, wherein the encoding comprises: predicting chroma samples within a current block based on luma samples corresponding to the chroma samples by a plurality of cross-component residual models (CCRMs).

20 Claims, 27 Drawing Sheets

The process of multiple model MMRM

(56) References Cited

OTHER PUBLICATIONS

"Requirements for a Future Video Coding Standard v5," International Organisation for Standardisation, Torino, IT, 14 pages (2017).
Sullivan et al., "Overview of the High Efficiency Video Coding (HEVC) Standard," IEE Transactions on Circuits and Systems for Video Technology, vol. 22, No. 12, pp. 1649-1668 (2012).
JEM, https://jvet.hhi.fraunhofer.de/svn/svn_HMJEMSoftware.
Chen et al., "Algorithm Description of Joint Exploration Test Model 7 (JEM 7)," JVET-G1001-v1, 7th Meeting: Torino, IT, Jul. 13-21, 2017, 50 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Astola et al., "AHG12: Cross-component residual model (CCRM) for inter prediction," JVET-AD0108-v3, $30^{th}$ Meeting, Antalya, TR, Apr. 21-28, 2023, 4 pages.
Coban et al., "Algorithm description of Enhanced Compression Model 8 (ECM 8)" JVET-AC2025, 29th Meeting, by teleconference, Jan. 11-20, 2023, 74 pages.

\* cited by examiner

The samples used to derive linear model parameters

FIG. 7

Four Sobel based gradient patterns for GLM

The process of CCRM in decoder side

The process of multiple model MMRM

CROSS COMPONENT PREDICTION

CROSS-REFERENCE TO RELATED APPLICATIONS

The disclosure claims the benefits of priority to U.S. Provisional Application No. 63/511,659, filed on Jul. 2, 2023, which is incorporated herein by reference in its entirety.

TECHNICAL FIELD

The present disclosure generally relates to video processing, and more particularly, to cross component prediction techniques used for predicting chroma samples based on collocated luma samples.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide methods and apparatuses for predicting chroma samples based on collocated luma samples.

According to some exemplary embodiments, there is provided a method for encoding a video sequence into a bitstream, including: receiving a video sequence; encoding one or more pictures of the video sequence; and generating a bitstream associated with the encoded pictures, wherein the encoding includes: predicting chroma samples within a current block based on luma samples corresponding to the chroma samples by a plurality of cross-component residual models (CCRMs).

According to some exemplary embodiments, there is provided a method for decoding a bitstream to output one or more pictures for a video stream, including: receiving a bitstream; and decoding, using coded information of the bitstream, one or more pictures, wherein the decoding includes: predicting chroma samples within a current block based on luma samples corresponding to the chroma samples by a plurality of cross-component residual models (CCRMs).

According to some exemplary embodiments, there is provided a non-transitory computer readable storage medium storing a bitstream of a video. The bitstream is generated according to operations including: predicting chroma samples within a current block based on luma samples corresponding to the chroma samples by a plurality of cross-component residual models (CCRMs).

BRIEF DESCRIPTION OF THE DRAWINGS

Embodiments and various aspects of the present disclosure are illustrated in the following detailed description and the accompanying figures. Various features shown in the figures are not drawn to scale.

FIG. 7 shows four Sobel based gradient patterns for a Gradient Linear Model (GLM), according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve this goal, since 2015, the JVET has been developing technologies beyond HEVC using the joint exploration model (JEM) reference software. As coding technologies being incorporated into the JEM, the JEM achieved substantially higher coding performance than HEVC. In October 2017, a joint call for proposals (CfP) was issued by VCEG and MPEG to formally start the development of next generation video compression standard beyond HEVC. Responses to the CfP were evaluated at the JVET meeting in San Diego in April 2018, and the formal development process of the VVC standard started in April 2018.

The VVC standard has been progressing well since April 2018, and continues to include more coding technologies that provide better compression performance. VVC is based on the same hybrid video coding system that has been used in modern video compression standards such as HEVC, H.264/AVC, MPEG2, H.263, etc.

Figure 1:
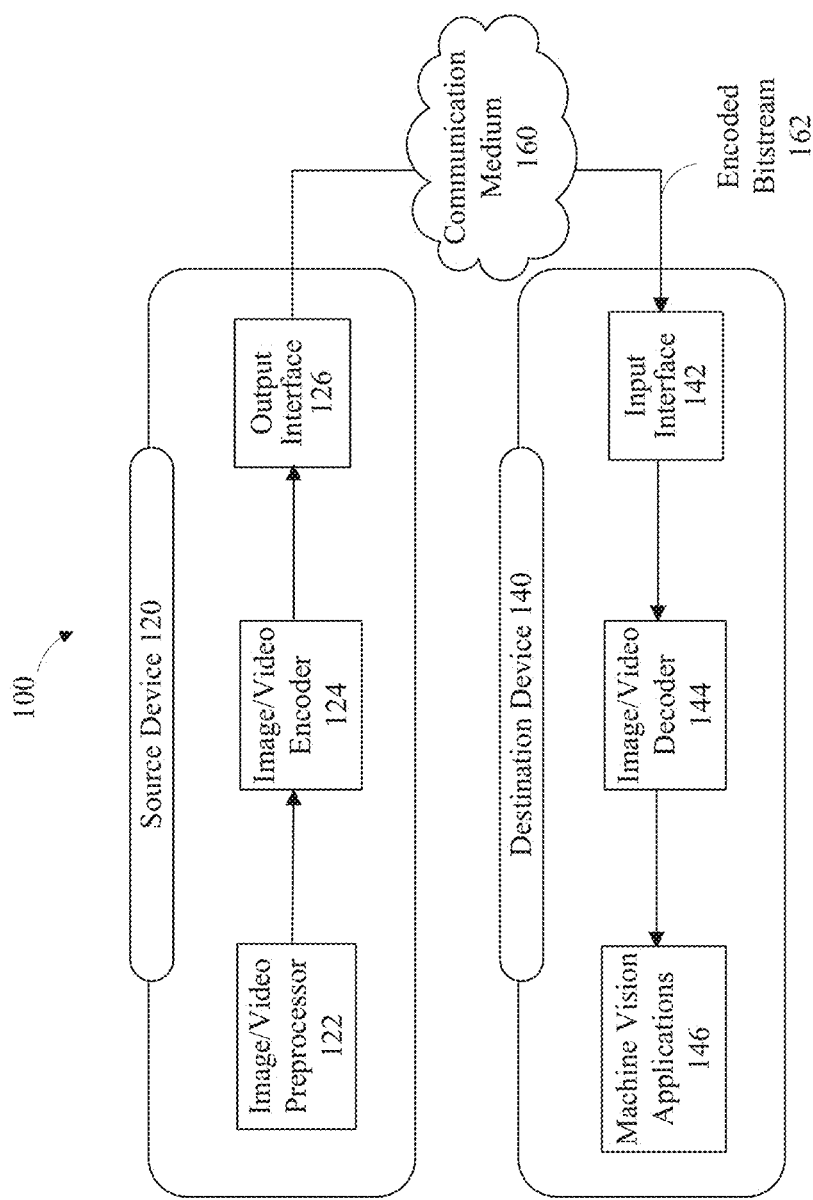
FIG. 1 is a schematic diagram illustrating an exemplary system for preprocessing and coding image data, according to some embodiments of the present disclosure.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware and/or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques are described in connection with FIGS. 2A-2B and FIGS. 3A-3B.

Figure 2A:
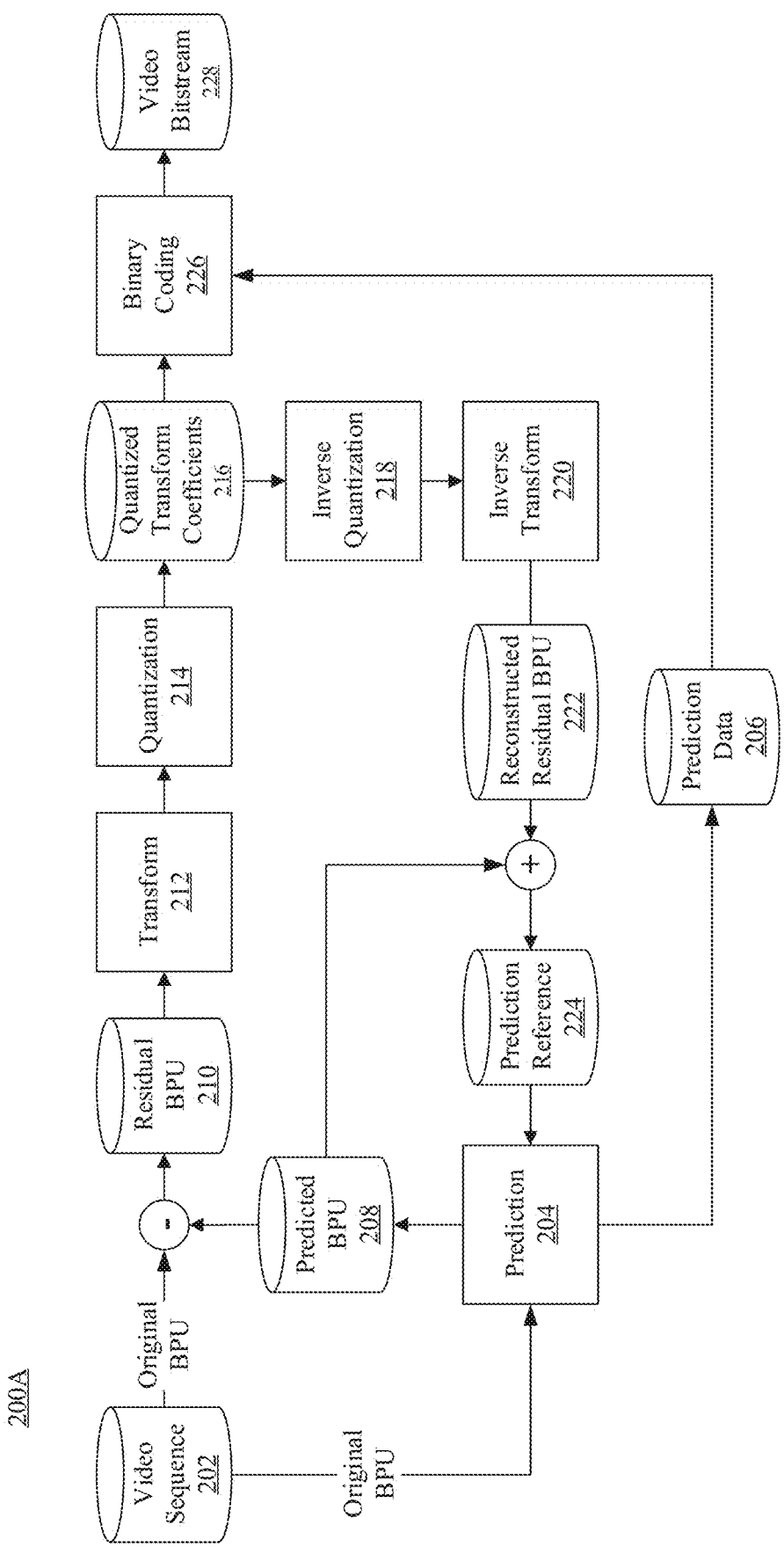
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
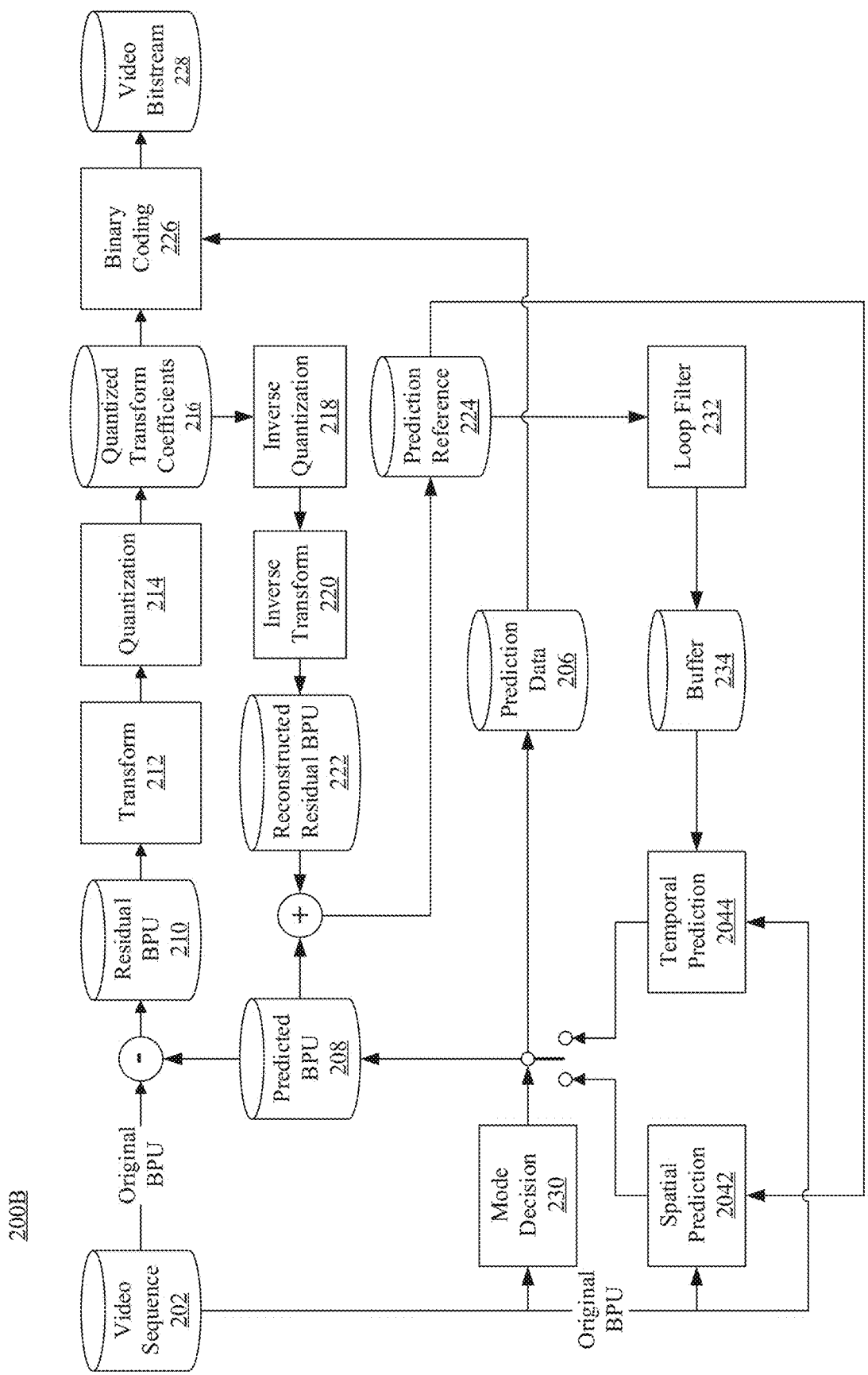
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. For example, the encoding process 200B can be performed by an encoder, such as image/video encoder 124 in FIG. 1. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU.

Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

In some embodiments, the input video sequence 202 is processed block by block according to encoding process 200B. In VVC, a coded tree unit (CTU) is the largest block unit, and can be as large as 128×128 luma samples (plus the corresponding chroma samples depending on the chroma format). A CTU may be further partitioned into coding units (CUs) using quad-tree, binary tree, or ternary tree. At the leaf nodes of the partitioning structure, coding information such as coding mode (intra mode or inter mode), motion information (reference index, motion vector difference, etc.) if inter coded, and quantized transform coefficients 216 are sent. If intra prediction (also called spatial prediction) is used, spatial neighboring samples are used to predict the current block. If inter prediction (also called temporal prediction or motion compensated prediction) is used, samples from already coded pictures called reference pictures are used to predict the current block. Inter prediction may use uni-prediction or bi-prediction. In uni-prediction, only one motion vector pointing to one reference picture is used to generate the prediction signal for the current block; and in bi-prediction, two motion vectors, each pointing to its own reference picture are used to generate the prediction signal of the current block. Motion vectors and reference indices are sent to the decoder to identify where the prediction signal(s) of the current block come from. After intra or inter prediction, the mode decision stage 230 choose the best prediction mode for the current block, for example based on the rate-distortion optimization method. Based on the best prediction mode, predicted BPU 208 is generated and subtracted from the input video block.

Still referring to FIG. 2B, the prediction residual BPU 210 is sent to the transform stage 212 and quantization stage 214 to generate quantized transform coefficients 216. Quantized transform coefficients 216 will then be inverse quantized at inverse quantization stage 218 and inverse transformed at inverse transform stage 220 to obtain the reconstructed residual BPU 222. Predicted BPU 208 and reconstructed residual BPU 222 are added together to form prediction reference 224 before loop filtering, which is used to provide reference samples for intra prediction. Loop filtering such as deblocking, sample adaptive offset (SAO), and adaptive loop filter (ALF) may be applied at loop filter stage 232 to prediction reference 224 to form the reconstructed block, which is stored in buffer 234, and used to provide reference samples for inter prediction. Coding information, which is generated at mode decision stage 230, such as coding mode (intra or inter prediction), intra prediction mode, motion information, quantized residual coefficients, and the like, are sent to binary coding stage 226 to further reduce the bit rate before being packed into the output video bitstream 228.

Figure 3A:
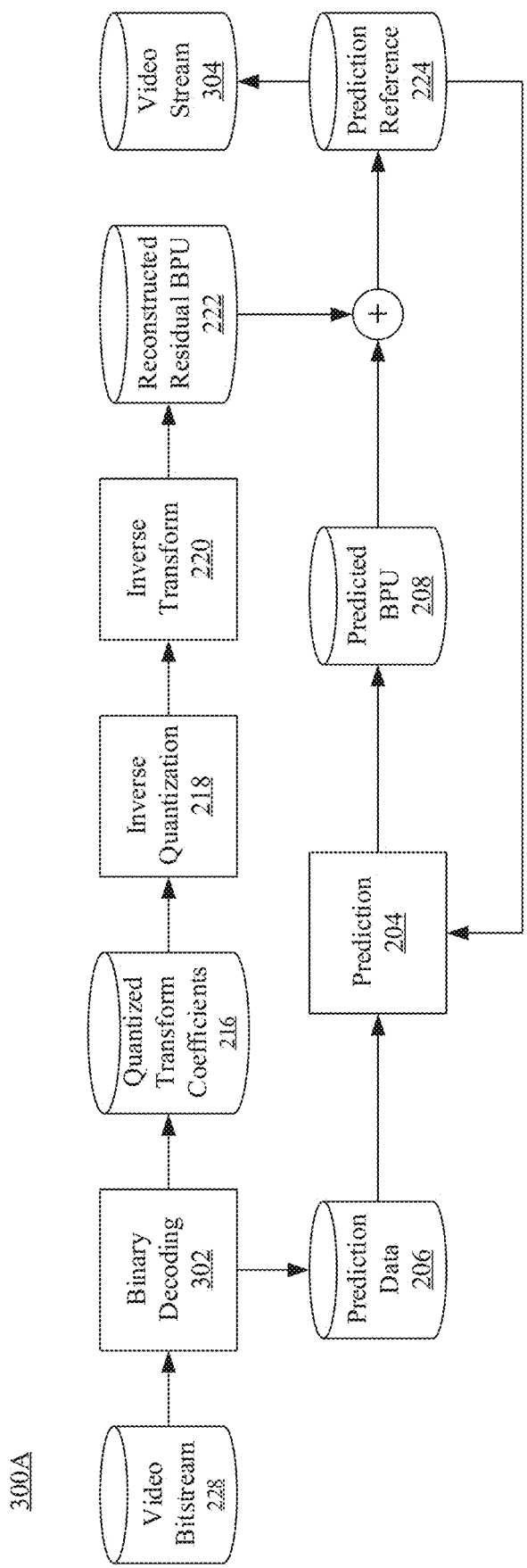
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. For example, the decoding process 300A can be performed by a decoder, such as image/video decoder 144 in FIG. 1. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
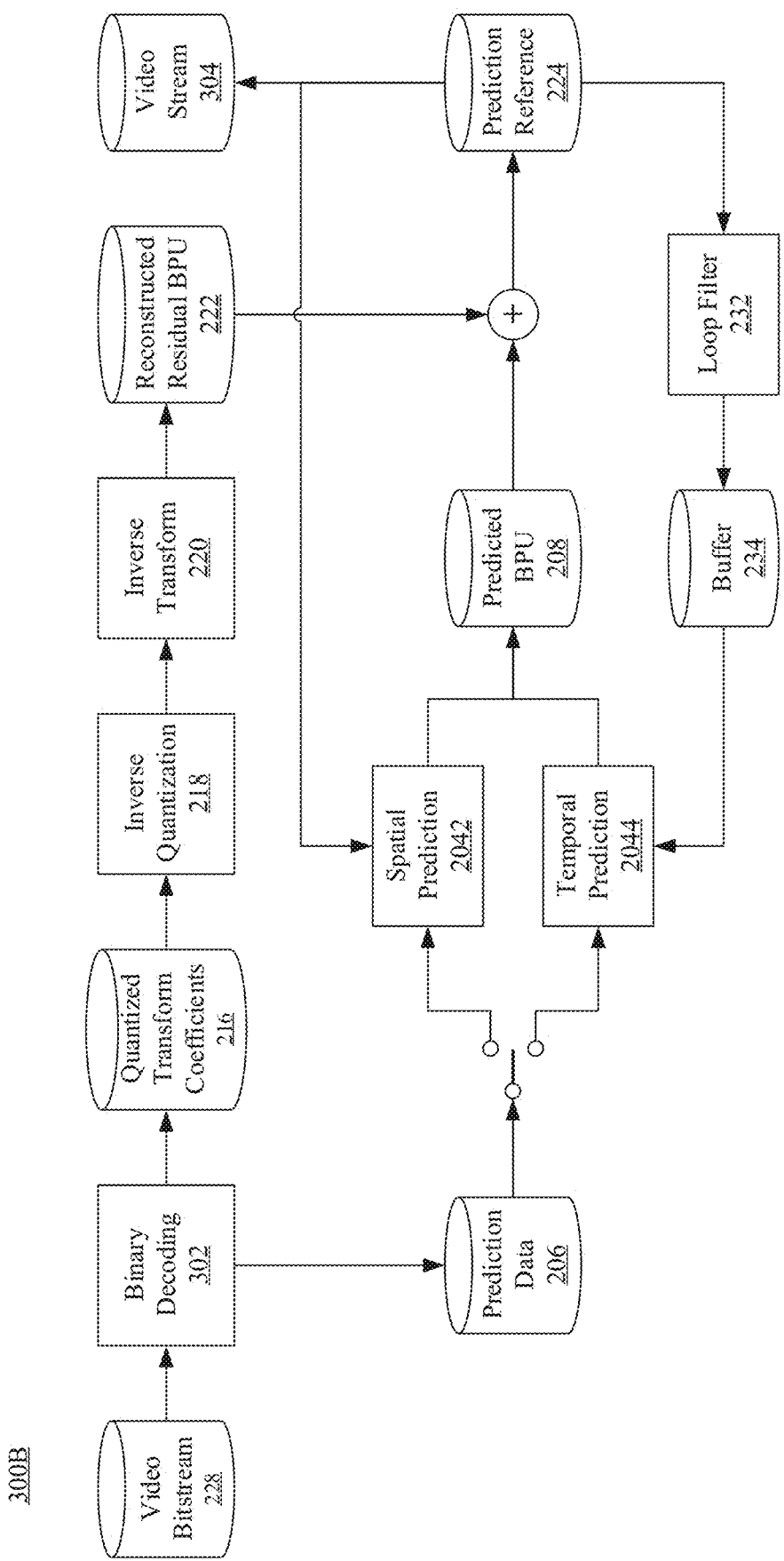
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. For example, the decoding process 300B can be performed by a decoder, such as image/video decoder 144 in FIG. 1. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength). Reconstructed pictures from buffer 234 are also sent to the display, such as a TV, a PC, a smartphone or a tablet to be displayed and viewed by the end-users.

Figure 4:
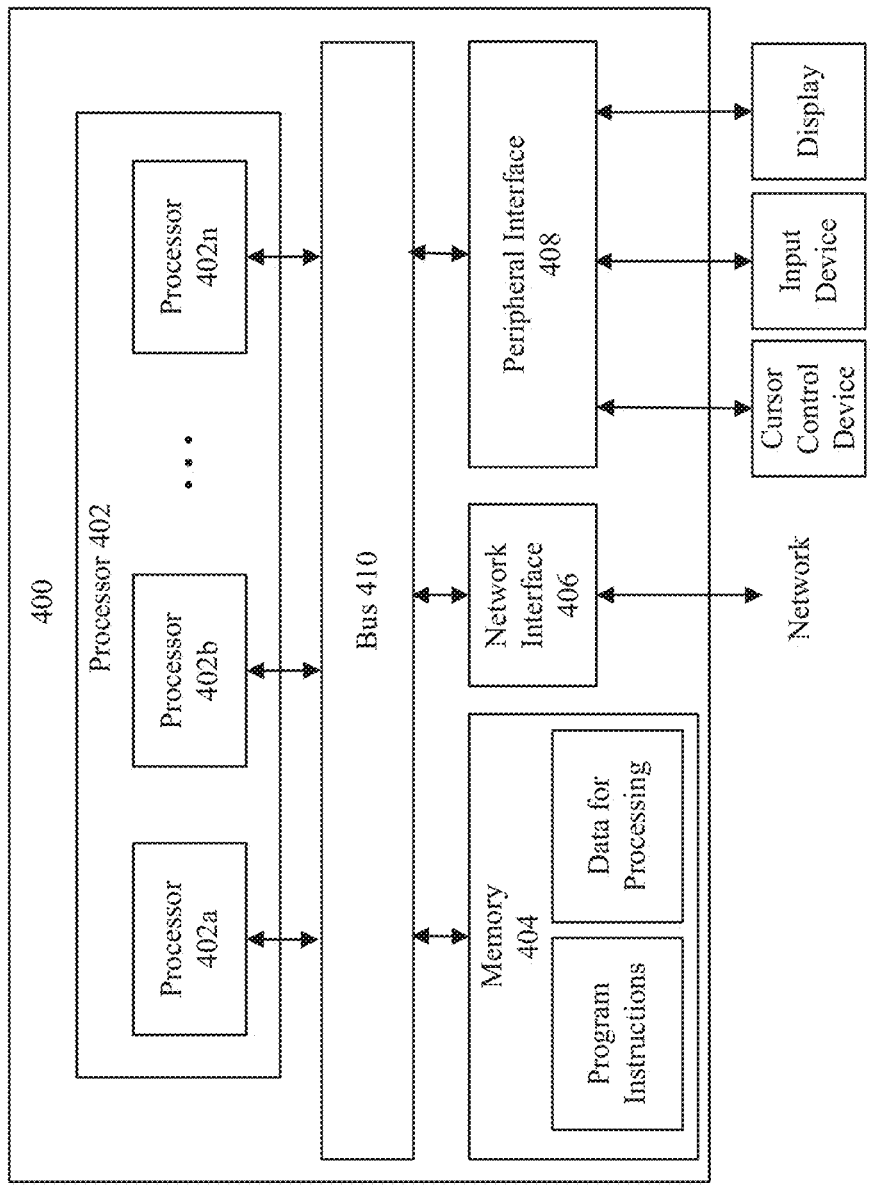
FIG. 4 is a block diagram of an exemplary apparatus for preprocessing or coding image data, according to some embodiments of the present disclosure.

Referring back to FIG. 1, each of image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, and/or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

To reduce the signal redundancy between difference components (e.g., luma samples and chroma samples), various cross-component prediction technologies can be used in video encoding and decoding.

For example, Cross Component Linear Model (CCLM) that uses a linear model to represent the relationship between luma and chroma component is adopted in the VVC. In this model, a chroma sample of a block can be predicted from the collocated reconstructed luma sample by a linear model as Eq. 1:

$$pred_C(i, j) = \alpha \cdot rec'_L(i, j) + \beta \quad \text{(Eq. 1)}$$

where $pred_C(i,j)$ represents the predicted chroma values of the chroma samples in the current block and $rec'_L(i,j)$ represents the reconstructed luma values of the collocated luma samples of the same block which are down-sampled for the case of non-4:4:4 color format; (i,j) is the coordinate of a sample in the block; parameters $\alpha$ and $\beta$ can represent a linear model and the values of the two parameters are derived based on reconstructed samples that are adjacent to the current block at both encoder and decoder side without explicit signaling.

In the context of the present disclosure, unless otherwise stated, "$pred_C(x,y)$" or "$pred_C(x,y)$" represents the predicted chroma value of a chroma sample having coordinates (x,y). Similarly, "$pred_L(x,y)$" or "$pred_L(x,y)$" represents the predicted luma value of a luma sample having coordinates (x,y). In addition, "$rec_C(x,y)$" or "$rec_C(x,y)$" represents the reconstructed chroma value of a chroma sample having coordinates (x,y), and "$rec_L(x,y)$" or "$rec_L(x,y)$" represents the reconstructed luma value of a luma sample having coordinates (x,y).

Three CCLM modes, which include CCLM_LT, CCLM_L and CCLM_T, are specified in VVC. These three modes differ with respect to the locations of the reconstructed adjacent samples that are used for linear model parameters ($\alpha$ and $\beta$) derivation. The above reconstructed adjacent samples are involved in the CCLM_T mode and the left reconstructed adjacent samples are involved in the CCLM_L mode. In the CCLM_LT mode, both above and left reconstructed adjacent samples are used.

In the signaling of the chroma intra mode, a flag indicating whether CCLM is applied is signaled first. If the flag is signaled as true, it is further signaled which of the three CCLM modes is applied.

In some embodiments, Down-sampling of the reconstructed luma samples is used in the cross component prediction. Specifically, to match the chroma sample locations for 4:2:0 or 4:2:2 color format video sequences, two types of down-sampling filter as shown in Eq. 2 and Eq. 3 can be applied to luma samples, both of which have a 2-to-1 down-sampling ratio in the horizontal and vertical directions. Based on a SPS-level flag, the 2-dimensional 6-tap or 5-tap filter is applied to the luma samples within the current block as well as its adjacent luma samples. When the SPS-level flag is equal to 1, it is specified that prediction processes operate in a manner designed for chroma sample positions that are not vertically shifted relative to corresponding luma sample positions and the 5-tap filter is used. When the SPS-level flag is equal to 0, it is specified that prediction processes operate in a manner designed for chroma sample positions that are shifted downward by 0.5 in units of luma samples relative to corresponding luma sample positions and the 6-tap filter is used. An exception happens if the top line of the current block is a CTU boundary. In this case, the one-dimensional 3-tap filter as shown in Eq. 4 can be applied to the above adjacent luma samples in order to avoid the usage of more than one luma line above the CTU boundary.

$$f1 = \begin{pmatrix} 0 & 1 & 0 \\ 1 & 4 & 1 \\ 0 & 1 & 0 \end{pmatrix} \quad \text{(Eq. 2)}$$

$$f2 = \begin{pmatrix} 1 & 2 & 1 \\ 1 & 2 & 1 \end{pmatrix} \quad \text{(Eq. 3)}$$

$$f3 = \begin{pmatrix} 1 & 2 & 1 \end{pmatrix} \quad \text{(Eq. 4)}$$

The process of down-sampling using the aforementioned filters can be represented by the following equations, where Eq. 5, Eq. 6, and Eq. 7 correspond to the filters in Eq. 2, Eq. 3, and Eq. 4, respectively.

$$rec'_L(i, j) = \quad \text{(Eq. 5)}$$

$$\left[ \begin{array}{c} rec_L(2i-1, 2j) + 2 \cdot rec_L(2i, 2j) + rec_L(2i+1, 2j) + \\ rec_L(2i-1, 2j+1) + 2 \cdot rec_L(2i, 2j+1) + \\ rec_L(2i+1, 2j+1) + 4 \end{array} \right] \gg 3$$

$$rec'_L(i, j) = \quad \text{(Eq. 6)}$$

$$\left[ \begin{array}{c} rec_L(2i, 2j-1) + rec_L(2i-1, 2j) + 4 \cdot rec_L(2i, 2j) \\ + rec_L(2i+1, 2j) + rec_L(2i, 2j+1) + 4 \end{array} \right] \gg 3$$

$$rec_L'(i, j) = \quad \text{(Eq. 7)}$$

$$[rec_L(2i-1, 2j) + 2 \cdot rec_L(2i, 2j) + rec_L(2i+1, 2j) + 2] \gg 2$$

where $rec_L$ represents the reconstructed luma values of the collocated luma samples and $rec'_L$ represents the reconstructed luma values of the down-sampled collocated luma samples.

The linear model parameters α and β are derived based on reconstructed adjacent chroma samples and their corresponding reconstructed luma samples which are down-sampled for the case of non-4:4:4 color format at both encoder and decoder side to avoid any signaling overhead.

Figure 5:
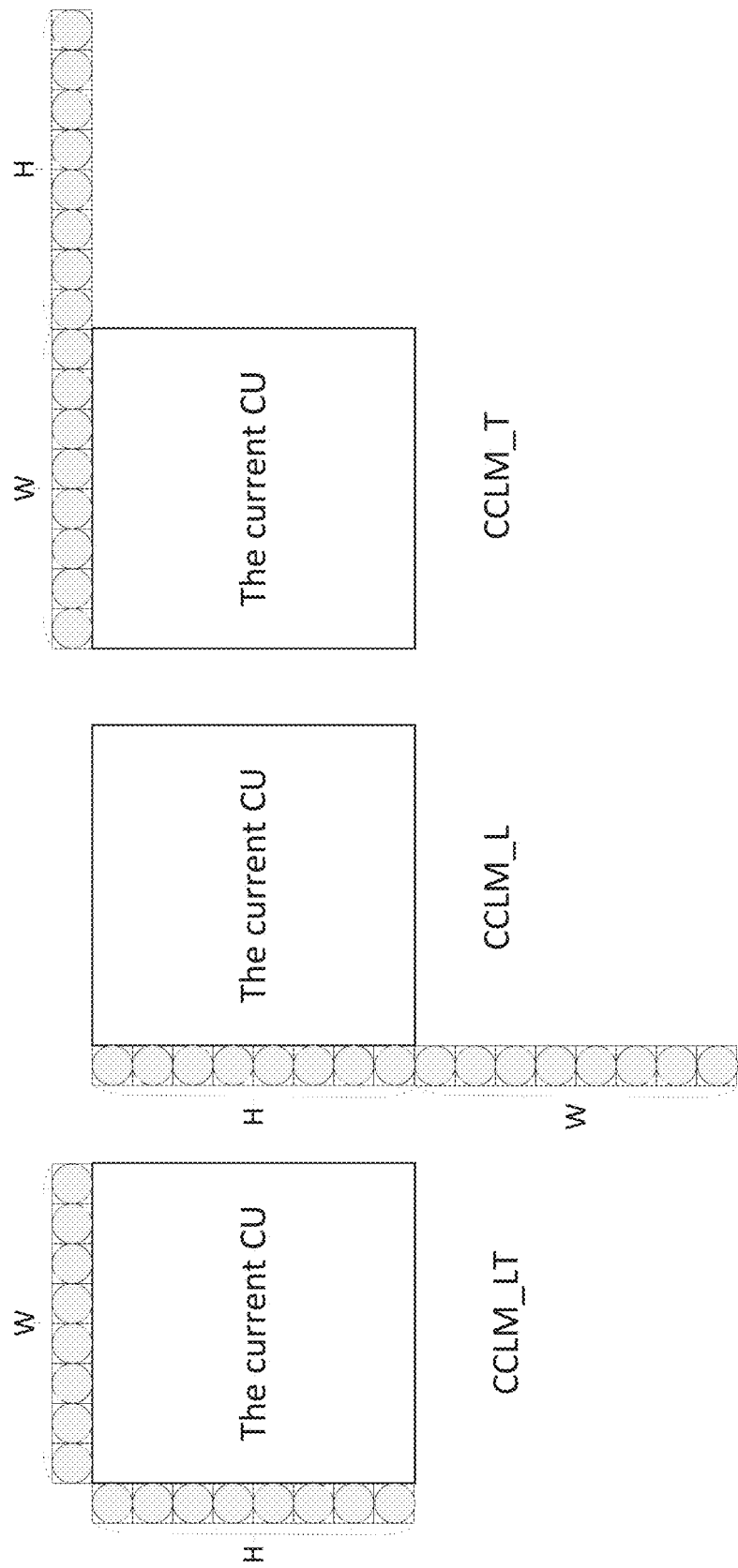
FIG. 5 illustrates samples used to derive linear model parameters, according to some embodiments of the present disclosure.

In the initially adopted version of the CCLM mode, the linear minimum mean square error (LMMSE) estimator was used for derivation of the parameters:

$$\alpha = \frac{N \cdot \sum_{n=0}^{N-1}(rec_C(n) \cdot rec'_L(n)) - \sum_{n=0}^{N-1} rec_C(n) \cdot \sum_{n=0}^{N-1} rec'_L(n)}{N \cdot \sum_{n=0}^{N-1}(rec'_L(n) \cdot rec'_L(n)) - \sum_{n=0}^{N-1} rec'_L(n) \cdot \sum_{n=0}^{N-1} rec'_L(n)} \quad \text{(Eq. 8)}$$

$$\beta = \frac{\sum_{n=0}^{N-1} rec_C(n) - \alpha \cdot \sum_{n=0}^{N-1} rec'_L(n)}{N} \quad \text{(Eq. 9)}$$

where $rec'_L(n)$ represents the reconstructed luma values of the down-sampled adjacent luma samples, $rec_C(n)$ represents the reconstructed chroma values of the adjacent chroma samples, and N is the total number of the used adjacent samples. For a W×H chroma CU, the CCLM_LT mode uses the above adjacent W samples and the left adjacent H samples, the CCLM_L mode uses the left adjacent (H+W) samples, and the CCLM_T mode uses the above adjacent (W+H) samples as shown in FIG. 5 where the used samples are marked as circles.

In some embodiments, in order to ensure that the number of the samples used to derive the linear model parameters is a power of 2, some method of increasing or decreasing samples is used.

Figure 6:
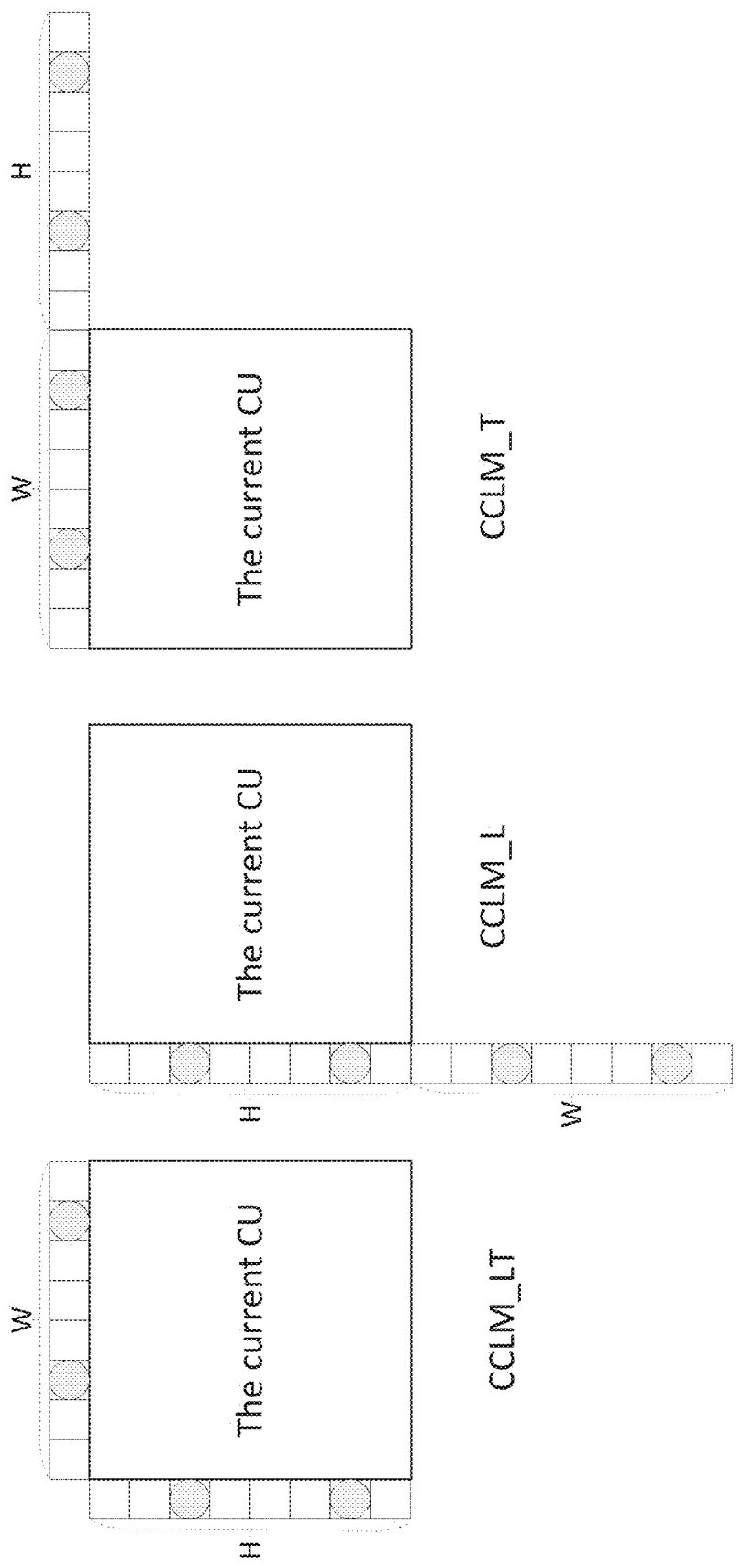
FIG. 6 is a decoder block diagram of a block-based hybrid video coding system, according to some embodiments of the present disclosure.

In the final design, however, only four samples are involved to reduce the computational complexity. For a W×H chroma block, the four samples used in the CCLM_LT mode are samples located at the positions of W/4 and 3 W/4 at the top boundary and at the positions of H/4 and 3H/4 at the left boundary. In CCLM_T and CCLM_L modes, the top and left boundary are extended to a size of (W+H) samples, and the four samples used for the model parameter derivation are located at the positions (W+H)/8, 3(W+H)/8, 5(W+H)/8 and 7(W+H)/8. For example, for an 8×8 chroma CU, the used samples are shown in FIG. 6 as the circles.

The four reconstructed down-sampled adjacent luma samples at the selected positions are compared four times to find two smaller values: $L_{min}^0$ and $L_{min}^1$, and two larger values: $L_{max}^0$ and $L_{max}^1$. Their corresponding reconstructed chroma sample values are denoted as $C_{min}^0$, $C_{min}^1$, $C_{max}^0$ and $C_{max}^1$. Then $L_{min}$, $L_{max}$, $C_{min}$ and $C_{max}$ are derived as:

$$L_{min} = (L_{min}^0 + L_{min}^1 + 1) \gg 1 \quad \text{(Eq. 10-1)}$$

$$L_{max} = (L_{mx}^0 + L_{max}^1 + 1) \gg 1 \quad \text{(Eq. 10-2)}$$

$$C_{min} = (C_{min}^0 + C_{min}^1 + 1) \gg 1 \quad \text{(Eq. 10-3)}$$

$$C_{max} = (C_{max}^0 + C_{max}^1 + 1) \gg 1 \quad \text{(Eq. 10-4)}$$

Finally, the linear model parameters α and β are obtained according to the following equations.

$$\alpha = \frac{C_{max} - C_{min}}{L_{max} - L_{min}} \quad \text{(Eq. 11)}$$

$$\beta = C_{min} - \alpha \cdot L_{min} \quad \text{(Eq. 12)}$$

The division operation to calculate parameter a is implemented with a look-up table. To reduce the memory required for storing the table, the diff value (difference between maximum and minimum values) and the parameter a are expressed by an exponential notation. For example, diff is approximated with a 4-bit significant part and an exponent. Consequently, the table for 1/diff is reduced into 16 elements for 16 values of the significand as follows:

$$DivTable[] = \{0, 7, 6, 5, 5, 4, 4, 3, 3, 2, 2, 1, 1, 1, 1, 0\} \quad \text{(Eq. 13)}$$

This would have a benefit of both reducing the complexity of the calculation as well as the memory size required for storing the needed tables.

Consistent with the disclosed embodiments, multi-model CCLM (MMLM) can be used for cross component prediction. Specifically, CCLM included in VVC is extended by introducing multi-models for a CU. That is, the samples within a CU are divided into different groups and each group has a liner model for prediction. Dependent on the adjacent reconstructed samples used in model derivation, multi-model CCLM also have different modes: MMLM_LT, MMLM_L and MMLM_T. The difference among the three mode is the same as the difference among CCLM_LT, CCLM_L and CCLM_T modes, that is the locations of the reconstructed adjacent samples that are used for linear model parameters (a and/l) derivation. In each MMLM mode, there can be more than one linear model between luma and chroma in a block. First, the reconstructed adjacent samples are classified into two classes using a threshold which is the average of the values of the luma reconstructed adjacent samples. Then each class is treated as an independent training set to derive a linear model, using the aforementioned LMMSE method. Subsequently, the reconstructed luma samples of the current block are also classified based on the same rule. Finally, the chroma samples are predicted by the reconstructed luma samples differently in different classes.

Consistent with the disclosed embodiments, a Gradient Linear Model (GLM) method can be used. Compared with CCLM, instead of down-sampling the reconstructed luma samples, the GLM utilizes luma sample gradients to derive the linear model. In other words, rather than using the filters in Eq. 2, Eq. 3, and Eq. 4, a gradient G is used in the CCLM process. The other designs of CCLM (e.g., parameter derivation, prediction sample linear transform) are kept unchanged.

Two modes of GLM are supported: a two-parameter GLM mode and a three-parameter GLM mode.

Compared with the CCLM, instead of down-sampled luma values, the two-parameter GLM utilizes luma sample gradients to derive the linear model. Specifically, when the two-parameter GLM is applied, the input to the CCLM process, i.e., the down-sampled luma samples L, are replaced by luma sample gradients G. The other parts of the CCLM (e.g., parameter derivation, prediction sample linear transform) are kept unchanged.

$$C = \alpha \cdot G + \beta \quad \text{(Eq. 14)}$$

In the three-parameter GLM, a chroma sample can be predicted based on both the luma sample gradients and down-sampled luma values with different parameters. The model parameters of the three-parameter GLM are derived from 6 rows and columns adjacent samples by the LDL decomposition based MSE minimization method as used in the CCCM.

$$C = \alpha_0 \cdot G + \alpha_1 \cdot L + \alpha_2 \cdot \beta \quad \text{(Eq. 15)}$$

Figure 7:
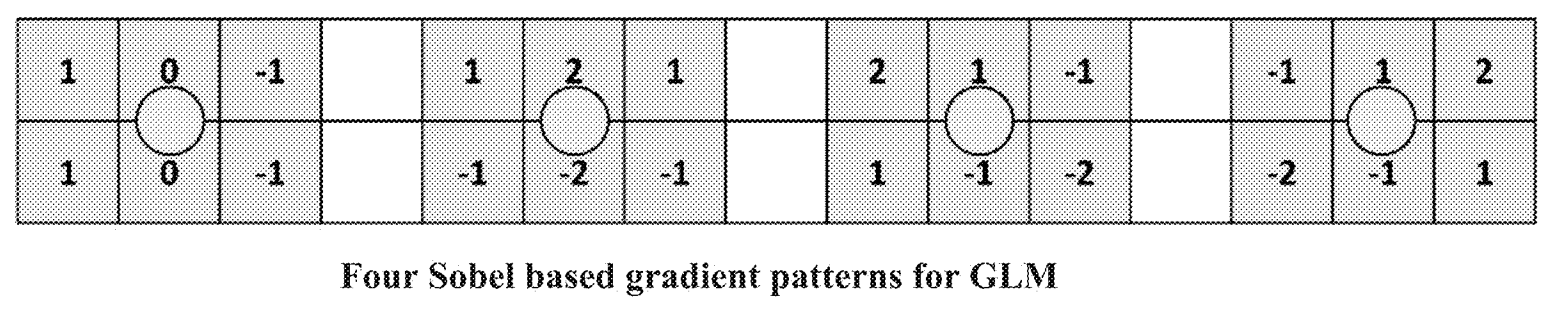

The gradient G can be calculated by one of four Sobel based gradient patterns which are shown in FIG. 7 and following formula $$g1 = \begin{pmatrix} 1 & 0 & -1 \\ 1 & 0 & -1 \end{pmatrix} \quad \text{(Eq. 16)}$$

$$g2 = \begin{pmatrix} 1 & 2 & 1 \\ -1 & -2 & -1 \end{pmatrix} \quad \text{(Eq. 17)}$$

$$g3 = \begin{pmatrix} 2 & 1 & -1 \\ 1 & -1 & -2 \end{pmatrix} \quad \text{(Eq. 18)}$$

$$g4 = \begin{pmatrix} -1 & 1 & 2 \\ -2 & -1 & 1 \end{pmatrix} \quad \text{(Eq. 19)}$$

By using the aforementioned gradient patterns, the gradient G can be calculated by the following formulas, where Eq. 20, Eq. 21, Eq. 22 and Eq. 23 correspond to the gradient patterns in Eq. 16, Eq. 17, Eq. 18 and Eq. 19, respectively.

$$G_L(i, j) = \begin{bmatrix} rec_L(2i-1, 2j) - rec_L(2i+1, 2j) + \\ rec_L(2i-1, 2j+1) - rec_L(2i+1, 2j+1) \end{bmatrix} \quad \text{(Eq. 20)}$$

$$G_L(i, j) = \quad \text{(Eq. 21)}$$
$$\begin{bmatrix} rec_L(2i-1, 2j) + 2 \cdot rec_L(2i, 2j) + rec_L(2i+1, 2j) - \\ rec_L(2i-1, 2j+1) - 2 \cdot rec_L(2i, 2j+1) - rec_L(2i+1, 2j+1) \end{bmatrix}$$

$$G_L(i, j) = \quad \text{(Eq. 22)}$$
$$\begin{bmatrix} 2 \cdot rec_L(2i-1, 2j) + rec_L(2i, 2j) - rec_L(2i+1, 2j) + \\ rec_L(2i-1, 2j+1) - rec_L(2i, 2j+1) - 2 \cdot rec_L(2i+1, 2j+1) \end{bmatrix}$$

$$G_L(i, j) = \quad \text{(Eq. 23)}$$
$$\begin{bmatrix} -rec_L(2i-1, 2j) + rec_L(2i, 2j) + 2 \cdot rec_L(2i+1, 2j) - \\ 2 \cdot rec_L(2i-1, 2j+1) - rec_L(2i, 2j+1) + rec_L(2i+1, 2j+1) \end{bmatrix}$$

The linear model parameters $\alpha$ and $f1$ are derived based on reconstructed adjacent chroma samples and the corresponding gradient G of the collocated reconstructed luma samples at both encoder and decoder side by the same method of the CCLM, e.g., LMMSE method. Then a chroma samples of a block can be predicted from the gradient of collocated reconstructed luma samples by a linear model as:

$$pred_C(i, j) = \alpha \cdot G_L(i, j) + \beta \quad \text{(Eq. 24)}$$

For signaling, when the CCLM mode is enabled to the current CU, two flags are signaled separately for Cb and Cr component to indicate whether GLM is enabled to the component; if the GLM is enabled for one component, one syntax element is further signaled to select one of four gradient patterns for gradient calculation. In some embodiments, a two bits fixed-length code is used to code the syntax element.

In some embodiments, the GLM is only available for some of the CCLM modes. For example, the GLM is only available for CCLM_LT mode, that is, for CCLM_LT mode, some syntax elements are signaled to indicate whether GLM is enabled and which gradient pattern is used. If GLM is enabled for the CCLM_LT mode, the gradient G of the above and left adjacent reconstructed luma samples is used to replace the down-sampled reconstructed adjacent luma samples in the linear model parameters derivation process, and only a signal linear model is used in the current block. If GLM is disabled for the CCLM_LT mode, the original CCLM_LT mode is applied. For other CCLM modes (i.e., CCLM_L, CCLM_T and three MMLM modes), there is no change. For another example, the GLM is only available for CCLM_LT mode and MMLM_LT mode. For another example, the GLM is only available for CCLM_LT mode, CCLM_L mode and CCLM_T mode. For another example, the GLM is available for all the six CCLM modes.

When the GLM is applied to a MMLM mode, a multi-model GLM (MMGLM) method is used. In MMGLM mode, there can be more than one linear model between gradient G and chroma in a block. First, the gradients of the reconstructed adjacent samples are classified into two classes using a threshold which is the average of the values of gradients of the luma reconstructed adjacent samples. Then each class is treated as an independent training set to derive a linear model, using the aforementioned LMMSE method. Subsequently, the gradients of the reconstructed luma samples of the current block are also classified based on the same rule. Finally, the chroma samples are predicted by the gradients of the reconstructed luma samples differently in different classes.

In some embodiments, 16 gradient patterns are supported for GLM method. That is, the gradient G can be calculated by one of the 16 gradient patterns as the following formulas. A syntax element is signaled to indicate which of the gradient pattern is used.

$$g1 = \begin{pmatrix} 1 & 0 & -1 \\ 1 & 0 & -1 \end{pmatrix} \quad \text{(Eq. 25)}$$

$$g2 = \begin{pmatrix} 1 & 2 & 1 \\ -1 & -2 & -1 \end{pmatrix} \quad \text{(Eq. 26)}$$

$$g3 = \begin{pmatrix} 2 & 1 & -1 \\ 1 & -1 & -2 \end{pmatrix} \quad \text{(Eq. 27)}$$

$$g4 = \begin{pmatrix} -1 & 1 & 2 \\ -2 & -1 & 1 \end{pmatrix} \quad \text{(Eq. 28)}$$

$$g5 = \begin{pmatrix} 0 & 2 & -2 \\ 0 & 1 & -1 \end{pmatrix} \quad \text{(Eq. 29)}$$

$$g6 = \begin{pmatrix} 1 & 1 & 1 \\ -1 & -1 & -1 \end{pmatrix} \quad \text{(Eq. 30)}$$

$$g7 = \begin{pmatrix} 1 & 1 & -1 \\ 1 & -1 & -1 \end{pmatrix} \quad \text{(Eq. 31)}$$

$$g8 = \begin{pmatrix} -1 & 1 & 1 \\ -1 & -1 & 1 \end{pmatrix} \quad \text{(Eq. 32)}$$

-continued $$g9 = \begin{pmatrix} 0 & 1 & -1 \\ 0 & 1 & -1 \end{pmatrix} \quad \text{(Eq. 33)}$$

$$g10 = \begin{pmatrix} 0 & 1 & 1 \\ 0 & -1 & -1 \end{pmatrix} \quad \text{(Eq. 34)}$$

$$g11 = \begin{pmatrix} 1 & 1 & 0 \\ 0 & -1 & -1 \end{pmatrix} \quad \text{(Eq. 35)}$$

$$g12 = \begin{pmatrix} 0 & 1 & 1 \\ -1 & -1 & 0 \end{pmatrix} \quad \text{(Eq. 36)}$$

$$g13 = \begin{pmatrix} 1 & -1 & 0 \\ 1 & -1 & 0 \end{pmatrix} \quad \text{(Eq. 37)}$$

$$g14 = \begin{pmatrix} 1 & 1 & 0 \\ -1 & -1 & 0 \end{pmatrix} \quad \text{(Eq. 38)}$$

$$g15 = \begin{pmatrix} 1 & 2 & 0 \\ 0 & -2 & -1 \end{pmatrix} \quad \text{(Eq. 39)}$$

$$g16 = \begin{pmatrix} 0 & 2 & 1 \\ -1 & -2 & 0 \end{pmatrix} \quad \text{(Eq. 40)}$$

In some embodiments, the down-sampled reconstructed luma sample and the gradient of the reconstructed luma samples are used together to derive the linear model. The linear model parameters α and β are derived based on reconstructed adjacent chroma samples and the corresponding gradients G of the collocated reconstructed luma samples and the down-sampled reconstructed luma sample at both encoder and decoder side by the same method of the CCLM, e.g., LMMSE method. The value of the down-sampled reconstructed luma sample can be obtained by one of the aforementioned down-sampled filters. Then a chroma samples of a block can be predicted from the gradient of collocated reconstructed luma samples and the value of the down-sampled reconstructed luma sample by a linear model as:

$$pred_C(i, j) = \alpha \cdot (G_L(i, j) + rec'_L(i, j)) + \beta \quad \text{(Eq. 41)}$$

In some embodiments, a flag is signaled to indicate which GLM method in Eq. 24 or Eq. 41 is used.

Consistent with the disclosed embodiments, convolutional cross-component intra prediction model can be used for cross component prediction. In this method, convolutional cross-component model (CCCM) is applied to predict chroma samples from reconstructed luma samples in a similar spirit as done by the current CCLM modes. As with CCLM, the reconstructed luma samples are downsampled to match the lower resolution chroma grid when chroma sub-sampling is used. Similar to CCLM top, left or top and left reference samples are used as templates for model derivation.

Also, similarly to CCLM, there is an option of using a single model or multi-model variant of CCCM. The multi-model variant uses two models, one model derived for samples above the average luma reference value and another model for the rest of the samples (following the spirit of the CCLM design). Multi-model CCCM mode can be selected for PUs which have at least 128 reference samples available.

Figure 8:
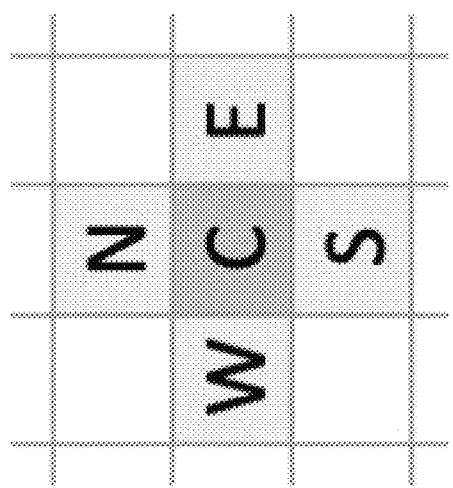
FIG. 8 shows a spatial part of a convolutional filter, according to some embodiments of the present disclosure.

The convolutional cross-component intra prediction model can use various types of convolutional filters. The convolutional 7-tap filter consist of a 5-tap plus sign shape spatial component, a nonlinear term and a bias term. As shown in FIG. 8, the input to the spatial 5-tap component of the filter consists of a center (C) luma sample which is collocated with the chroma sample to be predicted and its above/north (N), below/south (S), left/west (W) and right/east (E) neighbors as illustrated below.

The nonlinear term P is represented as power of two of the center luma sample C and scaled to the sample value range of the content:

$$P = (C * C + midVal) >> bitDepth \quad \text{(Eq. 42)}$$

That is, for 10-bit content it is calculated as:

$$P = (C * C + 512) >> 10 \quad \text{(Eq. 43)}$$

The bias term B represents a scalar offset between the input and output (similarly to the offset term in CCLM) and is set to middle chroma value (512 for 10-bit content).

Output of the filter is calculated as a convolution between the filter coefficients ci and the input values and clipped to the range of valid chroma samples:

$$predChromaVal = c0C + c1N + c2S + c3E + c4W + c5P + c6B \quad \text{(Eq. 44)}$$

Figure 9:
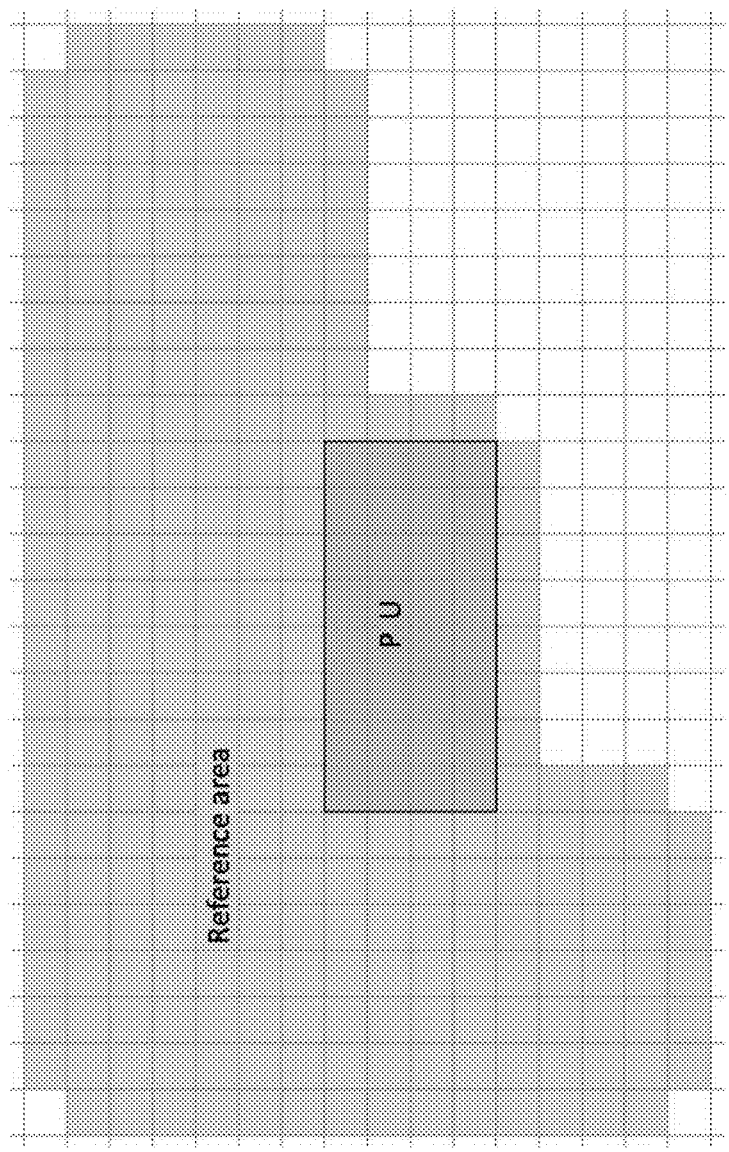
FIG. 9 shows a reference area (with its paddings) used to derive filter coefficients, according to some embodiments of the present disclosure.

The filter coefficients Ci are calculated by minimising MSE between predicted and reconstructed chroma samples in the reference area. FIG. 9 illustrates the reference area which consists of 6 lines of chroma samples above and left of the PU. Reference area extends one PU width to the right and one PU height below the PU boundaries. Area is adjusted to include only available samples. The extensions to the area shown in blue are needed to support the "side samples" of the plus shaped spatial filter and are padded when in unavailable areas.

The MSE minimization is performed by calculating auto-correlation matrix for the luma input and a cross-correlation vector between the luma input and chroma output. Autocor-relation matrix is LDL decomposed and the final filter coefficients are calculated using back-substitution. The process follows roughly the calculation of the ALF filter coefficients in ECM, however LDL decomposition was chosen instead of Cholesky decomposition to avoid using square root operations. In some embodiments, a Gaussian elimination-based approach can be used to calculate the filter coefficients.

The autocorrelation matrix is calculated using the reconstructed values of luma and chroma samples. These samples are full range (e.g., between 0 and 1023 for 10-bit content) resulting in relatively large values in the autocorrelation matrix. This requires high bit depth operation during the model parameters calculation. It is proposed to remove fixed offsets from luma and chroma samples in each PU for each model. This is driving down the magnitudes of the values used in the model creation and allows reducing the precision needed for the fixed-point arithmetic. As a result, 16-bit decimal precision is proposed to be used instead of the 22-bit precision of the original CCCM implementation.

Reference sample values just outside of the top-left corner of the PU are used as the offsets (offsetLuma, offsetCb and offsetCr) for simplicity. The samples values used in both model creation and final prediction (i.e., luma and chroma in the reference area, and luma in the current PU) are reduced by these fixed values, as follows:

$$C' = C - \text{offsetLuma} \quad \text{(Eq. 45)}$$

$$N' = N - \text{offsetLuma} \quad \text{(Eq. 46)}$$

$$S' = S - \text{offsetLuma} \quad \text{(Eq. 47)}$$

$$E' = E - \text{offsetLuma} \quad \text{(Eq. 48)}$$

$$W' = W - \text{offsetLuma} \quad \text{(Eq. 49)}$$

$$P' = \text{nonLinear}(C') \quad \text{(Eq. 50)}$$

$$B = \text{midvalue} = 1 << (\text{bitDepth} - 1) \quad \text{(Eq. 51)}$$

and the chroma value is predicted using the following equation, where offsetChroma is equal to offsetCr and offsetCb for Cr and Cb components, respectively:

$$\text{predChromaVal} = \quad \text{(Eq. 52)}$$
$$c0C' + c1N' + c2S' + c3E' + c4W' + c5P' + c6B'$$

In order to avoid any additional sample level operations, the luma offset is removed during the luma reference sample interpolation. This can be done, for example, by substituting the rounding term used in the luma reference sample interpolation with an updated offset including both the rounding term and the offsetLuma. The chroma offset can be removed by deducting the chroma offset directly from the reference chroma samples. As an alternative way, impact of the chroma offset can be removed from the cross-component vector giving identical result. In order to add the chroma offset back to the output of the convolutional prediction operation the chroma offset is added to the bias term of the convolutional model.

The process of CCCM model parameter calculation requires division operations. Division operations are not always considered implementation friendly. The division operation is replaced with multiplication (with a scale factor) and shift operation, where scale factor and number of shifts are calculated based on denominator similar to the method used in calculation of CCLM parameters.

Consistent with the disclosed embodiments, methods are proposed to signal the CCCM. Usage of the CCCM mode is signalled with a CABAC coded PU level flag. One new CABAC context was included to support this. When it comes to signalling, CCCM is considered a sub-mode of CCLM. That is, the CCCM flag is only signalled if intra prediction mode is LM_CHROMA.

Figure 10:
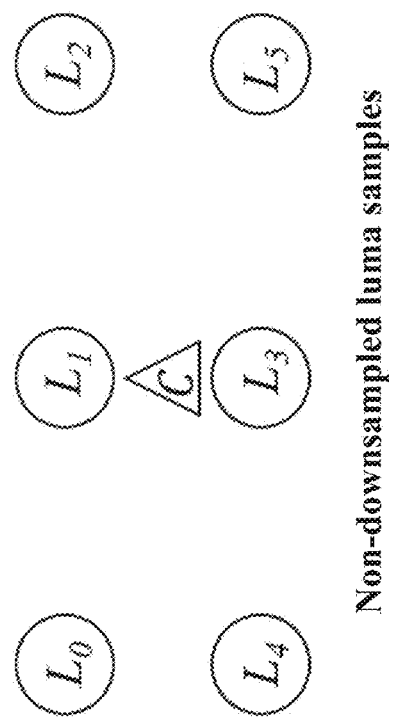
FIG. 10 shows a plurality of non-downsampled luma samples, according to some embodiments of the present disclosure.

Consistent with the disclosed embodiments, non-downsampled luma samples can be used for CCCM. As shown in Eq. 53, CCCM mode with 3×2 filter using non-downsampled luma samples is used, which consists of 6-tap spatial terms, four nonlinear terms and a bias term. The 6-tap spatial terms correspond to 6 neighboring luma samples (i.e., L0, L1, ..., L5) around the chroma sample (i.e., C) to be predicted, the four non-linear terms are derived from the samples L0, L1, L2, and L3 as shown in FIG. 10.

$$C = \sum_{i=0}^{5} \alpha_i \cdot (L_i - \text{offsetLuma}) + \quad \text{(Eq. 53)}$$
$$\sum_{i=6}^{9} \alpha_i \cdot \left( \left( (L_{i-4} - \text{offsetLuma})^2 + \beta \right) \gg \text{bitDepth} \right) +$$
$$\alpha_{10} \cdot \beta + \text{offsetChroma}$$

where $\alpha_i$ is the coefficient, $\beta$ is the offset. Same to the existing CCCM design, up to 6 lines/columns of chroma samples above and left to the current CU are applied to derive the filter coefficients. The filter coefficients are derived based on the same LDL decomposition method used in CCCM. The proposed method is signaled as an additional CCCM model besides the existing one, when the CCCM is selected, one single flag is signaled and used for both two chroma components to indicate whether the default CCCM model or the proposed CCCM model is applied. Additionally, SPS signaling is introduced to indicate whether the CCCM using non-downsampled luma samples is enabled.

Consistent with the disclosed embodiments, a gradient and location based convolutional cross-component model (GL-CCCM) can be used. This method maps luma values into chroma values using a filter with inputs consisting of one spatial luma sample, two gradient values, two location information, a nonlinear term, and a bias term. The GL-CCCM method uses gradient and location information instead of the 4 spatial neighbor samples used in the CCCM filter. The GL-CCCM filter used for the prediction is:

$$\text{predChromaVal} = c_0 C + c_1 G_y + c_2 G_x + c_3 Y + c_4 X + c_5 P + c_6 B \quad \text{(Eq. 54)}$$

where Gy and Gx are the vertical and horizontal gradients, respectively, and are calculated as Eq. 55 and Eq. 56:

$$G_y = (2N + NW + NE) - (2S + SW + SE) \quad \text{(Eq. 55)}$$

$$G_x = (2W + NW + SW) - (2E + NE + SE) \quad \text{(Eq. 56)}$$

Figure 11:
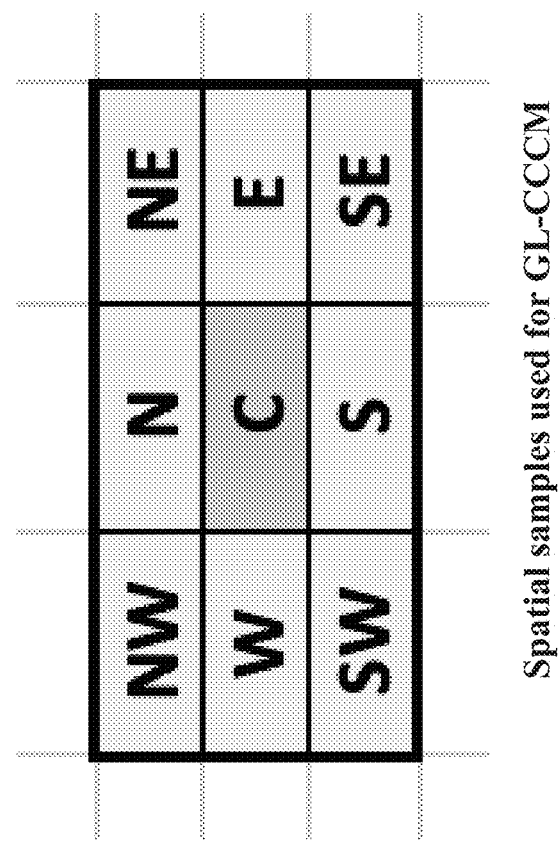
FIG. 11 shows spatial samples used for Gradient and Location based convolutional cross-component model (GL-CCCM), according to some embodiments of the present disclosure.

FIG. 11 shows the spatial samples used for gradient and location based convolutional cross-component model (GL-CCCM).

Moreover, the Y and X are the spatial coordinates of the center luma sample.

The rest of the parameters are the same as CCCM tool. The reference area for the parameter calculation is the same as CCCM method.

The usage of the mode is signalled with a CABAC coded PU level flag. When it comes to signalling, GL-CCCM is considered a sub-mode of CCCM. That is, the GL-CCCM flag is only signalled if original CCCM flag is true.

Similar to the CCCM, GL-CCCM tool has 6 modes for calculating the parameters:

Single-model GL-CCCM from above and left templates
Single-model GL-CCCM from above template
Single-model GL-CCCM from left template
Multi-model GL-CCCM from above and left templates
Multi-model GL-CCCM from above template
Multi-model GL-CCCM from left template The encoder performs SATD search for the 6 GL-CCCM modes along with the existing CCCM modes to find the best candidates for full RD tests.

Figure 12:
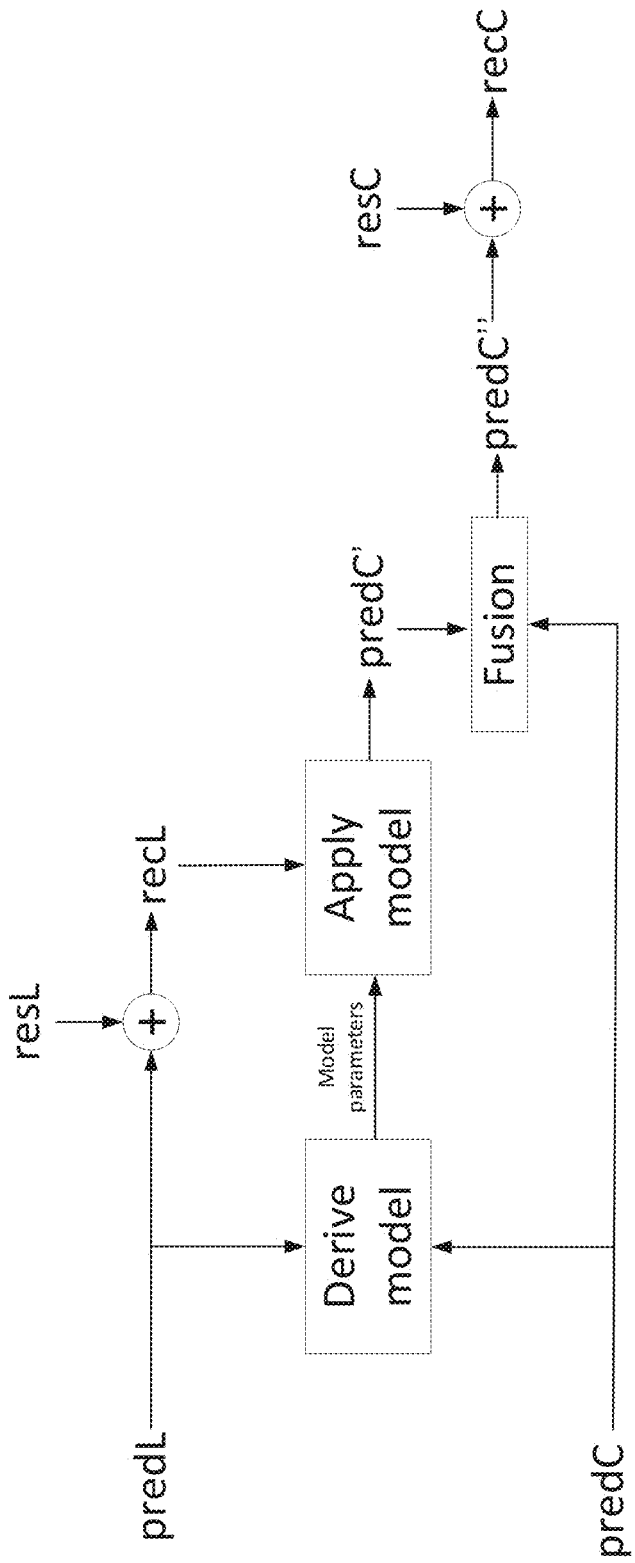
FIG. 12 shows a process of Cross Component Residual Model (CCRM) in decoder side, according to some embodiments of the present disclosure.

Consistent with the disclosed embodiments, a cross-component residual model (CCRM) method can be used. CCRM is a cross-component prediction tool for inter slices which predicts chroma samples from reconstructed luma samples when the current block uses inter prediction or intra block copy (IBC). FIG. 12 illustrates the process of CCRM in decoder side. Specifically, the current block first uses a inter prediction mode or an IBC mode to obtain predicted luma values of luma samples in the current block predL and predicted chroma values of chroma samples in the current block predC (where the predC can represents predicted Cb values or predicted Cr values, which is also referred to as "original" predicted chroma value). Herein, the predicted luma values and the predicted chroma values may be referred to as "predicted values" for simplicity and can be distinguished according to the context. By performing the CCRM method, a cross-component model is derived using predL and predC. Then the derived cross-component model is applied to the reconstructed luma values of luma samples in the current block recL, which is obtained by plus the luma residual to predL, to generate another predicted chroma value of chroma samples in the current block predC', which is also referred to as predicted chroma value. Finally, the predC and the predC' are fused (i.e. weighted average) to generate the final predicted chroma values of chroma samples in the current block predC" (also referred to as "finalized" predicted chroma value) as shown in Eq. 57, where $w_0$ is equal to 1, $w_1$ is equal to 3, offset is equal to 2 and shift is equal to 2 according to a CCRM proposal. According to example embodiments, there is no fusion process in CCRM, and the predC' is used as the final predicted chroma values of chroma samples in the current block.

$$predC'' = (w_0 * predC + w_1 * predC' + \text{offset}) \gg \text{shift} \quad \text{(Eq. 57)}$$

In some embodiments, a n-tap filter can be used as the cross-component model in CCRM, which contains n−2 spatial luma samples, a nonlinear term, and a bias term. The value of n and the positions of the used luma samples are determined based on the video color format.

For 4:4:4 color format, the value of n is equal to 3, which means only 1 spatial luma sample is used in the cross-component model. For example, a chroma sample with coordinates (i,j) can be predicted as shown in Eq. 58, where i and j represent the horizontal distance and vertical distance between the current chroma sample and the chroma sample in the upper left corner of the current frame, respectively. In Eq. 58, recL(i,j) is the reconstructed luma value of the spatial luma sample corresponding to the current chroma sample; P is the nonlinear term which can be equal to $((recL(i,j)+1)\gg1)^2$; B is a bias which can be equal to $1\ll(\text{bitDepth}-1)$ according to example embodiments; and c0 to c2 are the 3 model parameters. In this disclosure, it is proposed that P can be equal to $(recL(i,j))^2$ for 4:4:4 color format.

$$predC'(i, j) = c0 * recL(i, j) + c1 * P + c2 * B \quad \text{(Eq. 58)}$$

For 4:2:2 color format, the value of n is equal to 5, which means 3 spatial luma samples are used in the cross-component model. For example, a chroma sample with coordinates (i,j) can be predicted as shown in Eq. 59, where recL(2i,j), recL(2i−1,j) and recL(2i+1,j) are the reconstructed luma values of the spatial luma samples corresponding to the current chroma sample; P is the nonlinear term which can be equal to $((recL(2i,j)+1)\gg1)^2$; B is a bias which can be equal to $1\ll(\text{bitDepth}-1)$ according to example embodiments; and c0 to c4 are the 5 model parameters. In this disclosure, it is proposed that P can be equal to $(recL(2i,j))$ for 4:2:2 color format.

$$predC'(i, j) = c0 * recL(2i, j) + \quad \text{(Eq. 59)}$$
$$c1 * recL(2i - 1, j) + c2 * recL(2i + 1, j) + c3 * P + c4 * B$$

For the most widely used 4:2:0 video color format, the value of n and the positions of the used luma samples are further determined based a flag sps_chroma_vertical_collocated_flag. The flag equal to 1 specifies that prediction processes operate in a manner designed for chroma sample positions that are not vertically shifted relative to corresponding luma sample positions. The flag equal to 0 specifies that prediction processes operate in a manner designed for chroma sample positions that are shifted downward by 0.5 in units of luma samples relative to corresponding luma sample positions.

Figure 13:
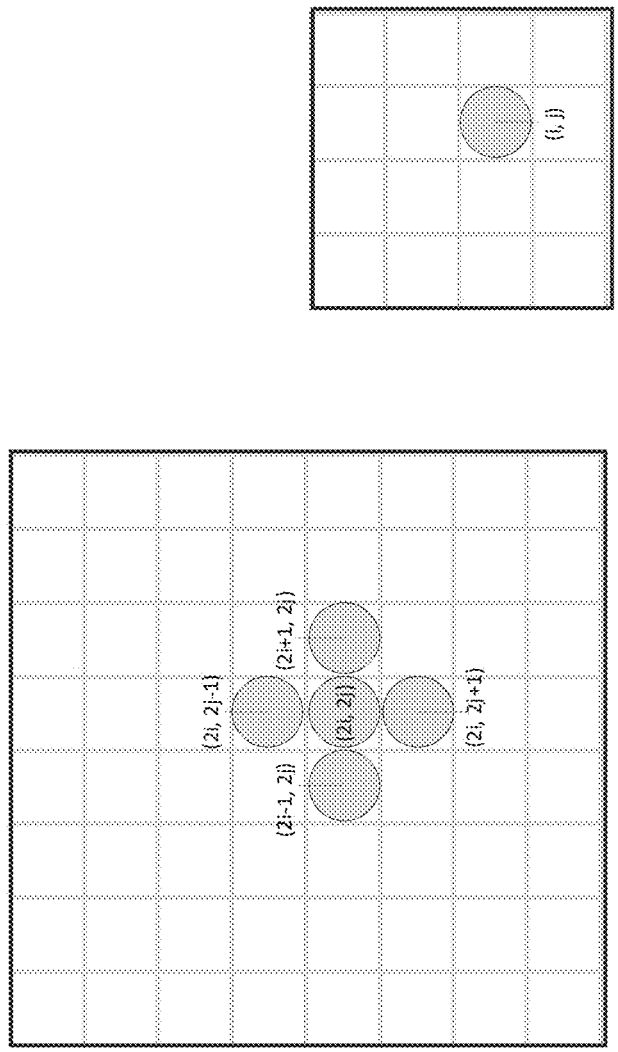
FIG. 13 shows a corresponding relationship between chroma and luma samples, according to some embodiments of the present disclosure.

For 4:2:0 video color format, if sps_chroma_vertical_collocated_flag is equal to 1, the value of n is equal to 7, which means 5 spatial luma samples are used in the cross-component model. For example, a chroma sample with coordinates (i,j) can be predicted as shown in Eq. 60, where recL(2i, 2j), recL(2i−1,2j), recL(2i+1,2j), recL(2i, 2j+1) and recL(2i, 2j−1) are the reconstructed luma values of the 5 spatial luma samples corresponding to the current chroma sample, which can be shown in FIG. 13; P is the nonlinear term which can be equal to $((recL(2i, 2j)+recL(2i, 2j+1)+1)\gg1)^2$; B is a bias which can be equal to $1\ll(\text{bitDepth}-1)$ according to example embodiments; and c0 to c6 are the 7 model parameters. In this disclosure, it is proposed that P can be equal to $(recL(2i, 2j))^2$ for 4:2:0 color format when sps_chroma_vertical_collocated_flag is equal to 1.

$$predC'(i, j) = \quad \text{(Eq. 60)}$$
$$c0 * recL(2i, 2j) + c1 * recL(2i - 1, 2j) + c2 * recL(2i + 1, 2j) +$$
$$c3 * recL(2i, 2j + 1) + c4 * recL(2i, 2j - 1) + c5 * P + c6 * B$$

Figure 14:
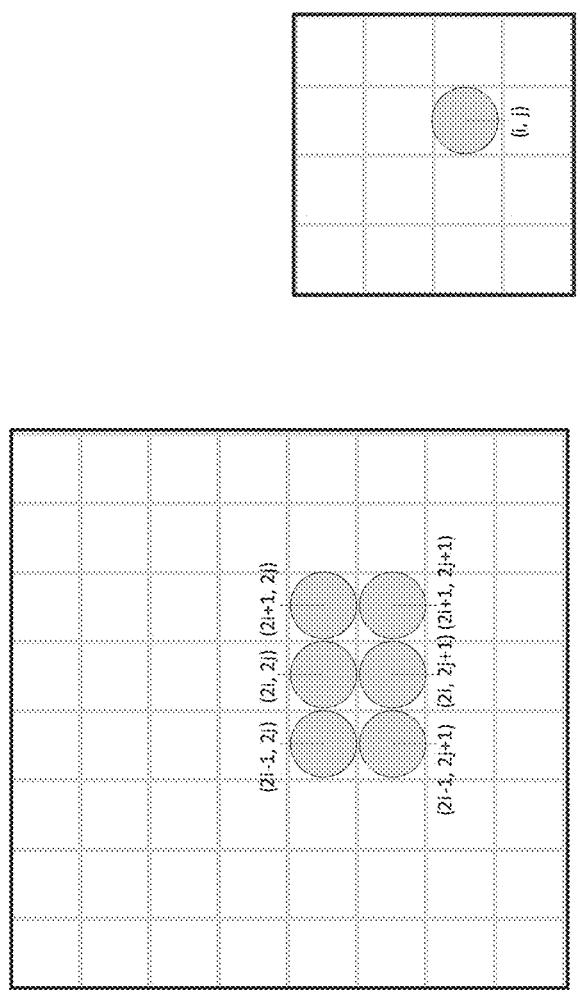
FIG. 14 shows another corresponding relationship between chroma and luma samples, according to some embodiments of the present disclosure.

For 4:2:0 video color format, if sps_chroma_vertical_collocated_flag is equal to 0, the value of n is equal to 8, which means 6 spatial luma samples are used in the cross-component model. For example, a chroma sample with coordinates (i,j) can be predicted as shown in Eq. 61, where recL(2i, 2j), recL(2i−1,2j), recL(2i+1,2j), recL(2i, 2j+1), recL(2i, 2j+1) and recL(2i+1,2j+1) are the reconstructed luma values of the 6 spatial luma samples corresponding to the current chroma sample, which can be shown in FIG. 14; P is the nonlinear term which can be equal to $((recL(2i, 2j)+recL(2i, 2j+1)+1)\gg1)^2$; B is a bias which can be equal to $1\ll(\text{bitDepth}-1)$ according to example embodiments; and c0 to c7 are the 8 model parameters.

$$predC'(i, j) = c0 * recL(2i, 2j) + c1 * recL(2i - 1, 2j) + \quad \text{(Eq. 61)}$$
$$c2 * recL(2i + 1, 2j) + c3 * recL(2i, 2j + 1) +$$
$$c4 * recL(2i - 1, 2j + 1) + c5 * recL(2i + 1, 2j + 1) + c6 * P + c7 * B$$

According to example embodiments, an offset is subtracted from each reconstructed luma value of luma sample in applying the CCRM model to predict the current chroma sample. For example, by using the offset, Eq. 61 can be rewrote as Eq. 62, where P can be equal to ((recL(2i, 2j)−offset+recL(2i, 2j+1)−offset+1)$\gg$1)$^2$, offset can be equal to the average value of the predicted luma values of the current luma block obtained by the inter prediction mode or the IBC mode (i.e. the average value of predL).

$$predC'(i, j) = c0*(recL(2i, 2j) - \text{offset}) + \quad \text{(Eq. 62)}$$
$$c1*(recL(2i-1, 2j) - \text{offset}) + c2*recL(2i+1, 2j) - \text{offset}) +$$
$$c3*(recL(2i, 2j+1) - \text{offset}) +$$
$$c4*(recL(2i-1, 2j+1) - \text{offset}) +$$
$$c5*(recL(2i+1, 2j+1) - \text{offset}) + c6*P + c7*B$$

The model parameters (i.e., filter coefficients) are derived using a division-free Gaussian elimination method to minimize the Mean Square Error (MSE) based on predL and predC.

During deriving and applying the CCRM model, when the used luma sample is out of the current block, the closest luma sample that within the block is used instead.

If the current block has more than 256 chroma samples, the chroma samples are down-sampled to obtain 256 chroma samples for CCRM model deriving.

A TU level flag is signaled into the bitstream to indicate whether the CCRM method is used to a inter prediction mode or IBC mode coded block when the luma Cbf flag is not equal to zero.

Conventional CCRM approaches can be used to remove the redundancy between luma and chroma component for inter coded blocks by a single conventional model. However, the single model may not be suitable for all samples in the coding block. In some embodiments of the present disclosure, it may be more reliable to use multiple models to describe the relationship between luma and chroma samples in the coding block especially when it has complex texture features.

Moreover, the current CCRM approaches may simply use luma samples as the input, while the gradient information and location information are not used. Only using the reconstructed luma values of a luma sample to predict a chroma sample may be difficult to obtain a highly accurate prediction. Generally speaking, if more information can be considered, e.g., the gradient information of the current sample, the location information of the current sample, etc., more accurate predictions can be obtained.

Figure 15:
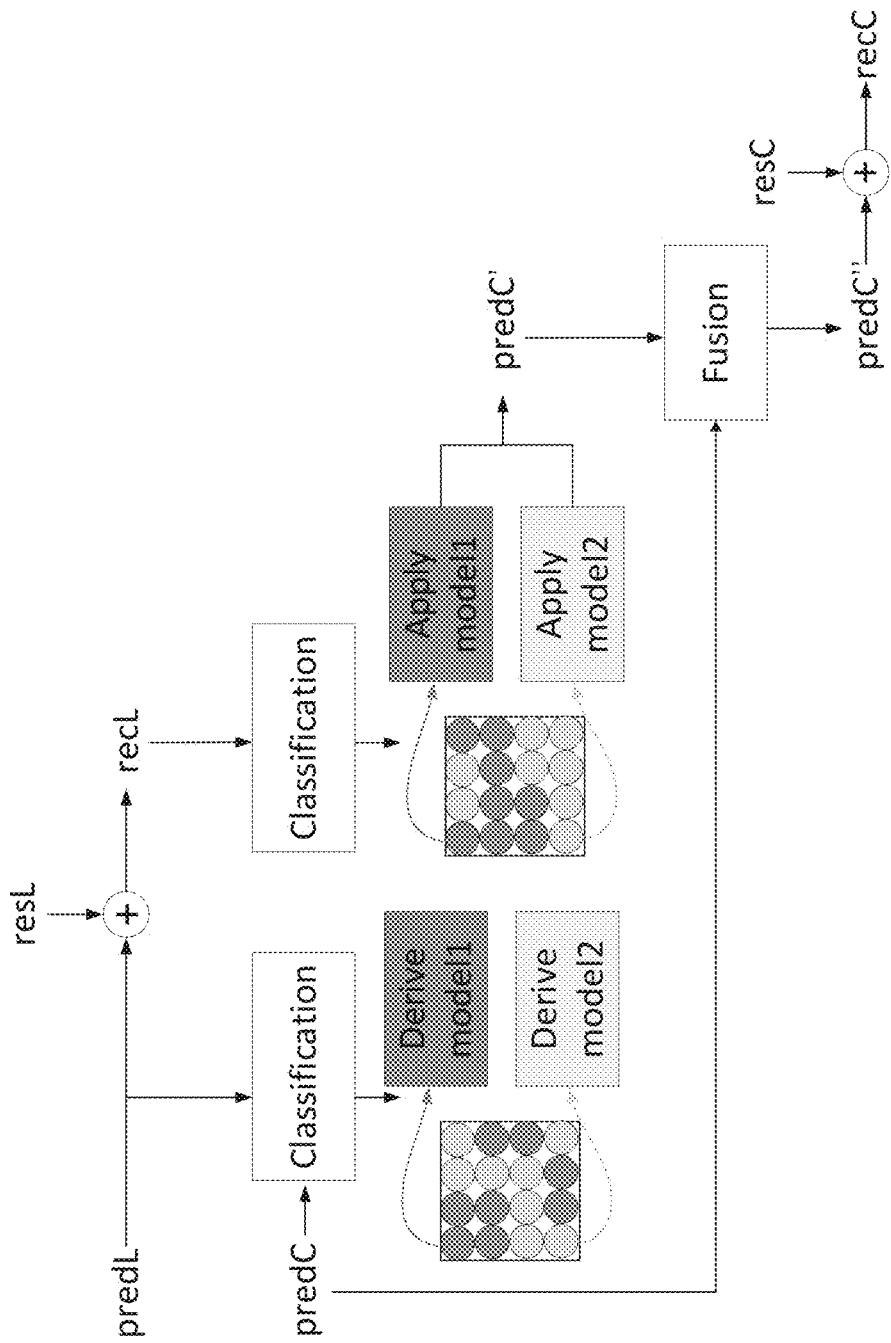
FIG. 15 shows a process of using multiple models for CCRM, according to some embodiments of the present disclosure.

In some embodiments, multiple models can be used for CCRM. FIG. 15 shows a process of using multiple models for CCRM, according to some embodiments of the present disclosure. As appreciated, some of the embodiments below may be described in connection with an encoding procedure, the descriptive aspects can be also applied to a decoding procedure. Specifically, both the encoding side and the decoding side may predict the chroma samples with an identical method, while the encoding side may generate residual signals based on the predicted chroma values of the chroma samples, and the decoding side may restore the chroma samples by the predicted chroma value and the residual signals. The embodiments below may be described in connection with FIG. 15 and other figures.

As shown in FIG. 15, more than one model for a block is used when applying CCRM. As described above, conventional CCRM approaches remove the redundancy between luma and chroma component for inter coded blocks by a single conventional model. As can be appreciated, chroma sample and collocated luma sample(s) can be descriptive aspects of a pixel. The motion between luma samples of the pixel shows some relativity with the motion between chroma samples. Hence, the motion estimation of luma samples can be reused for chroma samples, meanwhile CCRM can be used to derive such relativity. However, the relativity may not show a linear relationship among samples of different amplitudes (e.g., a luma value for a luma sample). For example, the model applies to samples with weak amplitudes may be not suitable for samples with strong amplitudes. Thus, the conventional single model scheme may not be suitable for all samples in the coding block. As such, it may be more reliable to use multiple models to describe the relationship between luma and chroma samples in the coding block especially when it has complex texture features. Conventional CCRM approaches with a single model will inevitably produce residual signals represented by a large amount of data. The inventors of the present invention have discovered the drawbacks of the traditional solution and overcome the technical bias that the use of CCRM must follow simple rules, thereby improving the coding efficiency.

Figure 16:
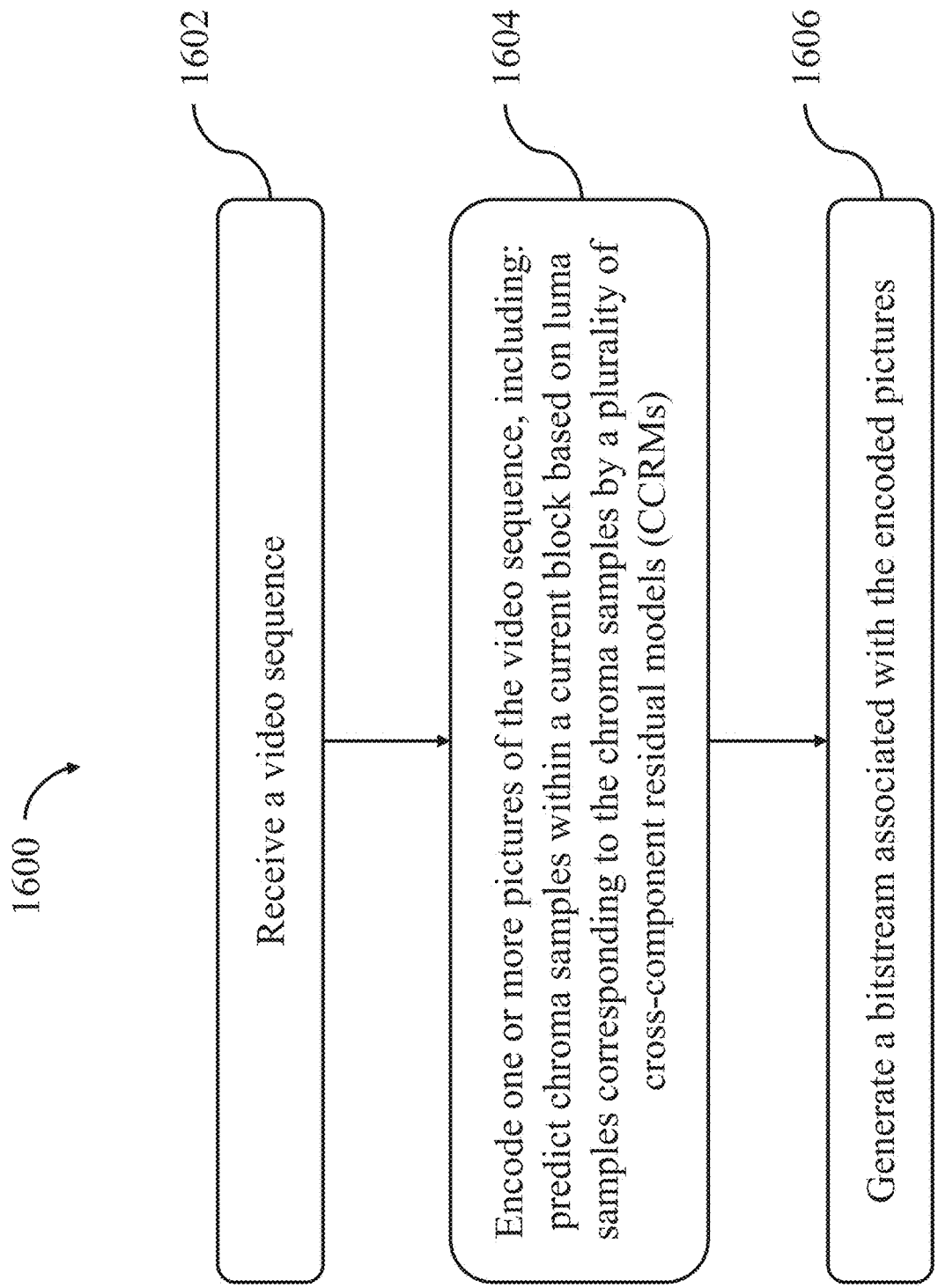
FIG. 16 shows an exemplary method for encoding a video sequence into a bitstream, according to some embodiments of the present disclosure.

FIG. 16 shows an exemplary method 1600 for encoding a video sequence into a bitstream, according to some embodiments of the present disclosure. As shown in FIG. 16, method 1600 includes following steps 1602 to 1606, which can be implemented by one or more processors associated with an encoder (e.g., image/video encoder 124 in FIG. 1, or apparatus 400 in FIG. 4).

In step 1602, the encoder can receive a video sequence.

In step 1604, the encoder can encode one or more pictures of the video sequence. Specifically, the encoder can predict chroma samples within a current block based on luma samples corresponding to the chroma samples by a plurality of cross-component residual models (CCRMs).

As appreciated, the luma samples and the chroma samples are different representative aspects of a current (coding) block. The luma samples and the chroma samples may show relativity in motion estimation, and the luma samples can be used to predict the corresponding chroma samples. As described above, CCRM can be used to remove the redundancy between luma and chroma component for inter coded blocks. However, a single CCRM may not be enough to describe the relationship between all samples as the relativity between samples can be varied according to the values of the samples. In some embodiments, more than one CCRM can be utilized to predict the chroma samples based on the luma samples.

In step 1606, the encoder generates a bitstream associated with the encoded pictures. The bitstream may include the encoded results generated in step 1604.

Figure 17:
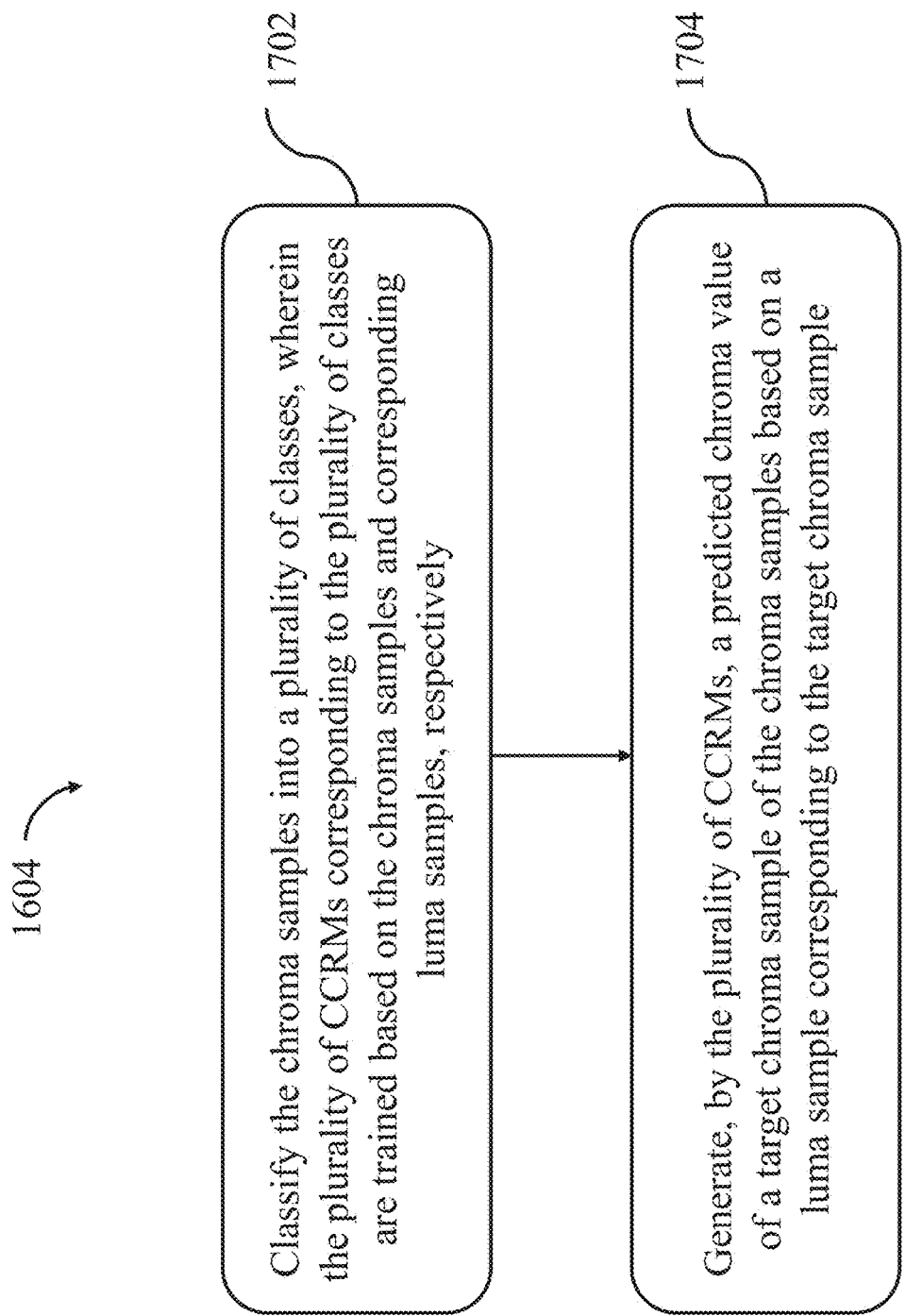
FIG. 17 shows sub-steps of the method shown in FIG. 16, according to some embodiments of the present disclosure.

As described above, it is proposed that there can be more than one model in a block when applying CCRM. FIG. 17 shows some sub-steps of the method shown in FIG. 16, according to some embodiments of the present disclosure. In some embodiments, predicting the chroma samples based on the luma samples corresponding to the chroma samples in step 1604 may include following sub-steps 1702 and 1704 as shown in FIG. 17, which can be implemented by the encoder.

In sub-step 1702, the encoder can classify the chroma samples into a plurality of classes. For example, the number of the models in a block can be equal to m. When deriving the CCRM models, the chroma samples in the current block can be classified into m classes based on predicted luma values of the corresponding luma samples through several thresholds, for example. The plurality of CCRMs corresponding to the plurality of classes can be trained based on the chroma samples and corresponding luma samples, respectively. Each class determined in sub-step 1702 can be treated as an independent training set to derive a respective CCRM model.

In sub-step 1704, the encoder can generate, by the plurality of CCRMs, a predicted chroma value of a target chroma sample of the chroma samples based on a luma sample corresponding to the target chroma sample. Subsequently, when applying the models, the chroma samples in the current block can be classified based on reconstructed luma values of the corresponding luma samples through the same thresholds. Finally, the chroma samples in different classes are predicted by applying different CCRM models to the reconstructed luma values of luma samples. The process of the multiple model CCRM in decoder side is shown in FIG. 15.

Figure 18:
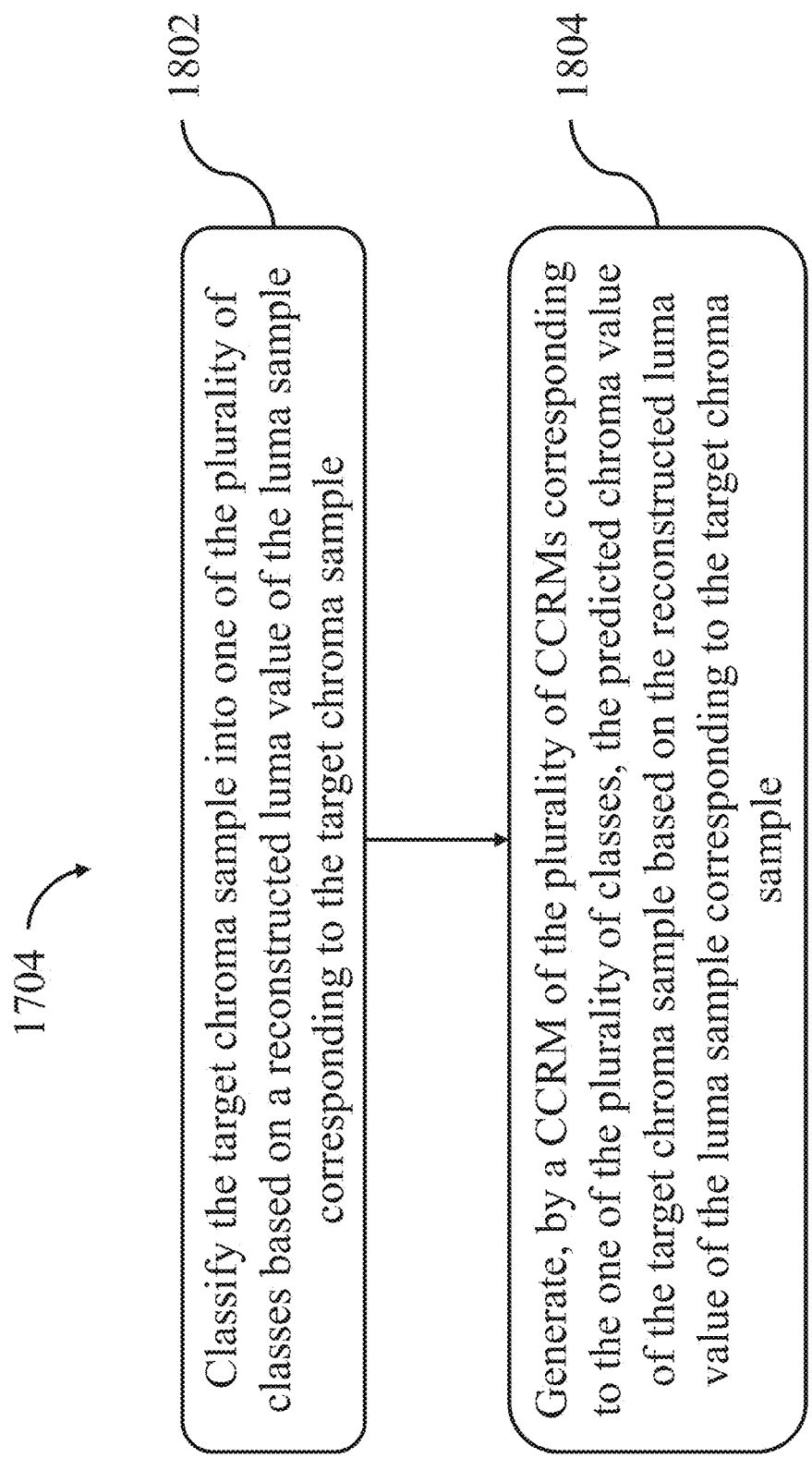
FIG. 18 shows sub-steps of the method shown in FIG. 16, according to some embodiments of the present disclosure.

FIG. 18 shows some sub-steps of the method shown in FIG. 16, according to some embodiments of the present disclosure. As shown in FIG. 18, in some embodiments, sub-step 1704 of generating the predicted chroma value of the target chroma sample may further include the following sub-steps 1802 and 1804, which can be implemented by the encoder.

In sub-step 1802, the encoder may classify the target chroma sample into one of the plurality of classes based on a reconstructed luma value of the luma sample corresponding to the target chroma sample. As described above, reconstructed luma values of the luma samples (denoted as $rec_L$ in FIG. 15) can be used to further classify the chroma samples before applying models. Specifically, the target chroma sample can be classified into one of the plurality of classes based on a comparison between the reconstructed luma value of the luma sample and a threshold. The threshold can be associated with predicted luma values or reconstructed luma values of at least a part of the luma samples within the current block. In some embodiments, the threshold can be an average value of the predicted luma values of all the luma samples within the current block or an average value of the reconstructed luma values of all the luma samples within the current block.

In sub-step 1804, the encoder may generate, by a CCRM of the plurality of CCRMs corresponding to the one of the plurality of classes, the predicted chroma value of the target chroma sample based on the reconstructed luma value of the luma sample corresponding to the target chroma sample.

In some embodiments, as shown in FIG. 15, two models (i.e., model 1, model 2) can be used in CCRM for the current block. In sub-step 1702, the encoder may classify an objective chroma sample into one of the plurality of classes based on a predicted luma value (denoted as predL in FIG. 15) of a luma sample corresponding to the objective chroma sample. Herein, a "target" sample or an "objective" sample is directed to a sample under study and can be different. When deriving the CCRM models, the current chroma sample can be classified based on the predicted luma value of one corresponding luma sample.

In some embodiments, the objective chroma sample can be classified into one of the plurality of classes based on a comparison between the predicted luma value of the luma sample and a threshold. The threshold can be associated with predicted luma values or reconstructed luma values of at least a part of the luma samples within the current block. In some embodiments, the plurality of classes may include two classes, and the threshold can be an average value of the predicted luma values of all the luma samples within the current block or an average value of the reconstructed luma values of all the luma samples within the current block.

In some embodiments, for the objective chroma sample with coordinates (i,j), the luma sample corresponding to the objective chroma sample can be determined as a luma sample having coordinates (2i, 2j) for 4:2:0 color format. For example, predL(2i, 2j) can be used for classification for 4:2:0 color format, where predL(2i, 2j) is a predicted luma value of the luma sample having coordinates (2i, 2j). That is, the objective chroma sample can be classified into one of the plurality of classes based on a comparison between predL (2i, 2j) and the threshold.

The threshold TH can be the average value of predicted luma values of all luma samples in the current block, that is the average value of predL, or the average value of predicted luma values of part of luma samples in the current block. If predL(2i, 2j) is greater than (or equal to) TH, the chroma sample at (i,j) will fall into a first category; otherwise the chroma sample at (i,j) will fall into a second category. After the classification is done in the same rule for each chroma sample in the current block, two CCRM models can be derived for the two categories, respectively.

When applying the CCRM models, the current chroma sample can be classified based on the reconstructed luma value of one corresponding luma sample through the same threshold TH. That is, if recL(2i, 2j) representing a reconstructed luma value of the luma sample having coordinates (2i, 2j) is greater than (or equal to) TH, the chroma sample at (i,j) will fall into the first category and the CCRM model derived by the first category is applied to obtain predC'(i,j); otherwise the chroma sample at (i,j) will fall into the second category and the CCRM model derived by the second category is applied to obtain predC'(i,j), which represents the predicted chroma value of the luma sample having coordinates (i,j).

In some embodiments, for the objective chroma sample with coordinates (i,j), the luma sample corresponding to the objective chroma sample can be determined as a luma sample having coordinates (i,j) for 4:4:4 color format. Specifically, predL(i,j) can be used and compared with the threshold for classification in deriving the model. In addition, recL(i,j) can be used and compared with the threshold for classification in applying the model. predL(i,j) is a predicted luma value of the luma sample having coordinates (i,j) and recL(i,j) is a reconstructed luma value of the luma sample having coordinates (i,j).

In some embodiments, for the objective chroma sample with coordinates (i,j), the luma sample corresponding to the objective chroma sample can be determined as a luma sample having coordinates (2i,j) for 4:2:2 color format. Specifically, predL(2i,j) can be used and compared with the threshold for classification in deriving the model. In addition, recL(2i,j) can be used and compared with the threshold for classification in applying the model. predL(2i,j) is a predicted luma value of the luma sample having coordinates (2i,j) and recL(2i,j) is a reconstructed luma value of the luma sample having coordinates (2i,j).

In some embodiments, when classifying the current chroma sample, the average value or a weighted average value associated to several corresponding luma samples can be used.

In some embodiments, for the objective chroma sample with coordinates (i,j), in response to a 4:2:0 color format and a prediction for chroma samples in a manner that the chroma samples are not vertically shifted relative to corresponding luma samples, the luma sample corresponding to the objective chroma sample is determined as luma samples having coordinates (2i, 2j) and (2i, 2j+1). For example, for 4:2:0 color format with sps_chroma_vertical_collocated_flag equal to 1, for a chroma sample with coordinates (i,j), (predL(2i, 2j)+predL(2i, 2j+1)+1)>>1 can be used and compared with the threshold for classification in deriving the model. Herein, ">>" indicates a right shift operation. In addition, (recL(2i, 2j)+recL(2i, 2j+1)+1)>>1 can be used and compared with the threshold for classification in applying the model.

In some embodiments, for the objective chroma sample with coordinates (i,j), in response to a 4:2:0 color format and a prediction for chroma samples in a manner that the chroma samples are not vertically shifted relative to corresponding luma samples, the luma sample corresponding to the objective chroma sample is determined as luma samples having coordinates (2i, 2j), (2i−1,2j), (2i+1,2j), (2i, 2j+1), (2i−1, 2j+1), and (2i+1,2j+1). For example, for 4:2:0 color format with sps_chroma_vertical_collocated_flag equal to 1, for a chroma sample with coordinates (i,j), (predL(2i, 2j)+predL(2i−1,2j)+predL(2i+1,2j)+predL(2i, 2j+1)+predL(2i−1,2j+1)+predL(2i+1,2j+1)+3)/6 can be used and compared with the threshold for classification in deriving the model. In addition, (recL(2i, 2j)+recL(2i−1,2j)+recL(2i+1,2j)+recL(2i, 2j+1)+recL(2i−1,2j+1)+recL(2i+1,2j+1)+3)/6 can be used and compared with the threshold for classification in applying the model. In another example, (2*predL(2i, 2j)+predL(2i−1,2j)+predL(2i+1,2j)+2*predL(2i, 2j+1)+predL(2i−1,2j+1)+predL(2i+1,2j+1)+4)>>3 can be used and compared with the threshold for classification in deriving the model. In addition, (2*recL(2i, 2j)+recL(2i−1,2j)+recL(2i+1,2j)+2*recL(2i,2j+1)+recL(2i−1,2j+1)+recL(2i+1,2j+1)+4)>>3 can be used and compared with the threshold for classification in applying the model.

In some embodiments, for the objective chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the objective chroma sample is determined as luma samples having coordinates (2i, 2j), (2i−1,2j), and (2i+1,2j). For example, for 4:2:0 color format with sps_chroma_vertical_collocated_flag equal to 0, for a chroma sample with coordinates (i,j), (2*predL(2i, 2j)+predL(2i−1,2j)+predL(2i+1,2j)+2)>>2 can be used and compared with the threshold for classification in deriving the model. In addition, (2*recL(2i, 2j)+recL(2i−1,2j)+recL(2i+1,2j)+2)>>2 can be used and compared with the threshold for classification in applying the model.

In some embodiments, for the objective chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the objective chroma sample is determined as luma samples having coordinates (2i, 2j), (2i, 2j−1), and (2i, 2j+1). For example, for 4:2:0 color format with sps_chroma_vertical_collocated_flag equal to 0, for a chroma sample with coordinates (i,j), (2*predL(2i, 2j)+predL(2i, 2j−1)+predL(2i, 2j+1)+2)>>2 can be used and compared with the threshold for classification in deriving the model. In addition, (2*recL(2i, 2j)+recL(2i, 2j−1)+recL(2i, 2j+1)+2)>>2 can be used and compared with the threshold for classification in applying the model.

In some embodiments, for the objective chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the objective chroma sample is determined as luma samples having coordinates (2i, 2j), (2i−1,2j), (2i+1,2j), (2i, 2j+1), and (2i, 2j−1). For example, for 4:2:0 color format with sps_chroma_vertical_collocated_flag equal to 0, for a chroma sample with coordinates (i,j), (4*predL(2i, 2j)+predL(2i−1,2j)+predL(2i+1,2j)+predL(2i, 2j+1)+predL(2i, 2j−1)+4)>>3 can be used and compared with the threshold for classification in deriving the model. In addition, (4*recL(2i, 2j)+recL(2i−1,2j)+recL(2i+1,2j)+recL(2i, 2j+1)+recL(2i, 2j−1)+4)>>3 can be used and compared with the threshold for classification in applying the model.

In some embodiments, when deriving the CCRM models, the current chroma sample can be alliteratively classified based on reconstructed luma values of corresponding luma samples. That is, the predicted luma values of the luma samples used for classifying the chroma samples can be replaced by corresponding reconstructed luma values of the luma samples. For example, predL(2i, 2j) can be replaced by recL(2i, 2j) when deriving the CCRM models.

In some embodiments, the threshold TH described above can be the average value of reconstructed luma values of all luma samples in the current block, that is the average value of recL, or part of reconstructed luma values of luma samples in the current block.

With further reference to FIG. 15, in some embodiments, a target CCRM of the plurality of CCRMs can be trained based on original predicted chroma values (denoted as predC in FIG. 15) of a set of chroma samples that are classified into a class corresponding to the target CCRM and predicted luma values (denoted as $pred_L$ in FIG. 15) of luma samples corresponding to the set of chroma samples. As can be appreciated, the original predicted chroma value can be inter-predicted with respect to a reference picture or generated by intra block copy (IBC).

In some embodiments, the chroma samples can be predicted based on the luma samples corresponding to the chroma samples by the plurality of CCRMs in response to a determination that the chroma samples are to be predicted with more than one CCRM. For example, the encoder may generate a flag indicating whether to predict the chroma samples by one or more CCRMs in step 1604 and signal to the decoder side in the bitstream generated in step 1606. Specifically, a TU level flag can be signaled into the bitstream to indicate whether the multiple model or single model is used in CCRM. In some embodiments, the chroma samples can be determined to be predicted with more than one CCRM when a number of the chroma samples exceeding a threshold. Specifically, if the number of the samples in the current block is smaller than (or equal to) a threshold, only single model CCRM can be used; otherwise a TU level flag is signaled into the bitstream to indicate whether the multiple model CCRM or single model CCRM is used.

In some embodiments, in step 1604, the encoder may fuse the predicted chroma value of the target chroma sample with an original predicted chroma value of the target chroma sample to obtain a finalized predicted chroma value. As described above, the original predicted chroma value can be inter-predicted with respect to a reference picture or generated by intra block copy (IBC). In some embodiments, in step 1604, the encoder may generate a residual chroma value of the target chroma sample based on the finalized predicted chroma value.

In some embodiments, in step 1604, the encoder may filter the finalized predicted chroma value by a low pass filter to obtain a filtered predicted chroma value of the target chroma sample. In some embodiments, the encoder may further generate a residual chroma value of the target chroma sample based on the filtered predicted chroma value. In some embodiments, coefficients of the low pass filter are determined based on a predicted luma value and a reconstructed luma value of the luma sample corresponding to the target chroma sample. In some embodiments, the encoder may generate a flag for indicating whether filtering by the low pass filter.

In some embodiments, a low pass filter can be applied to the predicted chroma value first. Then the filtered predicted chroma value can be fused with the original predicted chroma value. Specifically, in step 1604, the encoder may filter the predicted chroma value by a low pass filter to obtain a filtered predicted chroma value of the target chroma sample. After that, the encoder may fuse the filtered predicted chroma value of the target chroma sample with the original predicted chroma value of the target chroma sample to obtain the finalized predicted chroma value.

Figure 19:
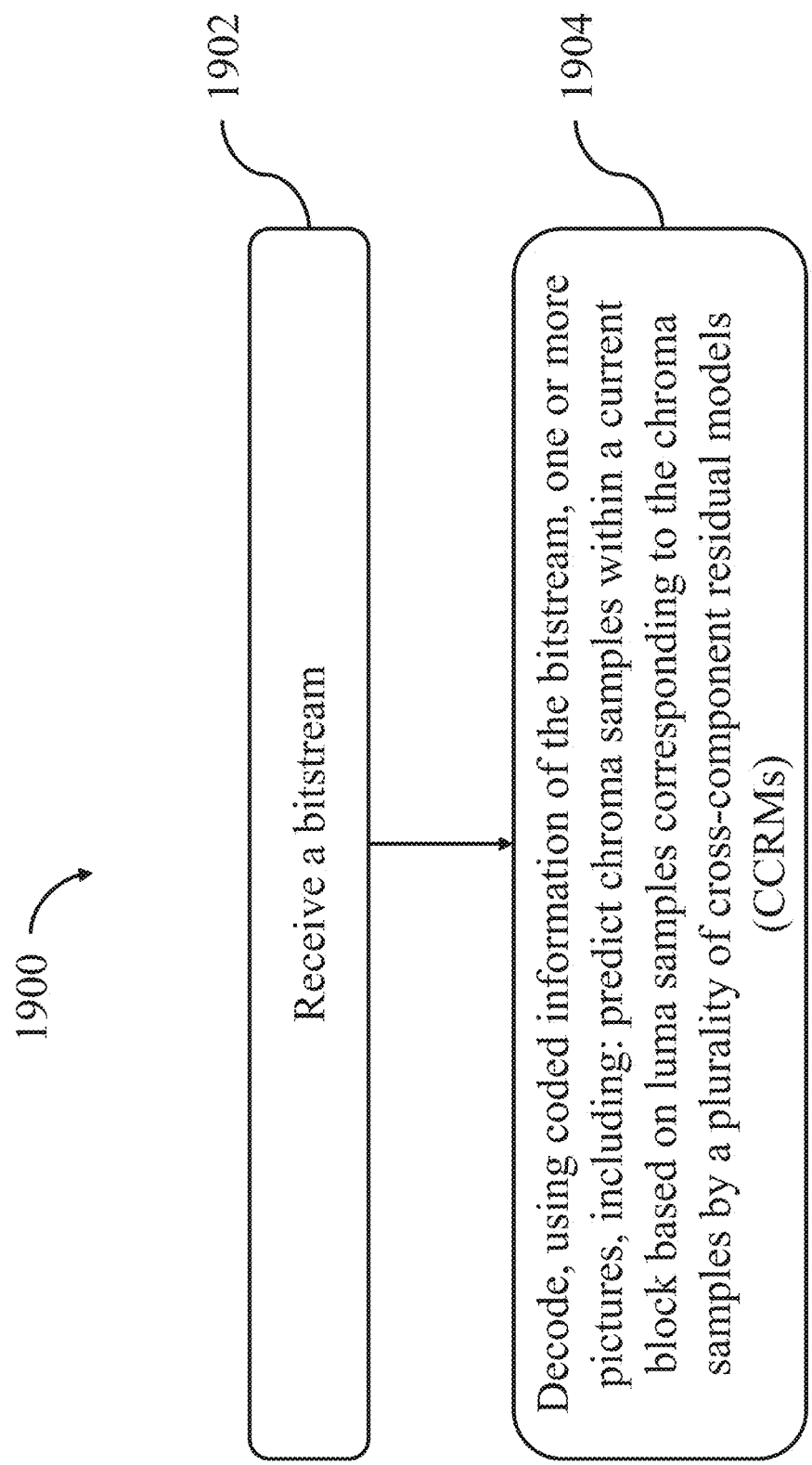
FIG. 19 shows an exemplary method for decoding a bitstream to output one or more pictures for a video stream, according to some embodiments of the present disclosure.

FIG. 19 shows an exemplary method 1900 for decoding a bitstream to output one or more pictures for a video stream, according to some embodiments of the present disclosure. As shown in FIG. 19, method 1900 may include following steps 1902 and 1904, which can be implemented by one or more processors associated with a decoder (e.g., image/video decoder 144 in FIG. 1, or apparatus 400 in FIG. 4).

In step 1902, the decoder may receive a bitstream.

In step 1904, the decoder may decode, using coded information of the bitstream, one or more pictures. Specifically, the decoder may predict chroma samples within a current block based on luma samples corresponding to the chroma samples by a plurality of cross-component residual models (CCRMs).

In some embodiments, the decoder may predict the chroma samples with an identical method described above in connection with the encoder. In addition, the decoder may restore the chroma samples by the predicted chroma value and the residual signals generated by the encoder.

In some embodiments, a non-transitory computer-readable storage medium storing a bitstream is also provided. The bitstream can be encoded and decoded according to any of the above-described methods.

Figure 20:
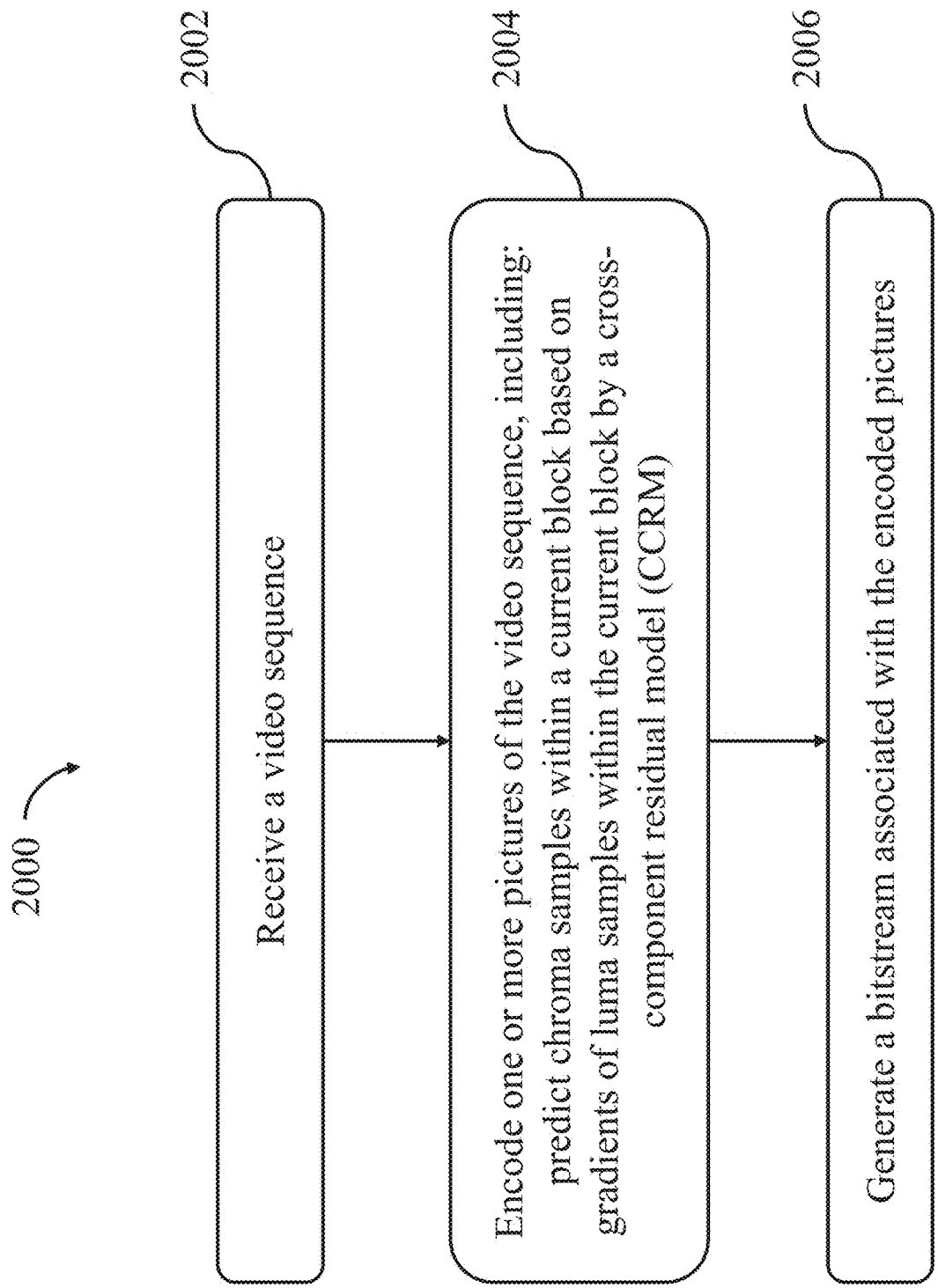
FIG. 20 shows an exemplary method for encoding a video sequence into a bitstream, according to some embodiments of the present disclosure.

In some embodiments, gradient information or location information can be used in CCRM model. FIG. 20 shows an exemplary method 2000 for encoding a video sequence into a bitstream, according to some embodiments of the present disclosure. As shown in FIG. 20, method 2000 includes following steps 2002 to 2006, which can be implemented by one or more processors associated with an encoder (e.g., image/video encoder 124 in FIG. 1, or apparatus 400 in FIG. 4).

In step 2002, the encoder can receive a video sequence.

In step 2004, the encoder can encode one or more pictures of the video sequence. Specifically, the encoder can predict chroma samples within a current block based on gradients of luma samples corresponding to the chroma samples by a cross-component residual model (CCRM).

In step 2006, the encoder generates a bitstream associated with the encoded pictures. The bitstream may include the encoded results generated in step 2004.

In some embodiments, the luma samples and the chroma samples are organized in a 4:2:0 color format, and a target luma sample having coordinates (i,j) can be predicted based on a gradient of a luma sample having coordinates (i,j).

Specifically, a gradient based CCRM method is proposed for 4:2:0 color format, where the gradient of the reconstructed luma values of the corresponding luma samples are used to obtain the predicted values of the CCRM. For example, Eq. 63 is used to predict a chroma sample.

$$predC'(i, j) = c0 * G(i, j) + c1 * B \qquad \text{(Eq. 63)}$$

where predC'(i,j) is the predicted chroma value of the target chroma sample having coordinates (i,j), G(i,j) is the gradient of a luma sample having coordinates (i,j). c0, c1, and B are parameters of the CCRM, and c0 is a non-zero parameter. In some embodiments, G(i,j) is the gradient of the reconstructed luma values of the corresponding luma samples which can be calculated by one of the following equations from Eq. 64 to Eq. 67, where up to reconstructed luma values of 6 corresponding luma samples are used to calculate the gradient.

In some embodiments, G (i,j) can be determined based on reconstructed luma values of luma samples having coordinates (2i−1, 2j), (2i+1,2j), (2i−1, 2j+1), and (2i+1, 2j+1). Specifically, G (i,j) is determined based on the following:

$$G(i, j) = \begin{bmatrix} recL(2i-1, 2j) - recL(2i+1, 2j) + \\ recL(2i-1, 2j+1) - recL(2i+1, 2j+1) \end{bmatrix} \qquad \text{(Eq. 64)}$$

where recL(2i−1, 2j) is a reconstructed luma value of the luma sample having coordinates (2i−1, 2j), recL(2i+1,2j) is a reconstructed luma value of the luma sample having coordinates (2i+1,2j), recL(2i−1, 2j+1) is a reconstructed luma value of the luma sample having coordinates (2i−1, 2j+1), and recL(2i+1, 2j+1) is a reconstructed luma value of the luma sample having coordinates (2i+1, 2j+1).

In some embodiments, G (i,j) can be determined based on reconstructed luma values of luma samples having coordinates (2i, 2j), (2i, 2j+1), (2i−1, 2j), (2i+1,2j), (2i−1, 2j+1), and (2i+1, 2j+1). Specifically, G(i,j) is determined based on the following:

$$G(i, j) = \begin{bmatrix} recL(2i-1, 2j) + 2*recL(2i, 2j) + recL(2i+1, 2j) - \\ recL(2i-1, 2j+1) - 2*recL(2i, 2j+1) - recL(2i+1, 2j+1) \end{bmatrix} \qquad \text{(Eq. 65)}$$

$$G(i, j) = \begin{bmatrix} 2*recL(2i-1, 2j) + recL(2i, 2j) - recL(2i+1, 2j) + \\ recL(2i-1, 2j+1) - recL(2i, 2j+1) - 2*recL(2i+1, 2j+1) \end{bmatrix} \qquad \text{(Eq. 66)}$$

$$G(i, j) = \begin{bmatrix} -recL(2i-1, 2j) + recL(2i, 2j) + 2*recL(2i+1, 2j) - \\ 2*recL(2i-1, 2j+1) - recL(2i, 2j+1) + recL(2i+1, 2j+1) \end{bmatrix} \qquad \text{(Eq. 67)}$$

where recL(2i−1, 2j) is a reconstructed luma value of the luma sample having coordinates (2i−1, 2j), recL(2i, 2j) is a reconstructed luma value of the luma sample having coordinates (2i, 2j), recL(2i+1,2j) is a reconstructed luma value of the luma sample having coordinates (2i+1,2j), recL(2i−1, 2j+1) is a reconstructed luma value of the luma sample having coordinates (2i−1, 2j+1), recL(2i, 2j+1) is a reconstructed luma value of the luma sample having coordinates (2i, 2j+1), and recL(2i+1, 2j+1) is a reconstructed luma value of the luma sample having coordinates (2i+1, 2j+1).

The model parameters c0, c1, and B can be derived based on original predicted chroma values of the chroma samples predC and the gradient of the predicted luma values of luma samples corresponding to the chroma samples predL. Specifically, parameters c0, c1, and B can be derived based on: predC(i,j)=c0*G'(i,j)+c1*B. The original predicted chroma values of the chroma samples are inter-predicted with respect to a reference picture or generated by intra block copy (IBC). G'(i,j), which is the gradient of a predicted luma value of the luma sample having coordinates (i,j), can be calculated by one of the following equations from Eq. 68 to Eq. 71.

In some embodiments, G'(i,j) can be determined based on predicted luma values of luma samples having coordinates (2i−1, 2j), (2i+1,2j), (2i−1, 2j+1), and (2i+1,2j+1).

$$G'(i, j) = \begin{bmatrix} predL(2i-1, 2j) - predL(2i+1, 2j) + \\ predL(2i-1, 2j+1) - predL(2i+1, 2j+1) \end{bmatrix} \quad \text{(Eq. 68)}$$

where predL(2i−1, 2j) is a predicted luma value of the luma sample having coordinates (2i−1, 2j), predL(2i+1,2j) is a predicted luma value of the luma sample having coordinates (2i+1,2j), predL(2i−1, 2j+1) is a predicted luma value of the luma sample having coordinates (2i−1, 2j+1), and predL(2i+1, 2j+1) is a predicted luma value of the luma sample having coordinates (2i+1, 2j+1).

In some embodiments, G (i,j) can be determined based on predicted luma values of luma samples having coordinates (2i, 2j), (2i, 2j+1), (2i−1, 2j), (2i+1,2j), (2i−1, 2j+1), and (2i+1, 2j+1).

$$G'(i, j) = \begin{bmatrix} predL(2i-1, 2j) + 2*predL(2i, 2j) + \\ predL(2i+1, 2j) - predL(2i-1, 2j+1) - \\ 2*predL(2i, 2j+1) - predL(2i+1, 2j+1) \end{bmatrix} \quad \text{(Eq. 69)}$$

$$G'(i, j) = \begin{bmatrix} 2*predL(2i-1, 2j) + predL(2i, 2j) - \\ predL(2i+1, 2j) + predL(2i-1, 2j+1) - \\ predL(2i, 2j+1) - 2*predL(2i+1, 2j+1) \end{bmatrix} \quad \text{(Eq. 70)}$$

$$G'(i, j) = \begin{bmatrix} -predL(2i-1, 2j) + predL(2i, 2j) + 2* \\ predL(2i+1, 2j) - 2*predL(2i-1, 2j+1) - \\ predL(2i, 2j+1) + predL(2i+1, 2j+1) \end{bmatrix} \quad \text{(Eq. 71)}$$

where predL(2i−1, 2j) is a predicted luma value of the luma sample having coordinates (2i−1, 2j), predL(2i, 2j) is a predicted luma value of the luma sample having coordinates (2i, 2j), predL(2i+1,2j) is a predicted luma value of the luma sample having coordinates (2i+1,2j), predL(2i−1, 2j+1) is a predicted luma value of the luma sample having coordinates (2i−1, 2j+1), predL(2i, 2j+1) is a predicted luma value of the luma sample having coordinates (2i, 2j+1), and predL(2i+1, 2j+1) is a predicted luma value of the luma sample having coordinates (2i+1, 2j+1).

In some embodiments an index, which can be a flag, is signaled into the bitstream to indicate which of the gradients represented in varied formulars above is used.

In some embodiments, multiple gradients of the reconstructed luma values of the corresponding luma samples are used to obtain the predicted values of the CCRM as represented in Eq. 72.

$$predC'(i, j) = c0*G0(i, j) + c1*G1(i, j) + \cdots + cn*B \quad \text{(Eq. 72)}$$

where predC'(i,j) is the predicted chroma value of the target chroma sample having coordinates (i,j), G0(i,j) is a first gradient of the luma sample having coordinates (i,j), G1(i,j) is a second gradient of the luma sample having coordinates (i,j), . . . , and c0, c1, . . . , cn, and B are parameters of the CCRM. c1, . . . , and cn are not equal to zero simultaneously. For example, two gradients corresponding to Eq. 64 and Eq. 65 can be used.

In some embodiments, the chroma samples within a current block are further predicted based on reconstructed luma values of luma samples corresponding to the chroma samples. Hence, both reconstructed luma values and gradients of the reconstructed luma values of the corresponding luma samples are used to obtain the predicted chroma value of the current chroma sample in CCRM as represented in Eq. 73 (that is, the gradient terms are added into Eq. 62). For example, the luma samples corresponding to the chroma samples are the luma samples having coordinates (2i, 2j), (2i−1, 2j), (2i+1,2j), (2i, 2j+1), (2i−1, 2j+1), and (2i+1,2j+1).

$$\begin{aligned} predC'(i, j) = \\ c0*(recL(2i, 2j) - \text{offset}) + c1*(recL(2i-1, 2j) - \text{offset}) + \\ c2*(recL(2i+1, 2j) - \text{offset}) + c3*(recL(2i, 2j+1) - \text{offset}) + \\ c4*(recL(2i-1, 2j+1) - \text{offset}) + \\ c5*(recL(2i+1, 2j+1) - \text{offset}) + c6*G0(i, j) + \\ c7*G1(i, j) + \cdots + cn-1*P + cn*B \end{aligned} \quad \text{(Eq. 73)}$$

where G0(i,j) is a first gradient of the luma sample having coordinates (i,j), G1(i,j) is a second gradient of the luma sample having coordinates (i,j), . . . , and c0, c1, . . . , cn, and B are parameters of the CCRM. The above Eq. 73 is generated by adding the gradient terms "c6*G0(i,j)+c7*G1(i,j)+ . . . " into Eq. 62.

For example, one of the 4 gradients corresponding to Eq. 64 to Eq. 67 is used. In another example, two gradients corresponding to Eq. 64 and Eq. 65 are used. In some embodiments, P can also be a non-linear term of a gradient.

In some embodiments, the location information is used for CCRM prediction as represented in Eq. 74 (that is the location terms are added into Eq. 62), where X and Y represent the horizontal distance and vertical distance between the current chroma sample and the chroma sample in the upper left corner of the current block, respectively.

$$\begin{aligned} predC'(i, j) = \\ c0*(recL(2i, 2j) - \text{offset}) + c1*(recL(2i-1, 2j) - \text{offset}) + \\ c2*(recL(2i+1, 2j) - \text{offset}) + c3*(recL(2i, 2j+1) - \text{offset}) + \\ c4*(recL(2i-1, 2j+1) - \text{offset}) + \\ c5*(recL(2i+1, 2j+1) - \text{offset}) + c6*X + c7*Y + c8*P + c9*B \end{aligned} \quad \text{(Eq. 74)}$$

The above Eq. 74 is generated by adding the location terms "c6*X+c7*Y" into Eq. 62.

In some embodiments, the gradient information, the location information and the reconstructed luma values of the corresponding luma samples are used together for CCRM prediction as Eq. 75.

$$predC'(i, j) = \qquad \text{(Eq. 75)}$$
$$c0*(recL(2i, 2j) - \text{offset}) + c1*(recL(2i - 1, 2j) - \text{offset}) +$$
$$c2*(recL(2i + 1, 2j) - \text{offset}) + c3*(recL(2i, 2j + 1) - \text{offset}) +$$
$$c4*(recL(2i - 1, 2j + 1) - \text{offset}) +$$
$$c5*(recL(2i + 1, 2j + 1) - \text{offset}) + c6*X + c7*Y +$$
$$c8*G0(i, j) + c9*G1(i, j) + \cdots + cn - 1*P + cn*B$$

The above Eq. 75 is generated by adding the location terms and gradient terms "c6*X+c7*Y+c8*G0(i,j)+c9*G1(i,j)+ . . . " into Eq. 62.

In the aforementioned embodiments, the positions of different terms in the equations for CCRM prediction can be changed freely.

In some embodiments, in step 2204, the encoder may fuse the predicted chroma value of the target chroma sample with an original predicted chroma value of the target chroma sample to obtain a finalized predicted chroma value. As described above, the original predicted chroma value can be inter-predicted with respect to a reference picture or generated by intra block copy (IBC). In some embodiments, the encoder may generate residual chroma values of the chroma samples based on the finalized predicted chroma values.

Figure 21:
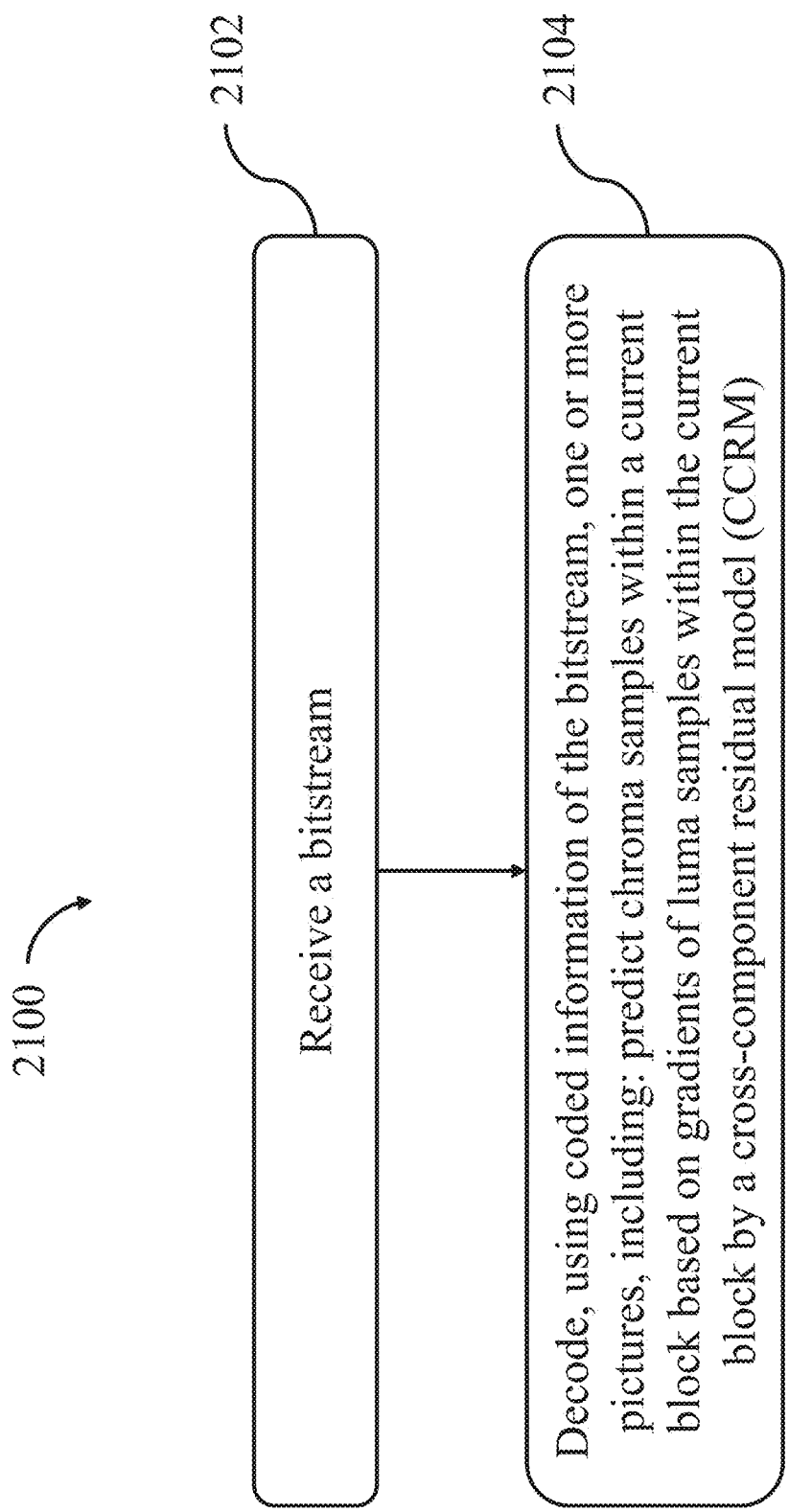
FIG. 21 shows an exemplary method for decoding a bitstream to output one or more pictures for a video stream, according to some embodiments of the present disclosure.

FIG. 21 shows an exemplary method 2100 for decoding a bitstream to output one or more pictures for a video stream, according to some embodiments of the present disclosure. As shown in FIG. 21, method 2100 may include following steps 2102 and 2104, which can be implemented by one or more processors associated with a decoder (e.g., image/video decoder 144 in FIG. 1, or apparatus 400 in FIG. 4).

In step 2102, the decoder may receive a bitstream.

In step 2104, the decoder may decode, using coded information of the bitstream, one or more pictures. Specifically, the decoder may predict chroma samples within a current block based on gradients of luma samples corresponding to the chroma samples by a cross-component residual model (CCRM).

In some embodiments, the decoder may predict the chroma samples with an identical method described above in connection with the encoder. In addition, the decoder may restore the chroma samples by the predicted chroma value and the residual signals generated by the encoder.

In some embodiments, a non-transitory computer-readable storage medium storing a bitstream is also provided. The bitstream can be encoded and decoded according to any of the above-described methods.

In some embodiments, low pass filter can be used in CCRM.

Figure 22:
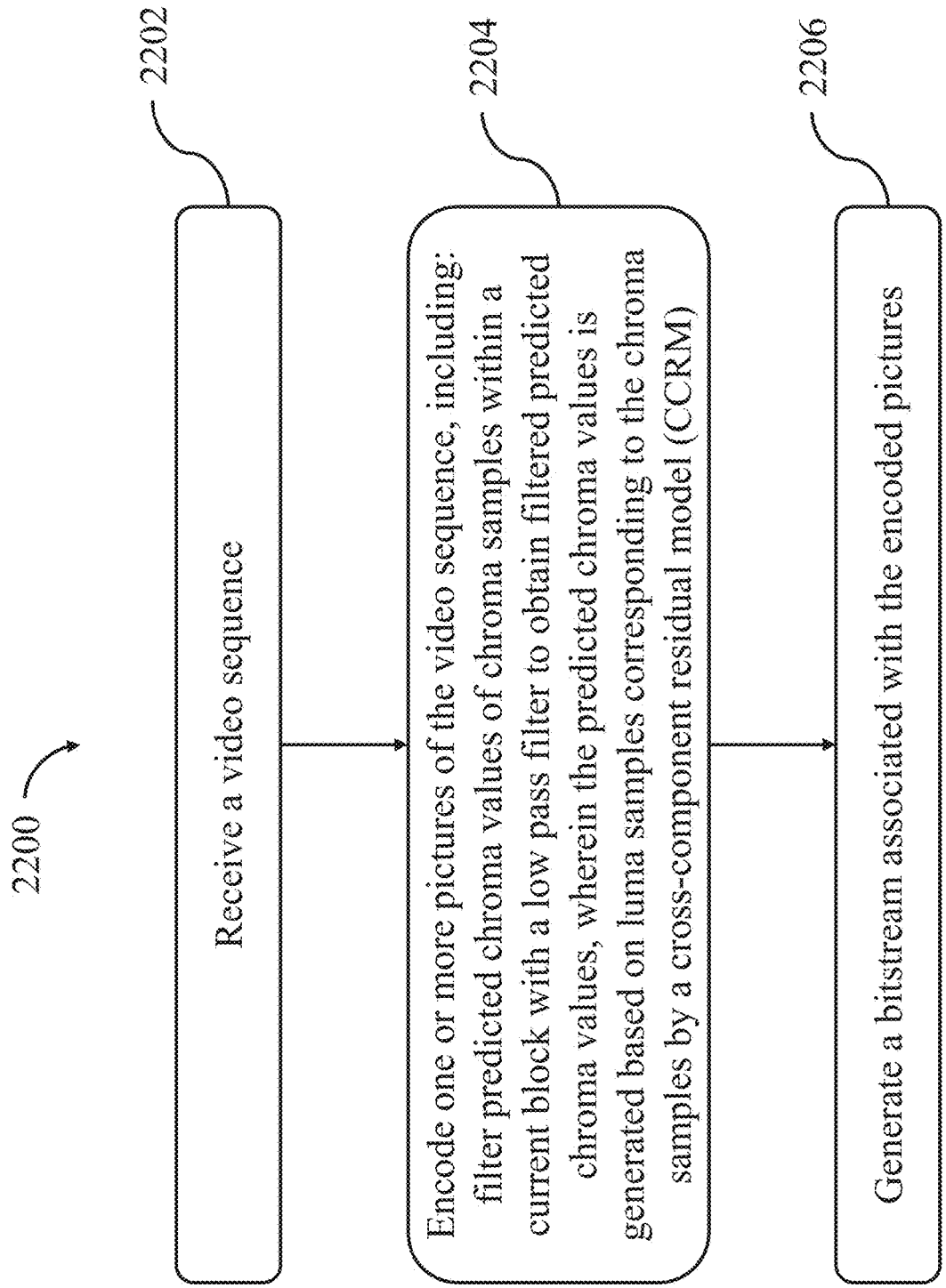
FIG. 22 shows an exemplary method for encoding a video sequence into a bitstream, according to some embodiments of the present disclosure.

FIG. 22 shows an exemplary method 2200 for encoding a video sequence into a bitstream, according to some embodiments of the present disclosure. As shown in FIG. 22, method 2200 includes following steps 2202 to 2206, which can be implemented by one or more processors associated with an encoder (e.g., image/video encoder 124 in FIG. 1, or apparatus 400 in FIG. 4).

In step 2202, the encoder can receive a video sequence.

In step 2204, the encoder can encode one or more pictures of the video sequence. Specifically, the encoder can filter predicted chroma values of chroma samples within a current block with a low pass filter to obtain filtered predicted chroma values, where the predicted chroma values is generated based on luma samples corresponding to the chroma samples by any of the cross-component residual models (CCRM). Specifically, the predicted chroma values of the chroma samples can be predicted, by the CCRM, based on predicted luma values and reconstructed luma values of the luma samples corresponding to the chroma samples.

In step 2206, the encoder generates a bitstream associated with the encoded pictures. The bitstream may include the encoded results generated in step 2204.

In some embodiments, it is proposed to use a low pass filter to refine the predicted chroma values of chroma samples obtained by CCRM. In some embodiments, the low pass filter is applied to the predicted chroma value predC' described above, which is obtained by applying the CCRM model to the reconstructed luma values of the luma samples. In some embodiments, the low pass filter is applied to the finalized chrome value predC" described above, which is obtained by fusing the original predicted chroma value predC and the predicted chroma value predC' (also referred to as a temporal predicted chroma value in this circumstance), where predC can be obtained by using a inter prediction mode or an IBC mode.

In some embodiments, the low pass filter is a 3×3 tap filter as shown in Eq. 76. Eq. 77 shows how to apply the filter to obtain the filtered predicted chroma values predC"(i,j). For chroma samples in the current block but not in the top/left boundary of the current block, the filtering window only involves predicted chroma values of chroma samples. For a sample at a top/left boundary of the current block, the filtering window may involve reconstructed chroma values of the neighboring chroma samples.

$$f = \begin{bmatrix} 1 & 1 & 1 \\ 1 & 8 & 1 \\ 1 & 1 & 1 \end{bmatrix} \qquad \text{(Eq. 76)}$$

$$predC'''(i, j) = (8*predC''(i, j) + \qquad \text{(Eq. 77)}$$
$$predC''(i - 1, j) + predC''(i + 1, j) + predC''(i, j - 1) +$$
$$predC''(i - 1, j - 1) + predC''(i + 1, j - 1) + predC''(i, j + 1) +$$
$$predC''(i - 1, j + 1) + predC''(i + 1, j + 1) + 8) >> 4$$

In some embodiments, the filter coefficients are derived based on predicted luma values of the luma samples corresponding to the chroma samples predL and reconstructed luma values of the luma samples corresponding to the chroma samples recL.

In some embodiments, a flag is signaled to indicate whether to apply the filter. In some embodiments, the filter can only be applied to blocks using multiple model CCRM.

In some embodiments, in step 2204, the encoder may generate residual chroma values of the chroma samples based on the filtered predicted chroma values.

Figure 23:
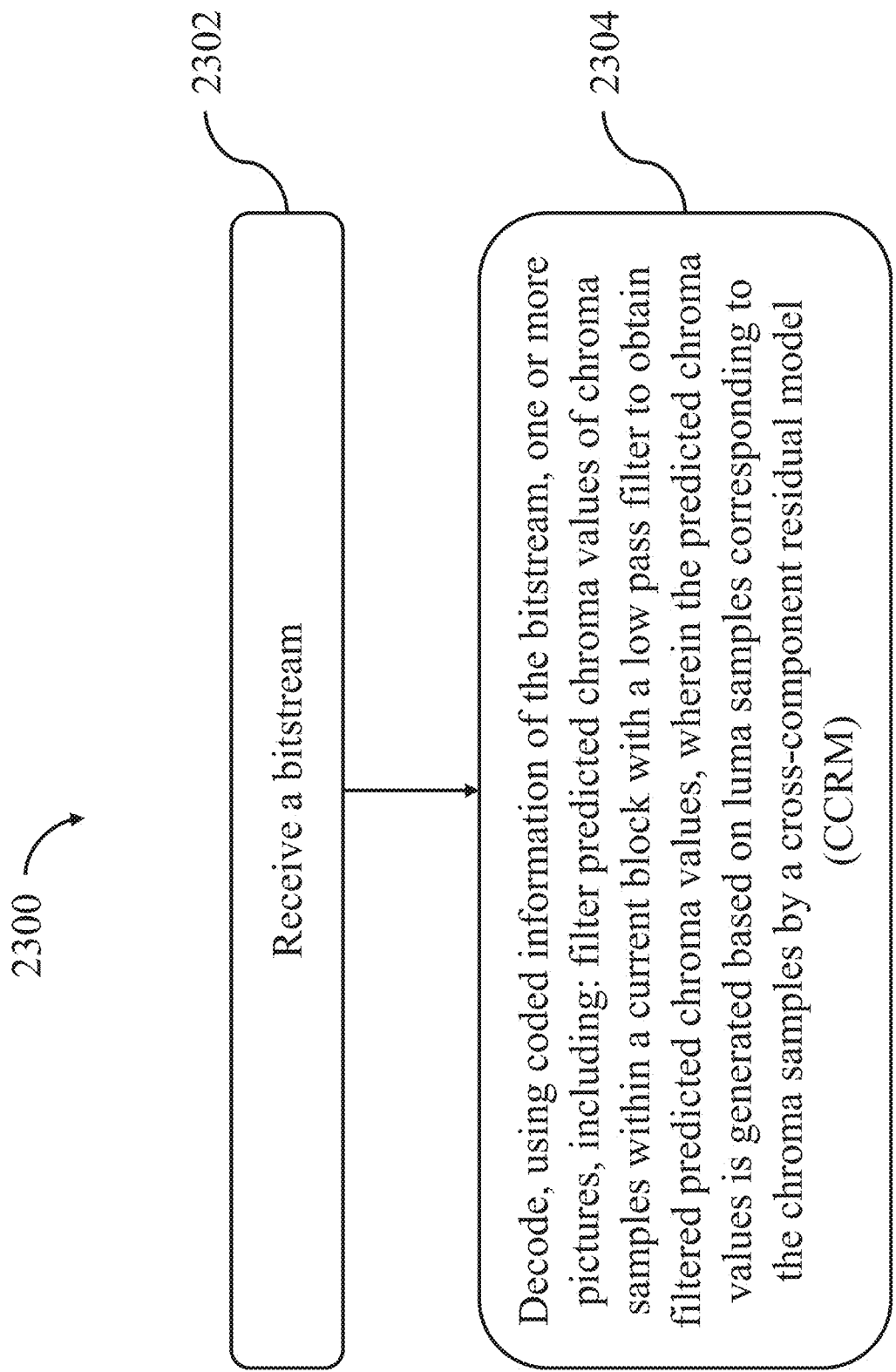
FIG. 23 shows an exemplary method for decoding a bitstream to output one or more pictures for a video stream, according to some embodiments of the present disclosure.

FIG. 23 shows an exemplary method 2300 for decoding a bitstream to output one or more pictures for a video stream, according to some embodiments of the present disclosure. As shown in FIG. 23, method 2300 may include following steps 2302 and 2304, which can be implemented by one or more processors associated with a decoder (e.g., image/video decoder 144 in FIG. 1, or apparatus 400 in FIG. 4).

In step 2302, the decoder may receive a bitstream.

In step 2304, the decoder may decode, using coded information of the bitstream, one or more pictures. Specifically, the decoder may filter predicted chroma values of chroma samples within a current block with a low pass filter to obtain filtered predicted chroma values, where the predicted chroma values is generated based on luma samples corresponding to the chroma samples by a cross-component residual model (CCRM).

In some embodiments, the decoder may filter predicted chroma values of chroma samples with an identical method described above in connection with the encoder. In addition, the decoder may restore the chroma samples by the predicted chroma value and the residual signals generated by the encoder.

In some embodiments, a non-transitory computer-readable storage medium storing a bitstream is also provided. The bitstream can be encoded and decoded according to any of the above-described methods.

In some embodiments, cross-component model inheritance can be used in CCRM.

Figure 24:
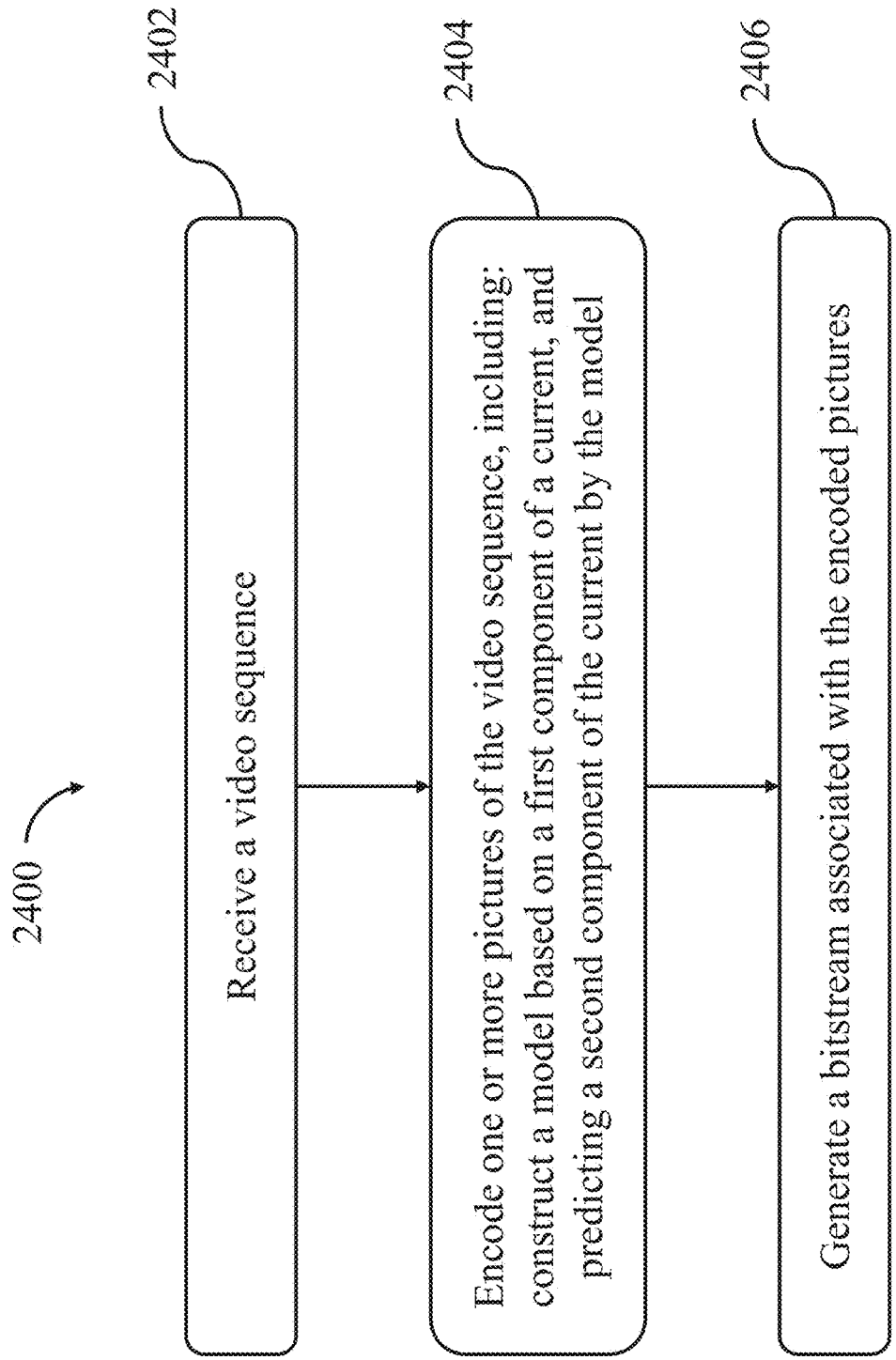
FIG. 24 shows an exemplary method for encoding a video sequence into a bitstream, according to some embodiments of the present disclosure.

FIG. 24 shows an exemplary method 2400 for encoding a video sequence into a bitstream, according to some embodiments of the present disclosure. As shown in FIG. 24, method 2400 includes following steps 2402 to 2406, which can be implemented by one or more processors associated with an encoder (e.g., image/video encoder 124 in FIG. 1, or apparatus 400 in FIG. 4).

In step 2402, the encoder can receive a video sequence.

In step 2404, the encoder can encode one or more pictures of the video sequence. Specifically, the encoder can construct a model based on a first component of a current, and predicting a second component of the current by the model. The model can be any of the above-described model, e.g., Cross Component Linear Model (CCLM), multi-model CCLM (MMLM), gradient linear model, convolutional cross-component intra prediction model, or Cross Component Residual Model (CCRM).

In step 2406, the encoder generates a bitstream associated with the encoded pictures. The bitstream may include the encoded results generated in step 2404.

In some embodiments, the first component is luma samples and the second component is chroma samples. For example, it is proposed to construct a model for predicted sample and reconstructed sample and reuse the model between different components. To be specific, a model can be constructed with predicted luma samples as input and reconstructed luma samples as output. The model parameters can be derived based on the predicted luma block and reconstructed luma block of the current coding block. All the above-mentioned models, including linear model and conventional mode, and the parameter derivation methods can be used. Then, predicted chroma values of the chroma samples can be predicted based on original predicted chroma values of the chroma samples by the model, where the original predicted chroma values are inter-predicted with respect to a reference picture or generated by intra block copy (IBC). The model may be applied on predicted chroma samples to derive a reconstructed chroma samples. In some embodiments, the encoder may fuse the derived reconstructed chroma sample with predicted chroma sample to get the finalized predicted chroma samples.

Figure 25:
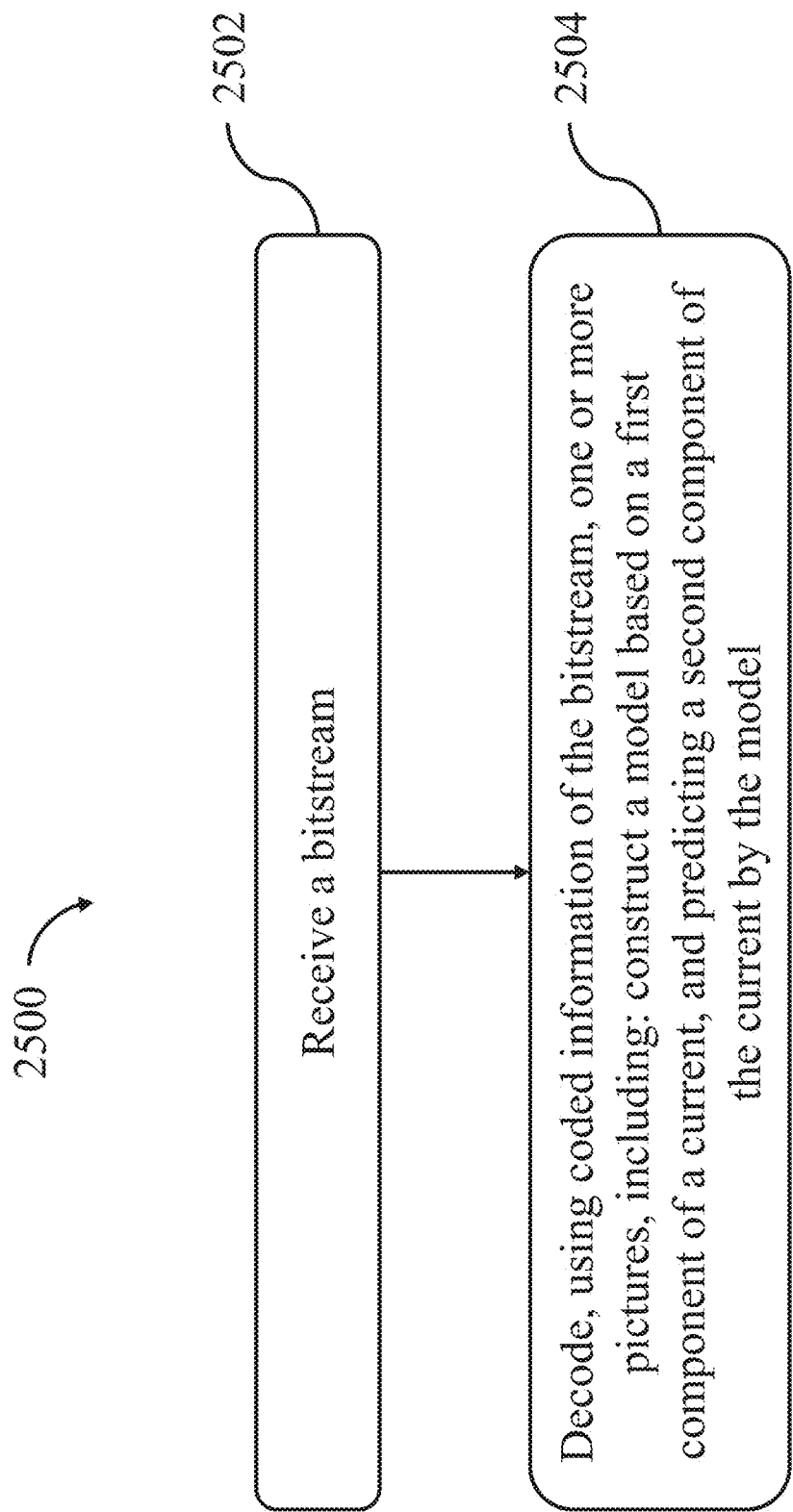
FIG. 25 shows an exemplary method for decoding a bitstream to output one or more pictures for a video stream, according to some embodiments of the present disclosure.

FIG. 25 shows an exemplary method 2500 for decoding a bitstream to output one or more pictures for a video stream, according to some embodiments of the present disclosure. As shown in FIG. 25, method 2500 may include following steps 2502 and 2504, which can be implemented by one or more processors associated with a decoder (e.g., image/video decoder 144 in FIG. 1, or apparatus 400 in FIG. 4).

In step 2502, the decoder may receive a bitstream.

In step 2504, the decoder may decode, using coded information of the bitstream, one or more pictures. Specifically, the decoder may construct a model based on a first component of a current, and predicting a second component of the current by the model.

In some embodiments, the decoder may construct the model with an identical method described above in connection with the encoder. In addition, the decoder may restore the chroma samples by the predicted chroma value and the residual signals generated by the encoder.

In some embodiments, a non-transitory computer-readable storage medium storing a bitstream is also provided. The bitstream can be encoded and decoded according to any of the above-described methods.

The embodiments described in the present disclosure can be freely combined.

In some embodiments, a non-transitory computer-readable storage medium storing a bitstream is also provided. The bitstream can be encoded and decoded according to the disclosed cross component prediction methods.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A method for encoding a video sequence into a bitstream, the method including:
  receiving a video sequence;
  encoding one or more pictures of the video sequence; and
  generating a bitstream associated with the encoded pictures,
  wherein the encoding includes:
  predicting chroma samples within a current block based on luma samples corresponding to the chroma samples by a plurality of cross-component residual models (CCRMs).

2. The method according to clause 1, wherein the chroma samples are predicted based on the luma samples corresponding to the chroma samples by the plurality of CCRMs in response to a determination that the chroma samples are to be predicted with more than one CCRM.

3. The method according to clause 2, wherein the chroma samples are determined to be predicted with more than one CCRM in response to a number of the chroma samples exceeding a threshold.

4. The method according to clause 2, wherein the encoding further includes:
  generating a flag indicating whether to predict the chroma samples by one or more CCRMs.

5. The method according to any of clauses 1 to 4, wherein predicting the chroma samples based on the luma samples corresponding to the chroma samples includes:
  classifying the chroma samples into a plurality of classes, wherein the plurality of CCRMs corresponding to the plurality of classes are trained based on the chroma samples and corresponding luma samples, respectively; and generating, by the plurality of CCRMs, a predicted chroma value of a target chroma sample of the chroma samples based on a luma sample corresponding to the target chroma sample.

6. The method according to clause 5, wherein classifying the chroma samples into the plurality of classes includes:
classifying an objective chroma sample into one of the plurality of classes based on a predicted luma value of a luma sample corresponding to the objective chroma sample.

7. The method according to clause 6, wherein the objective chroma sample is classified into one of the plurality of classes based on a comparison between the predicted luma value of the luma sample and a threshold, the threshold being associated with predicted luma values or reconstructed luma values of at least a part of the luma samples within the current block.

8. The method according to clause 7, wherein the plurality of classes includes two classes, and the threshold is an average value of the predicted luma values of all the luma samples within the current block or an average value of the reconstructed luma values of all the luma samples within the current block.

9. The method according to clause 7, wherein for the objective chroma sample with coordinates (i,j), the luma sample corresponding to the objective chroma sample is determined as:
a luma sample having coordinates (i,j) for 4:4:4 color format; or
a luma sample having coordinates (2i,j) for 4:2:2 color format.

10. The method according to clause 7, wherein for the objective chroma sample with coordinates (i,j), the luma sample corresponding to the objective chroma sample is determined as a luma sample having coordinates (2i, 2j) for 4:2:0 color format.

11. The method according to clause 10, wherein the objective chroma sample is classified into one of the plurality of classes based on a comparison between predL(2i, 2j) and the threshold, predL(2i, 2j) being a predicted luma value of the luma sample having coordinates (2i, 2j).

12. The method according to clause 7, wherein for the objective chroma sample with coordinates (i,j), in response to a 4:2:0 color format and a prediction for chroma samples in a manner that the chroma samples are not vertically shifted relative to corresponding luma samples, the luma sample corresponding to the objective chroma sample is determined as luma samples having coordinates (2i, 2j) and (2i, 2j+1).

13. The method according to clause 12, wherein the objective chroma sample is classified into one of the plurality of classes based on a comparison between the threshold and:

$$(predL(2i, 2j) + predL(2i, 2j+1) + 1) >> 1,$$

wherein predL(2i, 2j) is a predicted luma value of the luma sample having coordinates (2i, 2j), predL(2i, 2j+1) is a predicted luma value of the luma sample having coordinates (2i, 2j+1), and >> indicates a right shift operation.

14. The method according to clause 7, wherein for the objective chroma sample with coordinates (i,j), in response to a 4:2:0 color format and a prediction for chroma samples in a manner that the chroma samples are not vertically shifted relative to corresponding luma samples, the luma sample corresponding to the objective chroma sample is determined as luma samples having coordinates (2i, 2j), (2i−1,2j), (2i+1,2j), (2i, 2j+1), (2i−1,2j+1), and (2i+1,2j+1).

15. The method according to clause 14, wherein the objective chroma sample is classified into one of the plurality of classes based on a comparison between the threshold and:

$$\frac{predL(2i, 2j) + predL(2i-1, 2j) + predL(2i+1, 2j) + predL(2i, 2j+1) + predL(2i-1, 2j+1) + predL(2i+1, 2j+1) + 3}{6},$$

or $$(2*predL(2i, 2j) + predL(2i-1, 2j) + predL(2i+1, 2j) + 2*predL(2i, 2j+1) + predL(2i-1, 2j+1) + predL(2i+1, 2j+1) + 4) >> 3,$$

wherein predL(2i, 2j) is a predicted luma value of the luma sample having coordinates (2i, 2j), predL(2i−1,2j) is a predicted luma value of the luma sample having coordinates (2i−1,2j), predL(2i+1,2j) is a predicted luma value of the luma sample having coordinates (2i+1,2j), predL(2i, 2j+1) is a predicted luma value of the luma sample having coordinates (2i, 2j+1), predL(2i−1,2j+1) is a predicted luma value of the luma sample having coordinates (2i−1,2j+1), and predL(2i+1,2j+1) is a predicted luma value of the luma sample having coordinates (2i+1,2j+1).

16. The method according to clause 7, wherein for the objective chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the objective chroma sample is determined as luma samples having coordinates (2i, 2j), (2i−1,2j), and (2i+1,2j).

17. The method according to clause 16, wherein the objective chroma sample is classified into one of the plurality of classes based on a comparison between the threshold and:

$$(2*predL(2i, 2j) + predL(2i-1, 2j) + predL(2i+1, 2j) + 2) >> 2,$$

wherein predL(2i, 2j) is a predicted luma value of the luma sample having coordinates (2i, 2j), predL(2i−1,2j) is a predicted luma value of the luma sample having coordinates (2i−1,2j), and predL(2i+1,2j) is a predicted luma value of the luma sample having coordinates (2i+1,2j).

18. The method according to clause 7, wherein for the objective chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the objective chroma sample is determined as luma samples having coordinates (2i, 2j), (2i, 2j−1), and (2i, 2j+1).

19. The method according to clause 18, wherein the objective chroma sample is classified into one of the plurality of classes based on a comparison between the threshold and:

$$(2*predL(2i, 2j) + predL(2i, 2j-1) + predL(2i, 2j+1) + 2) >> 2,$$

wherein predL(2i, 2j) is a predicted luma value of the luma sample having coordinates (2i, 2j), predL(2i, 2j−1) is a predicted luma value of the luma sample having coordinates (2i, 2j−1), and predL(2i, 2j+1) is a predicted luma value of the luma sample having coordinates (2i, 2j+1).

20. The method according to clause 7, wherein for the objective chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the objective chroma sample is determined as luma samples having coordinates (2i, 2j), (2i−1,2j), (2i+1,2j), (2i, 2j+1), and (2i, 2j−1).

21. The method according to clause 20, wherein the objective chroma sample is classified into one of the plurality of classes based on a comparison between the threshold and:

$$(4*predL(2i, 2j) + predL(2i-1, 2j) +$$
$$predL(2i+1, 2j) + predL(2i, 2j+1) + predL(2i, 2j-1) + 4 \gg 3,$$

wherein predL(2i, 2j) is a predicted luma value of the luma sample having coordinates (2i, 2j), predL(2i−1,2j) is a predicted luma value of the luma sample having coordinates (2i−1,2j), predL(2i+1,2j) is a predicted luma value of the luma sample having coordinates (2i+1,2j), predL(2i, 2j+1) is a predicted luma value of the luma sample having coordinates (2i, 2j+1), and predL(2i, 2j−1) is a predicted luma value of the luma sample having coordinates (2i, 2j−1).

22. The method according to any of clauses 5 to 21, wherein the plurality of CCRMs corresponding to the plurality of classes are trained based on operations including:
training a target CCRM of the plurality of CCRMs based on original predicted chroma values of a set of chroma samples that are classified into a class corresponding to the target CCRM and predicted luma values of luma samples corresponding to the set of chroma samples, the original predicted chroma value being inter-predicted with respect to a reference picture or generated by intra block copy (IBC).

23. The method according to any of clauses 5 to 22, wherein generating the predicted chroma value of the target chroma sample includes:
classifying the target chroma sample into one of the plurality of classes based on a reconstructed luma value of the luma sample corresponding to the target chroma sample; and
generating, by a CCRM of the plurality of CCRMs corresponding to the one of the plurality of classes, the predicted chroma value of the target chroma sample based on the reconstructed luma value of the luma sample corresponding to the target chroma sample.

24. The method according to clause 23, wherein the target chroma sample is classified into one of the plurality of classes based on a comparison between the reconstructed luma value of the luma sample and a threshold, the threshold being associated with predicted luma values or reconstructed luma values of at least a part of the luma samples within the current block.

25. The method according to clause 24, wherein the threshold is an average value of the predicted luma values of all the luma samples within the current block or an average value of the reconstructed luma values of all the luma samples within the current block.

26. The method according to clause 24, wherein for the target chroma sample with coordinates (i,j), the luma sample corresponding to the target chroma sample is determined as:
a luma sample having coordinates (i,j) for 4:4:4 color format; or
a luma sample having coordinates (2i,j) for 4:2:2 color format.

27. The method according to clause 24, wherein for the target chroma sample with coordinates (i,j), the luma sample corresponding to the target chroma sample is determined as a luma sample having coordinates (2i, 2j) for 4:2:0 color format.

28. The method according to clause 27, wherein the target chroma sample is classified into one of the plurality of classes based on a comparison between recL(2i, 2j) and the threshold, recL(2i, 2j) being a reconstructed luma value of the luma sample having coordinates (2i, 2j).

29. The method according to clause 24, wherein for the target chroma sample with coordinates (i,j), in response to a 4:2:0 color format and a prediction for chroma samples in a manner that the chroma samples are not vertically shifted relative to corresponding luma samples, the luma sample corresponding to the target chroma sample is determined as luma samples having coordinates (2i, 2j) and (2i, 2j+1).

30. The method according to clause 29, wherein the target chroma sample is classified into one of the plurality of classes based on a comparison between the threshold and:

$$(recL(2i, 2j) + recL(2i, 2j+1) + 1) \gg 1,$$

wherein recL(2i, 2j) is a reconstructed luma value of the luma sample having coordinates (2i, 2j), recL(2i, 2j+1) is a reconstructed luma value of the luma sample having coordinates (2i, 2j+1), and >> indicates a right shift operation.

31. The method according to clause 24, wherein for the target chroma sample with coordinates (i,j), in response to a 4:2:0 color format and a prediction for chroma samples in a manner that the chroma samples are not vertically shifted relative to corresponding luma samples, the luma sample corresponding to the target chroma sample is determined as luma samples having coordinates (2i, 2j), (2i−1,2j), (2i+1, 2j), (2i, 2j+1), (2i−1,2j+1), and (2i+1,2j+1).

32. The method according to clause 31, wherein the target chroma sample is classified into one of the plurality of classes based on a comparison between the threshold and:

$$\frac{recL(2i, 2j) + recL(2i-1, 2j) + recL(2i+1, 2j) + recL(2i, 2j+1) + recL(2i-1, 2j+1) + recL(2i+1, 2j+1) + 3}{6}, \text{ or}$$

-continued $$(2*recL(2i, 2j) + recL(2i-1, 2j) + recL(2i+1, 2j) +$$
$$2*recL(2i, 2j+1) + recL(2i-1, 2j+1) + recL(2i+1, 2j+1) + 4) \gg 3,$$

wherein recL (2i, 2j) is a reconstructed luma value of the luma sample having coordinates (2i, 2j), recL(2i−1,2j) is a reconstructed luma value of the luma sample having coordinates (2i−1,2j), recL(2i+1,2j) is a reconstructed luma value of the luma sample having coordinates (2i+1,2j), recL(2i, 2j+1) is a reconstructed luma value of the luma sample having coordinates (2i, 2j+1), recL(2i−1,2j+1) is a reconstructed luma value of the luma sample having coordinates (2i−1,2j+1), and recL (2i+1,2j+1) is a reconstructed luma value of the luma sample having coordinates (2i+1,2j+1).

33. The method according to clause 24, wherein for the target chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the target chroma sample is determined as luma samples having coordinates (2i, 2j), (2i−1,2j), and (2i+1,2j).

34. The method according to clause 33, wherein the target chroma sample is classified into one of the plurality of classes based on a comparison between the threshold and:

$$(2*recL(2i, 2j) + recL(2i-1, 2j) + recL(2i+1, 2j) + 2) \gg 2,$$

wherein recL(2i, 2j) is a reconstructed luma value of the luma sample having coordinates (2i, 2j), recL(2i−1,2j) is a reconstructed luma value of the luma sample having coordinates (2i−1,2j), and recL(2i+1,2j) is a reconstructed luma value of the luma sample having coordinates (2i+1,2j).

35. The method according to clause 24, wherein for the target chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the target chroma sample is determined as luma samples having coordinates (2i, 2j), (2i, 2j−1), and (2i, 2j+1).

36. The method according to clause 35, wherein the target chroma sample is classified into one of the plurality of classes based on a comparison between the threshold and:

$$(2*recL(2i, 2j) + recL(2i, 2j-1) + recL(2i, 2j+1) + 2) \gg 2,$$

wherein recL(2i, 2j) is a reconstructed luma value of the luma sample having coordinates (2i, 2j), recL(2i, 2j−1) is a reconstructed luma value of the luma sample having coordinates (2i, 2j−1), and recL(2i, 2j+1) is a reconstructed luma value of the luma sample having coordinates (2i, 2j+1).

37. The method according to clause 24, wherein for the target chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the target chroma sample is determined as luma samples having coordinates (2i, 2j), (2i−1,2j), (2i+1,2j), (2i, 2j+1), and (2i, 2j−1).

38. The method according to clause 37, wherein the target chroma sample is classified into one of the plurality of classes based on a comparison between the threshold and:

$$(4*recL(2i, 2j) + recL(2i-1, 2j) +$$
$$recL(2i+1, 2j) + recL(2i, 2j+1) + recL(2i, 2j-1) + 4) \gg 3,$$

wherein recL(2i, 2j) is a reconstructed luma value of the luma sample having coordinates (2i, 2j), recL(2i−1,2j) is a reconstructed luma value of the luma sample having coordinates (2i−1,2j), recL(2i+1,2j) is a reconstructed luma value of the luma sample having coordinates (2i+1,2j), recL(2i, 2j+1) is a reconstructed luma value of the luma sample having coordinates (2i, 2j+1), and recL(2i, 2j−1) is a reconstructed luma value of the luma sample having coordinates (2i, 2j−1).

39. The method according to any of clauses 5 to 38, wherein the encoding further includes:
   filtering the predicted chroma value by a low pass filter to obtain a filtered predicted chroma value of the target chroma sample; and
   fusing the filtered predicted chroma value of the target chroma sample with the original predicted chroma value of the target chroma sample to obtain the finalized predicted chroma value.

40. The method according to any of clauses 5 to 38, wherein the encoding further includes:
   fusing the predicted chroma value of the target chroma sample with an original predicted chroma value of the target chroma sample to obtain a finalized predicted chroma value, the original predicted chroma value being inter-predicted with respect to a reference picture or generated by intra block copy (IBC).

41. The method according to clause 40, wherein the encoding further includes:
   generating a residual chroma value of the target chroma sample based on the finalized predicted chroma value.

42. The method according to clause 40, wherein the encoding further includes:
   filtering the finalized predicted chroma value by a low pass filter to obtain a filtered predicted chroma value of the target chroma sample.

43. The method according to clause 42, wherein the encoding further includes:
   generating a residual chroma value of the target chroma sample based on the filtered predicted chroma value.

44. The method according to clause 42, wherein coefficients of the low pass filter are determined based on a predicted luma value and a reconstructed luma value of the luma sample corresponding to the target chroma sample.

45. The method according to clause 42, wherein the encoding further includes:
   generating a flag indicating the finalized predicted chroma value being filtered by the low pass filter.

46. The method according to any of clauses 1 to 45, wherein the chroma samples include Cb samples and Cr samples.

47. A method for decoding a bitstream to output one or more pictures for a video stream, the method including:
   receiving a bitstream; and
   decoding, using coded information of the bitstream, one or more pictures, wherein the decoding includes:
predicting chroma samples within a current block based on luma samples corresponding to the chroma samples by a plurality of cross-component residual models (CCRMs).

48. The method according to clause 47, wherein the chroma samples are predicted based on the luma samples corresponding to the chroma samples by the plurality of CCRMs in response to a determination that the chroma samples are to be predicted with more than one CCRM.

49. The method according to clause 48, wherein the chroma samples are determined to be predicted with more than one CCRM in response to a number of the chroma samples exceeding a threshold.

50. The method according to clause 48, wherein the decoding further includes: receiving a flag indicating whether to predict the chroma samples by one or more CCRMs.

51. The method according to any of clauses 47 to 50, wherein predicting the chroma samples based on the luma samples corresponding to the chroma samples includes:
classifying the chroma samples into a plurality of classes, wherein the plurality of CCRMs corresponding to the plurality of classes are trained based on the chroma samples and corresponding luma samples, respectively; and
generating, by the plurality of CCRMs, a predicted chroma value of a target chroma sample of the chroma samples based on a luma sample corresponding to the target chroma sample.

52. The method according to clause 51, wherein classifying the chroma samples into the plurality of classes includes:
classifying an objective chroma sample into one of the plurality of classes based on a predicted luma value of a luma sample corresponding to the objective chroma sample.

53. The method according to clause 52, wherein the objective chroma sample is classified into one of the plurality of classes based on a comparison between the predicted luma value of the luma sample and a threshold, the threshold being associated with predicted luma values or reconstructed luma values of at least a part of the luma samples within the current block.

54. The method according to clause 53, wherein the plurality of classes includes two classes, and the threshold is an average value of the predicted luma values of all the luma samples within the current block or an average value of the reconstructed luma values of all the luma samples within the current block.

55. The method according to clause 53, wherein for the objective chroma sample with coordinates (i,j), the luma sample corresponding to the objective chroma sample is determined as:
a luma sample having coordinates (i,j) for 4:4:4 color format; or
a luma sample having coordinates (2i,j) for 4:2:2 color format.

56. The method according to clause 53, wherein for the objective chroma sample with coordinates (i,j), the luma sample corresponding to the objective chroma sample is determined as a luma sample having coordinates (2i, 2j) for 4:2:0 color format.

57. The method according to clause 56, wherein the objective chroma sample is classified into one of the plurality of classes based on a comparison between predL(2i, 2j) and the threshold, predL(2i, 2j) being a predicted luma value of the luma sample having coordinates (2i, 2j).

58. The method according to clause 53, wherein for the objective chroma sample with coordinates (i,j), in response to a 4:2:0 color format and a prediction for chroma samples in a manner that the chroma samples are not vertically shifted relative to corresponding luma samples, the luma sample corresponding to the objective chroma sample is determined as luma samples having coordinates (2i, 2j) and (2i, 2j+1).

59. The method according to clause 58, wherein the objective chroma sample is classified into one of the plurality of classes based on a comparison between the threshold and:

$$(predL(2i, 2j) + predL(2i, 2j+1) + 1) \gg 1,$$

wherein predL(2i, 2j) is a predicted luma value of the luma sample having coordinates (2i, 2j), predL(2i, 2j+1) is a predicted luma value of the luma sample having coordinates (2i, 2j+1), and >> indicates a right shift operation.

60. The method according to clause 53, wherein for the objective chroma sample with coordinates (i,j), in response to a 4:2:0 color format and a prediction for chroma samples in a manner that the chroma samples are not vertically shifted relative to corresponding luma samples, the luma sample corresponding to the objective chroma sample is determined as luma samples having coordinates (2i, 2j), (2i−1,2j), (2i+1,2j), (2i, 2j+1), (2i−1,2j+1), and (2i+1,2j+1).

61. The method according to clause 60, wherein the objective chroma sample is classified into one of the plurality of classes based on a comparison between the threshold and:

$$\frac{predL(2i, 2j) + predL(2i-1, 2j) + predL(2i+1, 2j) + predL(2i, 2j+1) + predL(2i-1, 2j+1) + predL(2i+1, 2j+1) + 3}{6}, \text{ or}$$

$$(2*predL(2i, 2j) + predL(2i-1, 2j) + predL(2i+1, 2j) + 2*predL(2i, 2j+1) + predL(2i-1, 2j+1) + predL(2i+1, 2j+1) + 4) \gg 3,$$

wherein predL(2i, 2j) is a predicted luma value of the luma sample having coordinates (2i, 2j), predL(2i−1,2j) is a predicted luma value of the luma sample having coordinates (2i−1,2j), predL(2i+1,2j) is a predicted luma value of the luma sample having coordinates (2i+1,2j), predL(2i, 2j+1) is a predicted luma value of the luma sample having coordinates (2i, 2j+1), predL(2i−1,2j+1) is a predicted luma value of the luma sample having coordinates (2i−1,2j+1), and predL(2i+1,2j+1) is a predicted luma value of the luma sample having coordinates (2i+1,2j+1).

62. The method according to clause 53, wherein for the objective chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the objective chroma sample is determined as luma samples having coordinates (2i, 2j), (2i−1,2j), and (2i+1,2j).

63. The method according to clause 62, wherein the objective chroma sample is classified into one of the plurality of classes based on a comparison between the threshold and:

$$(2*predL(2i, 2j) + predL(2i-1, 2j) + predL(2i+1, 2j) + 2) \gg 2,$$

wherein predL(2i, 2j) is a predicted luma value of the luma sample having coordinates (2i, 2j), predL(2i−1,2j) is a predicted luma value of the luma sample having coordinates (2i−1,2j), and predL(2i+1,2j) is a predicted luma value of the luma sample having coordinates (2i+1,2j).

64. The method according to clause 53, wherein for the objective chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the objective chroma sample is determined as luma samples having coordinates (2i, 2j), (2i, 2j−1), and (2i, 2j+1).

65. The method according to clause 64, wherein the objective chroma sample is classified into one of the plurality of classes based on a comparison between the threshold and:

$$(2*predL(2i, 2j) + predL(2i, 2j-1) + predL(2i, 2j+1) + 2) \gg 2,$$

wherein predL(2i, 2j) is a predicted luma value of the luma sample having coordinates (2i, 2j), predL(2i, 2j−1) is a predicted luma value of the luma sample having coordinates (2i, 2j−1), and predL(2i, 2j+1) is a predicted luma value of the luma sample having coordinates (2i, 2j+1).

66. The method according to clause 53, wherein for the objective chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the objective chroma sample is determined as luma samples having coordinates (2i, 2j), (2i−1,2j), (2i+1,2j), (2i, 2j+1), and (2i, 2j−1).

67. The method according to clause 66, wherein the objective chroma sample is classified into one of the plurality of classes based on a comparison between the threshold and:

$$(4*predL(2i, 2j) + predL(2i-1, 2j) + predL(2i+1, 2j) + predL(2i, 2j+1) + (2i, 2j-1) + 4) \gg 3,$$

wherein predL(2i, 2j) is a predicted luma value of the luma sample having coordinates (2i, 2j), predL(2i−1,2j) is a predicted luma value of the luma sample having coordinates (2i−1,2j), predL(2i+1,2j) is a predicted luma value of the luma sample having coordinates (2i+1,2j), predL(2i, 2j+1) is a predicted luma value of the luma sample having coordinates (2i, 2j+1), and predL(2i, 2j−1) is a predicted luma value of the luma sample having coordinates (2i, 2j−1).

68. The method according to any of clauses 51 to 67, wherein the plurality of CCRMs corresponding to the plurality of classes are trained based on operations including:
  training a target CCRM of the plurality of CCRMs based on original predicted chroma values of a set of chroma samples that are classified into a class corresponding to the target CCRM and predicted luma values of luma samples corresponding to the set of chroma samples, the original predicted chroma value being inter-predicted with respect to a reference picture or generated by intra block copy (IBC).

69. The method according to any of clauses 51 to 68, wherein generating the predicted chroma value of the target chroma sample includes:
  classifying the target chroma sample into one of the plurality of classes based on a reconstructed luma value of the luma sample corresponding to the target chroma sample; and
  generating, by a CCRM of the plurality of CCRMs corresponding to the one of the plurality of classes, the predicted chroma value of the target chroma sample based on the reconstructed luma value of the luma sample corresponding to the target chroma sample.

70. The method according to clause 69, wherein the target chroma sample is classified into one of the plurality of classes based on a comparison between the reconstructed luma value of the luma sample and a threshold, the threshold being associated with predicted luma values or reconstructed luma values of at least a part of the luma samples within the current block.

71. The method according to clause 70, wherein the threshold is an average value of the predicted luma values of all the luma samples within the current block or an average value of the reconstructed luma values of all the luma samples within the current block.

72. The method according to clause 70, wherein for the target chroma sample with coordinates (i,j), the luma sample corresponding to the target chroma sample is determined as:
  a luma sample having coordinates (i,j) for 4:4:4 color format; or
  a luma sample having coordinates (2i,j) for 4:2:2 color format.

73. The method according to clause 70, wherein for the target chroma sample with coordinates (i,j), the luma sample corresponding to the target chroma sample is determined as a luma sample having coordinates (2i, 2j) for 4:2:0 color format.

74. The method according to clause 73, wherein the target chroma sample is classified into one of the plurality of classes based on a comparison between recL(2i, 2j) and the threshold, recL(2i, 2j) being a reconstructed luma value of the luma sample having coordinates (2i, 2j).

75. The method according to clause 70, wherein for the target chroma sample with coordinates (i,j), in response to a 4:2:0 color format and a prediction for chroma samples in a manner that the chroma samples are not vertically shifted relative to corresponding luma samples, the luma sample corresponding to the target chroma sample is determined as luma samples having coordinates (2i, 2j) and (2i, 2j+1).

76. The method according to clause 75, wherein the target chroma sample is classified into one of the plurality of classes based on a comparison between the threshold and:

$$(recL(2i, 2j) + recL(2i, 2j+1) + 1) \gg 1,$$

wherein recL(2i, 2j) is a reconstructed luma value of the luma sample having coordinates (2i, 2j), recL(2i, 2j+1) is a reconstructed luma value of the luma sample having coordinates (2i, 2j+1), and >> indicates a right shift operation.

77. The method according to clause 70, wherein for the target chroma sample with coordinates (i,j), in response to a 4:2:0 color format and a prediction for chroma samples in a manner that the chroma samples are not vertically shifted relative to corresponding luma samples, the luma sample corresponding to the target chroma sample is determined as luma samples having coordinates (2i, 2j), (2i−1,2j), (2i+1, 2j), (2i, 2j+1), (2i−1,2j+1), and (2i+1,2j+1).

78. The method according to clause 77, wherein the target chroma sample is classified into one of the plurality of classes based on a comparison between the threshold and:

$$\frac{recL(2i, 2j) + recL(2i-1, 2j) + recL(2i+1, 2j) + recL(2i, 2j+1) + recL(2i-1, 2j+1) + recL(2i+1, 2j+1) + 3}{6}, \text{ or}$$

$$(2*recL(2i, 2j) + recL(2i-1, 2j) + recL(2i+1, 2j) +$$
$$2*recL(2i, 2j+1) + recL(2i-1, 2j+1) + recL(2i+1, 2j+1) + 4) \gg 3,$$

wherein recL(2i, 2j) is a reconstructed luma value of the luma sample having coordinates (2i, 2j), recL(2i−1,2j) is a reconstructed luma value of the luma sample having coordinates (2i−1,2j), recL(2i+1,2j) is a reconstructed luma value of the luma sample having coordinates (2i+1,2j), recL(2i, 2j+1) is a reconstructed luma value of the luma sample having coordinates (2i, 2j+1), recL(2i−1,2j+1) is a reconstructed luma value of the luma sample having coordinates (2i−1,2j+1), and recL(2i+1,2j+1) is a reconstructed luma value of the luma sample having coordinates (2i+1,2j+1).

79. The method according to clause 70, wherein for the target chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the target chroma sample is determined as luma samples having coordinates (2i, 2j), (2i−1,2j), and (2i+1,2j).

80. The method according to clause 79, wherein the target chroma sample is classified into one of the plurality of classes based on a comparison between the threshold and:

$$(2*recL(2i, 2j) + recL(2i-1, 2j) + recL(2i+1, 2j) + 2) \gg 2,$$

wherein recL(2i, 2j) is a reconstructed luma value of the luma sample having coordinates (2i, 2j), recL(2i−1,2j) is a reconstructed luma value of the luma sample having coordinates (2i−1,2j), and recL(2i+1,2j) is a reconstructed luma value of the luma sample having coordinates (2i+1,2j).

81. The method according to clause 70, wherein for the target chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the target chroma sample is determined as luma samples having coordinates (2i, 2j), (2i, 2j−1), and (2i, 2j+1).

82. The method according to clause 81, wherein the target chroma sample is classified into one of the plurality of classes based on a comparison between the threshold and:

$$(2*recL(2i, 2j) + recL(2i, 2j-1) + recL(2i, 2j+1) + 2) \gg 2,$$

wherein recL(2i, 2j) is a reconstructed luma value of the luma sample having coordinates (2i, 2j), recL(2i, 2j−1) is a reconstructed luma value of the luma sample having coordinates (2i, 2j−1), and recL(2i, 2j+1) is a reconstructed luma value of the luma sample having coordinates (2i, 2j+1).

83. The method according to clause 70, wherein for the target chroma sample with coordinates (i,j), in response to a 4:2:0 color format and a prediction for chroma samples in a manner that the chroma samples are shifted downward by 0.5 in units of luma samples relative to corresponding luma samples, the luma sample corresponding to the target chroma sample is determined as luma samples having coordinates (2i, 2j), (2i−1,2j), (2i+1,2j), (2i, 2j+1), and (2i, 2j−1).

84. The method according to clause 83, wherein the target chroma sample is classified into one of the plurality of classes based on a comparison between the threshold and:

$$(4*recL(2i, 2j) + recL(2i-1, 2j) +$$
$$recL(2i+1, 2j) + recL(2i, 2j+1) + recL(2i, 2j-1) + 4) \gg 3,$$

wherein recL(2i, 2j) is a reconstructed luma value of the luma sample having coordinates (2i, 2j), recL(2i−1,2j) is a reconstructed luma value of the luma sample having coordinates (2i−1,2j), recL(2i+1,2j) is a reconstructed luma value of the luma sample having coordinates (2i+1,2j), recL(2i, 2j+1) is a reconstructed luma value of the luma sample having coordinates (2i, 2j+1), and recL(2i, 2j−1) is a reconstructed luma value of the luma sample having coordinates (2i, 2j−1).

85. The method according to any of clauses 51 to 84, wherein the decoding further includes:
filtering the predicted chroma value by a low pass filter to obtain a filtered predicted chroma value of the target chroma sample; and
fusing the filtered predicted chroma value of the target chroma sample with an original predicted chroma value of the target chroma sample to obtain a finalized predicted chroma value, the original predicted chroma value being inter-predicted with respect to a reference picture or generated by intra block copy (IBC).

86. The method according to any of clauses 51 to 84, wherein the decoding further includes:
fusing the predicted chroma value of the target chroma sample with an original predicted chroma value of the target chroma sample to obtain a finalized predicted chroma value, the original predicted chroma value being inter-predicted with respect to a reference picture or generated by intra block copy (IBC).

87. The method according to clause 86, wherein the decoding further includes:
receiving a residual chroma value of the target chroma sample; and
generating a chroma value of the target chroma sample based on the residual chroma value and the finalized predicted chroma value.

88. The method according to clause 86, wherein the decoding further includes:
filtering the finalized predicted chroma value by a low pass filter to obtain a filtered predicted chroma value of the target chroma sample.

89. The method according to clause 88, wherein the decoding further includes:
receiving a residual chroma value of the target chroma sample; and
generating a chroma value of the target chroma sample based on the residual chroma value and the filtered predicted chroma value.

90. The method according to clause 88, wherein coefficients of the low pass filter are determined based on a predicted luma value and a reconstructed luma value of the luma sample corresponding to the target chroma sample.

91. The method according to clause 88, wherein the decoding further includes:
receiving a flag indicating whether the finalized predicted chroma value being filtered by the low pass filter.

92. The method according to any of clauses 47 to 91, wherein the chroma samples include Cb samples and Cr samples.

93. A non-transitory computer readable storage medium storing a bitstream of a video that is generated based on the method according to any of clauses 1 to 46, or decoded based on the method according to any of clauses 47 to 92.

94. A method for encoding a video sequence into a bitstream, the method including:
receiving a video sequence;
encoding one or more pictures of the video sequence; and
generating a bitstream associated with the encoded pictures,
wherein the encoding includes:
predicting chroma samples within a current block based on gradients of luma samples corresponding to the chroma samples by a cross-component residual model (CCRM).

95. The method according to clause 94, wherein the luma samples and the chroma samples are organized in a 4:2:0 color format, and a target luma sample having coordinates (i,j) is predicted based on a gradient of a luma sample having coordinates (i,j).

96. The method according to clause 95, wherein a predicted chroma value of the target chroma sample is determined based on the following CCRM:

$$predC'(i, j) = c0 * G(i, j) + c1 * B,$$

wherein predC'(i,j) is the predicted chroma value of the target chroma sample having coordinates (i,j), G(i,j) is the gradient of a luma sample having coordinates (i,j), and c0, c1, and B are parameters of the CCRM, c0 being non-zero.

97. The method according to clause 96, wherein G (i,j) is determined based on reconstructed luma values of luma samples having coordinates (2i−1, 2j), (2i+1,2j), (2i−1, 2j+1), and (2i+1, 2j+1).

98. The method according to clause 97, wherein G(i,j) is determined based on the following:

$$G(i, j) = \begin{bmatrix} recL(2i-1, 2j) - recL(2i+1, 2j) + \\ recL(2i-1, 2j+1) - recL(2i+1, 2j+1) \end{bmatrix},$$

wherein recL(2i−1, 2j) is a reconstructed luma value of the luma sample having coordinates (2i−1, 2j), recL (2i+1,2j) is a reconstructed luma value of the luma sample having coordinates (2i+1,2j), recL(2i−1, 2j+1) is a reconstructed luma value of the luma sample having coordinates (2i−1, 2j+1), and recL(2i+1, 2j+1) is a reconstructed luma value of the luma sample having coordinates (2i+1, 2j+1).

99. The method according to clause 97, wherein G (i,j) is further determined based on reconstructed luma values of luma samples having coordinates (2i, 2j) and (2i, 2j+1).

100. The method according to clause 99, wherein G(i,j) is determined based on one of the following:

$$G(i, j) = \begin{bmatrix} recL(2i-1, 2j) + 2*recL(2i, 2j) + recL(2i+1, 2j) - \\ recL(2i-1, 2j+1) - 2*recL(2i, 2j+1) - recL(2i+1, 2j+1) \end{bmatrix},$$

$$G(i, j) = \begin{bmatrix} 2*recL(2i-1, 2j) + recL(2i, 2j) - recL(2i+1, 2j) + \\ recL(2i-1, 2j+1) - recL(2i, 2j+1) - 2*recL(2i+1, 2j+1) \end{bmatrix}, \text{ or}$$

$$G(i, j) = \begin{bmatrix} -recL(2i-1, 2j) + recL(2i, 2j) + 2*recL(2i+1, 2j) - \\ 2*recL(2i-1, 2j+1) - recL(2i, 2j+1) + recL(2i+1, 2j+1) \end{bmatrix},$$

wherein recL(2i−1, 2j) is a reconstructed luma value of the luma sample having coordinates (2i−1, 2j), recL(2i, 2j) is a reconstructed luma value of the luma sample having coordinates (2i, 2j), recL(2i+1,2j) is a reconstructed luma value of the luma sample having coordinates (2i+1,2j), recL(2i−1, 2j+1) is a reconstructed luma value of the luma sample having coordinates (2i−1, 2j+1), recL(2i, 2j+1) is a reconstructed luma value of the luma sample having coordinates (2i, 2j+1), and recL(2i+1, 2j+1) is a reconstructed luma value of the luma sample having coordinates (2i+1, 2j+1).

101. The method according to clause 96, wherein the parameters c0, c1, and B are determined based on original predicted chroma values of the chroma samples and gradients of predicted luma values of luma samples corresponding to the chroma samples, the original predicted chroma values being inter-predicted with respect to a reference picture or generated by intra block copy (IBC).

102. The method according to clause 101, wherein the parameters c0, c1, and B are determined based on the following:

$$predC(i, j) = c0 * G'(i, j) + c1 * B,$$

wherein predC(i,j) is the original predicted chroma value of an objective chroma sample having coordinates (i,j), G'(i,j) is the gradient of a predicted luma value of the luma sample having coordinates (i,j).

103. The method according to clause 102, wherein G'(i,j) is determined based on predicted luma values of luma samples having coordinates (2i−1, 2j), (2i+1,2j), (2i−1, 2j+1), and (2i+1, 2j+1).

104. The method according to clause 103, wherein G'(i,j) is determined based on the following:

$$G'(i, j) = \begin{bmatrix} predL(2i-1, 2j) - predL(2i+1, 2j) + \\ predL(2i-1, 2j+1) - predL(2i+1, 2j+1) \end{bmatrix},$$

wherein predL(2i−1, 2j) is a predicted luma value of the luma sample having coordinates (2i−1, 2j), predL(2i+1,2j) is a predicted luma value of the luma sample having coordinates (2i+1,2j), predL(2i−1, 2j+1) is a predicted luma value of the luma sample having coordinates (2i−1, 2j+1), and predL(2i+1, 2j+1) is a predicted luma value of the luma sample having coordinates (2i+1, 2j+1).

105. The method according to clause 103, wherein G'(i,j) is further determined based on predicted luma values of luma samples having coordinates (2i, 2j) and (2i, 2j+1).

106. The method according to clause 105, wherein G'(i,j) is determined based on one of the following:

$$G'(i, j) = \begin{bmatrix} predL(2i-1, 2j) + 2*predL(2i, 2j) + predL(2i+1, 2j) - \\ predL(2i-1, 2j+1) - 2*predL(2i, 2j+1) - predL(2i+1, 2j+1) \end{bmatrix},$$

$$G'(i, j) = \begin{bmatrix} 2*predL(2i-1, 2j) + predL(2i, 2j) - predL(2i+1, 2j) + \\ predL(2i-1, 2j+1) - predL(2i, 2j+1) - 2*predL(2i+1, 2j+1) \end{bmatrix}, \text{ or}$$

$$G'(i, j) = \begin{bmatrix} -predL(2i-1, 2j) + predL(2i, 2j) + 2*predL(2i+1, 2j) - \\ 2*predL(2i-1, 2j+1) - predL(2i, 2j+1) + predL(2i+1, 2j+1) \end{bmatrix},$$

wherein predL(2i−1, 2j) is a predicted luma value of the luma sample having coordinates (2i−1, 2j), predL(2i, 2j) is a predicted luma value of the luma sample having coordinates (2i, 2j), predL(2i+1,2j) is a predicted luma value of the luma sample having coordinates (2i+1,2j), predL(2i−1, 2j+1) is a predicted luma value of the luma sample having coordinates (2i−1, 2j+1), predL(2i, 2j+1) is a predicted luma value of the luma sample having coordinates (2i, 2j+1), and predL(2i+1, 2j+1) is a predicted luma value of the luma sample having coordinates (2i+1, 2j+1).

107. The method according to clause 102, wherein the encoding further includes:
generating a flag indicating a formular of the gradient of the predicted luma value of the luma sample G'(i,j).

108. The method according to clause 95, wherein a predicted chroma value of the target chroma sample is determined based on the following CCRM:

$$predC'(i, j) = c0*G0(i, j) + c1*G1(i, j) + \ldots + cn*B,$$

wherein predC'(i,j) is the predicted chroma value of the target chroma sample having coordinates (i,j), G0(i,j) is a first gradient of the luma sample having coordinates (i,j), G1(i,j) is a second gradient of the luma sample having coordinates (i,j), . . . , and c0, c1, . . . , cn, and B are parameters of the CCRM; c1, . . . , and cn being not equal to zero simultaneously.

109. The method according to clause 95, wherein the chroma samples within a current block are predicted further based on reconstructed luma values of luma samples corresponding to the chroma samples.

110. The method according to clause 109, wherein the luma samples corresponding to the chroma samples are the luma samples having coordinates (2i, 2j), (2i−1, 2j), (2i+1, 2j), (2i, 2j+1), (2i−1, 2j+1), and (2i+1, 2j+1).

111. The method according to clause 95, wherein the chroma samples within a current block are predicted further based on location information of the chroma samples with respect to an upper left conner of the current block.

112. The method according to clause 95, wherein the chroma samples within a current block are predicted further based on reconstructed luma values of luma samples corresponding to the chroma samples and location information of the chroma samples with respect to an upper left conner of the current block.

113. The method according to any of clauses 94 to 112, wherein the encoding further includes:
fusing the predicted chroma values of the chroma samples with original predicted chroma values of the chroma samples to obtain finalized predicted chroma values, the original predicted chroma values being inter-predicted with respect to a reference picture or generated by intra block copy (IBC).

114. The method according to clause 113, wherein the encoding further includes:
generating residual chroma values of the chroma samples based on the finalized predicted chroma values.

115. A method for decoding a bitstream to output one or more pictures for a video stream, the method including:
receiving a bitstream; and
decoding, using coded information of the bitstream, one or more pictures,
wherein the decoding includes:
predicting chroma samples within a current block based on gradients of luma samples corresponding to the chroma samples by a cross-component residual model (CCRM).

116. The method according to clause 115, wherein the luma samples and the chroma samples are organized in a 4:2:0 color format, and a target luma sample having coordinates (i,j) is predicted based on a gradient of a luma sample having coordinates (i,j).

117. The method according to clause 116, wherein a predicted chroma value of the target chroma sample is determined based on the following CCRM:

$$predC'(i, j) = c0*G(i, j) + c1*B,$$

wherein predC'(i,j) is the predicted chroma value of the target chroma sample having coordinates (i,j), G(i,j) is the gradient of a luma sample having coordinates (i,j), and c0, c1, and B are parameters of the CCRM, c0 being non-zero.

118. The method according to clause 117, wherein G (i,j) is determined based on reconstructed luma values of luma samples having coordinates (2i−1, 2j), (2i+1,2j), (2i−1, 2j+1), and (2i+1, 2j+1).

119. The method according to clause 118, wherein G(i,j) is determined based on the following:

$$G(i, j) = \begin{bmatrix} recL(2i-1, 2j) - recL(2i+1, 2j) + \\ recL(2i-1, 2j+1) - recL(2i+1, 2j+1) \end{bmatrix},$$

wherein recL(2i−1, 2j) is a reconstructed luma value of the luma sample having coordinates (2i−1, 2j), recL(2i+1,2j) is a reconstructed luma value of the luma sample having coordinates (2i+1,2j), recL(2i−1, 2j+1) is a reconstructed luma value of the luma sample having coordinates (2i−1, 2j+1), and recL(2i+1, 2j+1) is a reconstructed luma value of the luma sample having coordinates (2i+1, 2j+1).

120. The method according to clause 118, wherein G (i,j) is further determined based on reconstructed luma values of luma samples having coordinates (2i, 2j) and (2i, 2j+1).

121. The method according to clause 120, wherein G(i,j) is determined based on one of the following:

$$G(i, j) = \begin{bmatrix} recL(2i-1, 2j) + 2*recL(2i, 2j) + recL(2i+1, 2j) - \\ recL(2i-1, 2j+1) - 2*recL(2i, 2j+1) - recL(2i+1, 2j+1) \end{bmatrix},$$

$$G(i, j) = \begin{bmatrix} 2*recL(2i-1, 2j) + recL(2i, 2j) - recL(2i+1, 2j) + \\ recL(2i-1, 2j+1) - recL(2i, 2j+1) - 2*recL(2i+1, 2j+1) \end{bmatrix}, \text{ or}$$

$$G(i, j) = \begin{bmatrix} -recL(2i-1, 2j) + recL(2i, 2j) + 2*recL(2i+1, 2j) - \\ 2*recL(2i-1, 2j+1) - recL(2i, 2j+1) + recL(2i+1, 2j+1) \end{bmatrix},$$

wherein recL(2i−1, 2j) is a reconstructed luma value of the luma sample having coordinates (2i−1, 2j), recL(2i, 2j) is a reconstructed luma value of the luma sample having coordinates (2i, 2j), recL(2i+1,2j) is a reconstructed luma value of the luma sample having coordinates (2i+1,2j), recL(2i−1, 2j+1) is a reconstructed luma value of the luma sample having coordinates (2i−1, 2j+1), recL(2i, 2j+1) is a reconstructed luma value of the luma sample having coordinates (2i, 2j+1), and recL(2i+1, 2j+1) is a reconstructed luma value of the luma sample having coordinates (2i+1, 2j+1).

122. The method according to clause 117, wherein the parameters c0, c1, and B are determined based on original predicted chroma values of the chroma samples and gradients of predicted luma values of luma samples corresponding to the chroma samples, the original predicted chroma values being inter-predicted with respect to a reference picture or generated by intra block copy (IBC).

123. The method according to clause 122, wherein the parameters c0, c1, and B are determined based on the following:

$$predC(i, j) = c0 * G'(i, j) + c1 * B,$$

wherein predC(i,j) is the original predicted chroma value of an objective chroma sample having coordinates (i,j), G'(i,j) is the gradient of a predicted luma value of the luma sample having coordinates (i,j).

124. The method according to clause 123, wherein G'(i,j) is determined based on predicted luma values of luma samples having coordinates (2i−1, 2j), (2i+1,2j), (2i−1, 2j+1), and (2i+1, 2j+1).

125. The method according to clause 124, wherein G'(i,j) is determined based on the following:

$$G'(i, j) = \begin{bmatrix} predL(2i-1, 2j) - predL(2i+1, 2j) + \\ predL(2i-1, 2j+1) - predL(2i+1, 2j+1) \end{bmatrix},$$

wherein predL(2i−1, 2j) is a predicted luma value of the luma sample having coordinates (2i−1, 2j), predL(2i+1,2j) is a predicted luma value of the luma sample having coordinates (2i+1,2j), predL(2i−1, 2j+1) is a predicted luma value of the luma sample having coordinates (2i−1, 2j+1), and predL(2i+1, 2j+1) is a predicted luma value of the luma sample having coordinates (2i+1, 2j+1).

126. The method according to clause 124, wherein G'(i,j) is further determined based on predicted luma values of luma samples having coordinates (2i, 2j) and (2i, 2j+1).

127. The method according to clause 126, wherein G'(i,j) is determined based on one of the following:

$$G'(i, j) = \begin{bmatrix} predL(2i-1, 2j) + 2*predL(2i, 2j) + predL(2i+1, 2j) - \\ predL(2i-1, 2j+1) - 2*predL(2i, 2j+1) - predL(2i+1, 2j+1) \end{bmatrix},$$

$$G'(i, j) = \begin{bmatrix} 2*predL(2i-1, 2j) + predL(2i, 2j) - predL(2i+1, 2j) + \\ predL(2i-1, 2j+1) - predL(2i, 2j+1) - 2*predL(2i+1, 2j+1) \end{bmatrix}, \text{ or}$$

$$G'(i, j) = \begin{bmatrix} -predL(2i-1, 2j) + predL(2i, 2j) + 2*predL(2i+1, 2j) - \\ 2*predL(2i-1, 2j+1) - predL(2i, 2j+1) + predL(2i+1, 2j+1) \end{bmatrix},$$

wherein predL(2i−1, 2j) is a predicted luma value of the luma sample having coordinates (2i−1, 2j), predL(2i, 2j) is a predicted luma value of the luma sample having coordinates (2i, 2j), predL(2i+1,2j) is a predicted luma value of the luma sample having coordinates (2i+1,2j), predL(2i−1, 2j+1) is a predicted luma value of the luma sample having coordinates (2i−1, 2j+1), predL(2i, 2j+1) is a predicted luma value of the luma sample having coordinates (2i, 2j+1), and predL(2i+1, 2j+1) is a predicted luma value of the luma sample having coordinates (2i+1, 2j+1).

128. The method according to clause 123, wherein the decoding further includes:
receiving a flag indicating a formular of the gradient of the predicted luma value of the luma sample G'(i,j).

129. The method according to clause 116, wherein a predicted chroma value of the target chroma sample is determined based on the following CCRM:

$$predC'(i, j) = c0 * G0(i, j) + c1 * G1(i, j) + \ldots + cn * B,$$

wherein predC'(i,j) is the predicted chroma value of the target chroma sample having coordinates (i,j), G0(i,j) is a first gradient of the luma sample having coordinates (i,j), G1(i,j) is a second gradient of the luma sample having coordinates (i,j), . . . , and c0, c1, . . . , cn, and B are parameters of the CCRM; c1, . . . , and cn being not equal to zero simultaneously.

130. The method according to clause 116, wherein the chroma samples within a current block are predicted further based on reconstructed luma values of luma samples corresponding to the chroma samples.

131. The method according to clause 130, wherein the luma samples corresponding to the chroma samples are the luma samples having coordinates (2i, 2j), (2i−1, 2j), (2i+1, 2j), (2i, 2j+1), (2i−1, 2j+1), and (2i+1, 2j+1).

132. The method according to clause 116, wherein the chroma samples within a current block are predicted further based on location information of the chroma samples with respect to an upper left conner of the current block.

133. The method according to clause 116, wherein the chroma samples within a current block are predicted further based on reconstructed luma values of luma samples corresponding to the chroma samples and location information of the chroma samples with respect to an upper left conner of the current block.

134. The method according to any of clauses 115 to 133, wherein the decoding further includes:
fusing the predicted chroma values of the chroma samples with original predicted chroma values of the chroma samples to obtain finalized predicted chroma values, the original predicted chroma values being inter-predicted with respect to a reference picture or generated by intra block copy (IBC).

135. The method according to clause 134, wherein the decoding further includes:
receiving residual chroma values of the chroma samples; and
generating chroma values of the chroma samples based on the residual chroma values and the finalized predicted chroma values.

136. A non-transitory computer readable storage medium storing a bitstream of a video that is generated based on the method according to any of clauses 94 to 114, or decoded based on the method according to any of clauses 115 to 135.

137. A method for encoding a video sequence into a bitstream, the method including:
receiving a video sequence;
encoding one or more pictures of the video sequence; and
generating a bitstream associated with the encoded pictures,
wherein the encoding includes:
filtering predicted chroma values of chroma samples within a current block with a low pass filter to obtain filtered predicted chroma values, the predicted chroma values being generated based on luma samples corresponding to the chroma samples by a cross-component residual model (CCRM).

138. The method according to clause 137, wherein the predicted chroma values of the chroma samples are generated according to operations including:
predicting, by the CCRM, the predicted chroma values of the chroma samples based on predicted luma values and reconstructed luma values of the luma samples corresponding to the chroma samples.

139. The method according to clause 137 or 138, wherein the predicted chroma values of the chroma samples are generated according to operations including:
predicting temporal predicted chroma values of the chroma samples based on predicted luma values and reconstructed luma values of the luma samples corresponding to the chroma samples by the CCRM; and
fusing the temporal predicted chroma values with original predicted chroma values of the chroma samples to obtain the predicted chroma values, the original predicted chroma values being inter-predicted with respect to a reference picture or generated by intra block copy (IBC).

140. The method according to any of clauses 137 to 139, wherein the low pass filter is a 3×3 tap filter.

141. The method according to any of clauses 137 to 140, wherein coefficients of the low pass filter are determined based on predicted luma values and reconstructed luma values of the luma samples corresponding to the chroma samples.

142. The method according to any of clauses 137 to 141, wherein the encoding further includes:
generating a flag indicating whether to filtering predicted chroma values of chroma samples with the low pass filter.

143. The method according to any of clauses 137 to 142, wherein the encoding further includes:
generating residual chroma values of the chroma samples based on the filtered predicted chroma values.

144. A method for decoding a bitstream to output one or more pictures for a video stream, the method including:
receiving a bitstream; and
decoding, using coded information of the bitstream, one or more pictures,
wherein the decoding includes:
filtering predicted chroma values of chroma samples within a current block with a low pass filter to obtain filtered predicted chroma values, the predicted chroma values being generated based on luma samples corresponding to the chroma samples by a cross-component residual model (CCRM).

145. The method according to clause 144, wherein the predicted chroma values of the chroma samples are generated according to operations including:
predicting, by the CCRM, the predicted chroma values of the chroma samples based on predicted luma values and reconstructed luma values of the luma samples corresponding to the chroma samples.

146. The method according to clause 144 or 145, wherein the predicted chroma values of the chroma samples are generated according to operations including:
predicting temporal predicted chroma values of the chroma samples based on predicted luma values and reconstructed luma values of the luma samples corresponding to the chroma samples by the CCRM; and
fusing the temporal predicted chroma values with original predicted chroma values of the chroma samples to obtain the predicted chroma values, the original predicted chroma values being inter-predicted with respect to a reference picture or generated by intra block copy (IBC).

147. The method according to any of clauses 144 to 146, wherein the low pass filter is a 3×3 tap filter.

148. The method according to any of clauses 144 to 147, wherein coefficients of the low pass filter are determined based on predicted luma values and reconstructed luma values of the luma samples corresponding to the chroma samples.

149. The method according to any of clauses 144 to 148, wherein the decoding further includes:
generating a flag indicating whether to filtering predicted chroma values of chroma samples with the low pass filter.

150. The method according to any of clauses 144 to 149, wherein the decoding further includes:
receiving residual chroma values of the chroma samples; and
generating chroma values of the chroma samples based on the residual chroma values and the filtered predicted chroma values of the chroma samples.

151. A non-transitory computer readable storage medium storing a bitstream of a video that is generated based on the method according to any of clauses 137 to 143, or decoded based on the method according to any of clauses 144 to 150.

152. A method for encoding a video sequence into a bitstream, the method including:
receiving a video sequence;
encoding one or more pictures of the video sequence; and generating a bitstream associated with the encoded pictures,
wherein the encoding includes:
constructing a model based on a first component of a current, and predicting a second component of the current by the model.

153. The method according to clause 152, wherein the first component is luma samples and the second component is chroma samples.

154. The method according to clause 153, wherein the model is constructed with predicted luma values of the luma samples as input and reconstructed luma values of the luma samples as output.

155. The method according to clause 153, wherein predicted chroma values of the chroma samples are predicted based on original predicted chroma values of the chroma samples by the model, the original predicted chroma values being inter-predicted with respect to a reference picture or generated by intra block copy (IBC).

156. The method according to clause 155, wherein the encoding further includes:
fusing the predicted chroma values with the original predicted chroma values of the chroma samples to obtain finalized predicted chroma values.

157. The method according to any of clauses 152 to 156, the model is one of the following: Cross Component Linear Model (CCLM), multi-model CCLM (MMLM), gradient linear model, convolutional cross-component intra prediction model, or Cross Component Residual Model (CCRM).

158. A method for decoding a bitstream to output one or more pictures for a video stream, the method including:
receiving a bitstream; and
decoding, using coded information of the bitstream, one or more pictures,
wherein the decoding includes:
constructing a model based on a first component of a current, and predicting a second component of the current by the model.

159. The method according to clause 158, wherein the first component is luma samples and the second component is chroma samples.

160. The method according to clause 159, wherein the model is constructed with predicted luma values of the luma samples as input and reconstructed luma values of the luma samples as output.

161. The method according to clause 159, wherein predicted chroma values of the chroma samples are predicted based on original predicted chroma values of the chroma samples by the model, the original predicted chroma values being inter-predicted with respect to a reference picture or generated by intra block copy (IBC).

162. The method according to clause 161, wherein the decoding further includes:
fusing the predicted chroma values with the original predicted chroma values of the chroma samples to obtain finalized predicted chroma values.

163. The method according to any of clauses 158 to 162, the model is one of the following: Cross Component Linear Model (CCLM), multi-model CCLM (MMLM), gradient linear model, convolutional cross-component intra prediction model, or Cross Component Residual Model (CCRM).

164. A non-transitory computer readable storage medium storing a bitstream of a video that is generated based on the method according to any of clauses 152 to 157, or decoded based on the method according to any of clauses 158 to 136.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for encoding a video sequence into a bitstream, the method comprising:
receiving a video sequence;
encoding one or more pictures of the video sequence; and
generating a bitstream associated with the encoded pictures,
wherein the encoding comprises:
predicting chroma samples within a current block based on luma samples corresponding to the chroma samples by a plurality of cross-component residual models (CCRMs).

2. The method according to claim 1, wherein the chroma samples are predicted based on the luma samples corresponding to the chroma samples by the plurality of CCRMs in response to a determination that the chroma samples are to be predicted with more than one CCRM.

3. The method according to claim 1, wherein predicting the chroma samples based on the luma samples corresponding to the chroma samples comprises:
classifying the chroma samples into a plurality of classes, wherein the plurality of CCRMs corresponding to the plurality of classes are trained based on the chroma samples and corresponding luma samples, respectively; and
generating, by the plurality of CCRMs, a predicted chroma value of a target chroma sample of the chroma samples based on a luma sample corresponding to the target chroma sample.

4. The method according to claim 3, wherein classifying the chroma samples into the plurality of classes comprises:
classifying an objective chroma sample into one of the plurality of classes based on a predicted luma value of a luma sample corresponding to the objective chroma sample.

5. The method according to claim 4, wherein the objective chroma sample is classified into one of the plurality of classes based on a comparison between the predicted luma value of the luma sample and a threshold, the threshold being associated with predicted luma values or reconstructed luma values of at least a part of the luma samples within the current block.

6. The method according to claim 3, wherein the encoding further comprises:
fusing the predicted chroma value of the target chroma sample with an original predicted chroma value of the target chroma sample to obtain a finalized predicted chroma value, the original predicted chroma value being inter-predicted with respect to a reference picture or generated by intra block copy (IBC).

7. The method according to claim 6, wherein the encoding further comprises:
generating a residual chroma value of the target chroma sample based on the finalized predicted chroma value.

8. The method according to claim 6, wherein the encoding further comprises:
filtering the finalized predicted chroma value by a low pass filter to obtain a filtered predicted chroma value of the target chroma sample.

9. The method according to claim 3, wherein the encoding further comprises:
filtering the predicted chroma value by a low pass filter to obtain a filtered predicted chroma value of the target chroma sample; and
fusing the filtered predicted chroma value of the target chroma sample with an original predicted chroma value of the target chroma sample to obtain a finalized predicted chroma value, the original predicted chroma value being inter-predicted with respect to a reference picture or generated by intra block copy (IBC).

10. A method for decoding a bitstream to output one or more pictures for a video stream, the method comprising:
receiving a bitstream; and
decoding, using coded information of the bitstream, one or more pictures,
wherein the decoding comprises:
predicting chroma samples within a current block based on luma samples corresponding to the chroma samples by a plurality of cross-component residual models (CCRMs).

11. The method according to claim 10, wherein the chroma samples are predicted based on the luma samples corresponding to the chroma samples by the plurality of CCRMs in response to a determination that the chroma samples are to be predicted with more than one CCRM.

12. The method according to claim 10, wherein predicting the chroma samples based on the luma samples corresponding to the chroma samples comprises:
classifying the chroma samples into a plurality of classes, wherein the plurality of CCRMs corresponding to the plurality of classes are trained based on the chroma samples and corresponding luma samples, respectively; and
generating, by the plurality of CCRMs, a predicted chroma value of a target chroma sample of the chroma samples based on a luma sample corresponding to the target chroma sample.

13. The method according to claim 12, wherein classifying the chroma samples into the plurality of classes comprises:
classifying an objective chroma sample into one of the plurality of classes based on a predicted luma value of a luma sample corresponding to the objective chroma sample.

14. The method according to claim 13, wherein the objective chroma sample is classified into one of the plurality of classes based on a comparison between the predicted luma value of the luma sample and a threshold, the threshold being associated with predicted luma values or reconstructed luma values of at least a part of the luma samples within the current block.

15. The method according to claim 12, wherein the decoding further comprises:
fusing the predicted chroma value of the target chroma sample with an original predicted chroma value of the target chroma sample to obtain a finalized predicted chroma value, the original predicted chroma value being inter-predicted with respect to a reference picture or generated by intra block copy (IBC).

16. The method according to claim 15, wherein the decoding further comprises:
receiving a residual chroma value of the target chroma sample; and
generating a chroma value of the target chroma sample based on the residual chroma value and the finalized predicted chroma value.

17. The method according to claim 15, wherein the decoding further comprises:
filtering the finalized predicted chroma value by a low pass filter to obtain a filtered predicted chroma value of the target chroma sample.

18. The method according to claim 15, wherein the decoding further comprises:
filtering the predicted chroma value by a low pass filter to obtain a filtered predicted chroma value of the target chroma sample; and
fusing the filtered predicted chroma value of the target chroma sample with an original predicted chroma value of the target chroma sample to obtain a finalized predicted chroma value, the original predicted chroma value being inter-predicted with respect to a reference picture or generated by intra block copy (IBC).

19. A method of storing a bitstream of a video, the method comprising:
receiving a video sequence comprising one or more pictures;

generating a bitstream associated with the one or more pictures, wherein the generating comprises: predicting chroma samples within a current block based on luma samples corresponding to the chroma samples by a plurality of cross-component residual models (CCRMs); and storing the bitstream in a non-transitory computer-readable storage medium.

20. The method according to claim 19, wherein predicting the chroma samples based on the luma samples corresponding to the chroma samples comprises:

classifying the chroma samples into a plurality of classes, wherein the plurality of CCRMs corresponding to the plurality of classes are trained based on the chroma samples and corresponding luma samples, respectively; and generating, by the plurality of CCRMs, a predicted chroma value of a target chroma sample of the chroma samples based on a luma sample corresponding to the target chroma sample.

\* \* \* \* \*